United States Patent
Schaumberg et al.

(10) Patent No.: US 11,636,696 B2
(45) Date of Patent: Apr. 25, 2023

(54) IDENTIFYING REGIONS OF INTEREST FROM WHOLE SLIDE IMAGES

(71) Applicant: MEMORIAL SLOAN KETTERING CANCER CENTER, New York, NY (US)

(72) Inventors: Andrew Schaumberg, New York, NY (US); Thomas Fuchs, New York, NY (US)

(73) Assignee: Memorial Sloan Kettering Cancer Center, New York, NY (US)

( * ) Notice: Subject to any disclaimer, the term of this patent is extended or adjusted under 35 U.S.C. 154(b) by 92 days.

(21) Appl. No.: 17/212,548

(22) Filed: Mar. 25, 2021

(65) Prior Publication Data

US 2021/0209338 A1 Jul. 8, 2021

Related U.S. Application Data

(63) Continuation of application No. 17/001,529, filed on Aug. 24, 2020, now Pat. No. 10,963,673.
(Continued)

(51) Int. Cl.
*G06K 9/00* (2022.01)
*G06V 20/69* (2022.01)

(52) U.S. Cl.
CPC ........... *G06V 20/698* (2022.01); *G06V 20/69* (2022.01); *G06V 20/695* (2022.01)

(58) Field of Classification Search
None
See application file for complete search history.

(56) References Cited

U.S. PATENT DOCUMENTS

2018/0053299 A1 2/2018 Gholap et al.
2020/0012845 A1 1/2020 Tracy et al.

FOREIGN PATENT DOCUMENTS

EP 3 486 836 A1 5/2019

OTHER PUBLICATIONS

Singh et al., "Super-resolution digital pathology image processing of bone marrow aspirate and cytology smears and tissue sections", 2018 Journal of Pathology Informatics, published Dec. 24, 2018 (Year: 2018).*

(Continued)

*Primary Examiner* — Soo Jin Park
(74) *Attorney, Agent, or Firm* — Foley & Lardner LLP

(57) ABSTRACT

The present application relates generally to identifying regions of interest in images, including but not limited to whole slide image region of interest identification, prioritization, de-duplication, and normalization via interpretable rules, nuclear region counting, point set registration, and histogram specification color normalization. This disclosure describes systems and methods for analyzing and extracting regions of interest from images, for example biomedical images depicting a tissue sample from biopsy or ectomy. Techniques directed to quality control estimation, granular classification, and coarse classification of regions of biomedical images are described herein. Using the described techniques, patches of images corresponding to regions of interest can be extracted and analyzed individually or in parallel to determine pixels correspond to features of interest and pixels that do not. Patches that do not include features of interest, or include disqualifying features, can be disqualified from further analysis. Relevant patches can analyzed and stored with various feature parameters.

20 Claims, 23 Drawing Sheets

Related U.S. Application Data

(60) Provisional application No. 62/890,793, filed on Aug. 23, 2019.

(56) References Cited

OTHER PUBLICATIONS

Adam Piorkowski et al: "Color Normalization Approach to Adjust Nuclei Segmentation in Images of Hematoxylin and Eosin Stained Tissue" In: "Information Technology in Biomedicine", Jun. 6, 2018 (Jun. 6, 2018), Springer, Cham, XP055742774, vol. 762, pp. 393-406, sections 3.1-3.2.
Mercan Ezgi et al: "Localization of Diagnostically Relevant Regions of Interest in Whole Slide Images: a Comparative Study", Journal of Digital Imaging, Springer-Verlag, Cham, vol. 29, No. 4, Mar. 9, 2016 (Mar. 9, 2016), pp. 496-506, XP036002537, ISSN: 0897-1889, DOI: 10.1007/S10278-016-9873-1 [retrieved on Mar. 9, 2016] abstract p. 497, right-hand column, paragraphs 3, 4 p. 499, right-hand column, paragraph 1 p. 501 figure 9.
Notice of Allowance on U.S. Appl. No. 17/001,529 dated Nov. 19, 2020.
Notice of Allowance on U.S. Appl. No. 17/001,529 dated Dec. 11, 2020.

\* cited by examiner

IDENTIFYING REGIONS OF INTEREST FROM WHOLE SLIDE IMAGES

CROSS REFERENCE TO RELATED APPLICATIONS

The present application claims priority under 35 U.S.C. § 120 as a continuation application of U.S. patent application Ser. No. 17/001,529, titled "Identifying Regions of Interest from Whole Slide Images," filed Aug. 24, 2020, under 35 U.S.C. § 119(e) to U.S. Provisional Patent Application No. 62/890,793, titled "Identifying Regions of Interest from Whole Slide Images," filed Aug. 23, 2019, each of which is incorporated herein in their entirety by reference.

TECHNICAL FIELD

The present application relates generally to identifying regions of interest in images, including but not limited to whole slide image region of interest identification, prioritization, de-duplication, and normalization via interpretable rules, nuclear region counting, point set registration, and histogram specification color normalization.

BACKGROUND

Some genetic mutations lead to cancer, e.g. SPOP mutation in prostate cancer. If a cell acquires a driver mutation, then the cell proliferates as cancer. Identifying these foci of proliferating cells in a whole slide image is a "needle in a haystack" problem, where much of the slide is empty background or uninteresting stromal tissue. The slide may also have blurred regions, pen marks, tissue folds, dark smudges, or regions covered in red blood cells. Rather, the interesting part of the slide is rich in the nuclear stain hematoxylin and poor in the stromal stain eosin, because cancer cells tend to have large nuclei and occur together as cancer foci.

SUMMARY

The method counts the discrete number of regions rich in hematoxylin and poor in eosin, choosing "modes" in the whole slide image as regions of interest (ROIs) that have maximal count. By focusing on these "mode" ROIs, the chance of downstream computational analyses may be maximized to predict mutation from histology, because the focus is on the cancer foci rather than uninteresting regions in the slide. Random ROIs are also selected, to more completely cover the slide, while still avoiding confounded regions, e.g. background, pen marks, blur, etc.

The remaining ROIs that are not much confounded must be sorted, such that the best ROIs most resemble cancer foci. However, cancer foci at low magnification may appear as solid glandular structures, while at high magnification this sample tissue appears as many discrete densely-packed nuclei. To address the problem of identifying cancer foci despite differences in appearance at different magnifications, a new multi-scale "nuclear region" concept is presented herein, which segments image regions that are rich in hematoxylin stain and poor in eosin stain. Cancer foci may be defined as having high nuclear region count, which at low magnifications may occur from a high number of glands, while at high magnification may occur from a high number of nuclei. Indeed, the reason that the glands at low magnification are rich in hematoxylin stain is that these glands including many nuclei which are strongly stained with hematoxylin and visible at higher magnifications. So by considering glands at low magnification, one can find densely packed nuclei at higher magnification. New Region Withering, Floodfill, and conditional Region Growing machine vision techniques may be configured to count nuclear regions, and logically separate nuclei that are extensively touching due to dense packing, for more accurate nuclear region counts. The mathematical and algorithmic "white-box" techniques may be more amenable to clinical analysis, compared to "black-box" machine learning techniques where it may be impossible to provide human-understandable explanations of why each pixel was classified the way it was.

ROIs at 5× magnification may have confounds that are negligible at this low magnification, such as a small hole in the center of the 5×ROI. However, this small hole may become non-negligible in a 20× magnification ROI, if taken at the center of the 5×ROI, where the hole is. Concentric multi-scale ROIs are the basis of some machine learning and machine vision techniques, such as feature pyramids. In contrast, this method first determines a 1.25× ROI, then within that determines the best 5×ROI, then within that determines the best 10×ROI, and then within that determines the best 20×ROI. ROIs at different magnifications are not necessarily concentric, they must not be excessively confounded, and they are optimized for nuclear region count. This is similar in principle to how a pathologist changes microscope objective lens powers to systematically explore the slide at higher magnification, by increasing magnification then moving the slide in small amounts for the best view at this increased magnification. Because ROIs are nested in progressively higher magnifications, glandular and nuclear structures are associated with each other. It may be that glandular features alone, nuclear features alone, or that the composition of glandular and nuclear features together predict a disease-driving molecular event, such as SPOP mutation in prostate cancer, which may be uncovered with downstream analyses on the provided ROIs.

In needle biopsies, a thin strip of tissue is excised from the patient using a large-bore needle. The surgeon guides the needle such that the disease of interest, e.g. cancer, is typically sampled in the needle biopsy. However, multiple slices of this thin strip of tissue are placed on the slide, some slices only being 5 microns away from other slices, so slices may appear similar to each other (FIGS. 2 and 4). An algorithm may be used to recognize similar slide regions using SURF and RANSAC methods, primarily to reduce the chance that ROIs overlap, and secondarily to reduce the chance of using highly similar ROIs in different slices of the same biopsy. On a glass slide showing two 5-micron-different slices of the same needle biopsy, it is possible to show the same cancer focus twice, once in each slice, which is not the same as having two spatially distinct cancer foci grown-out in the patient. Moreover, some glass slides may show two slices, while others three or four. De-duplication of similar ROIs may avoid over-representing the patient's tumor burden overall.

Other pipelines do not extract regions of interest at multiple magnifications, and may use black-box machine learning methods as part of quality control, which may not be acceptable in the clinic.

In contrast, this method is completely white-box, being mathematical algorithms coded in software, and ROIs at 20×, 10×, and 5× are extracted as circular "octagons", mimicking what a pathologist may see at the microscope eyepiece, or the circular samples in tissue microarrays (TMAs). This facilitates image annotations from the microscope, as well as the combination of whole slide and TMA data. This method also puts needle biopsy slides of thin tissue strips in the same ROI space as whole ectomies of large tissue areas. By treating TMAs, whole slide needle biopsies, and whole slide ectomies the same, how much data are considered may be maximized for one analysis.

At least one aspect of the present disclosure relates to a method. The method can include obtaining a biomedical image derived from a tissue sample. The biomedical image can have a first area corresponding to a presence of the tissue sample and a second area corresponding to an absence of the tissue sample. The method can include identifying, from a plurality of sample types, a sample type for the tissue sample based on a comparison of a first size of the first area and a second size of the second area within the biomedical image. The method can include generating, from at least the first area of the biomedical image, a plurality of patches. Each patch of the plurality of patches can have a plurality of pixels. The method can include identifying, from a plurality of extraction policies corresponding to the plurality of sample types, an extraction policy for the sample type to apply to each patch of the plurality of patches to select at least one patch including a candidate region of interest. The extraction policy can define one or more pixel types present in a corresponding patch to qualify for selection from the plurality of patches. The method can include selecting a subset of patches from the plurality of patches based on the plurality of pixels in each patch of the subset in accordance with the extraction policy. The method can include storing, in one or more data structures, the subset of patches as a reduced representation of the biomedical image.

In some implementations, the extraction policy can specify that the corresponding patch qualifies for selection when a number of the plurality of pixels of the patch identified as one of a plurality of permissible pixel types satisfy a threshold number for the sample type. In some implementations, the extraction policy can specify that the corresponding patch is to quality for selection when each pixel of the plurality of pixels in the patch has a number of adjacent pixels of the one or more pixel types satisfying a threshold number for the sample type. In some implementations, the one or more pixel types defined by the extraction policy specify that at least one of the plurality of pixels in the corresponding patch is to be within a range of color values to qualify for selection.

In some implementations, generating the plurality of patches can include generating the plurality of patches each having the plurality of pixels at a step size defined for the sample type identified for the tissue sample. In some implementations, the method can include restricting storage of the reduced representation of the biomedical image, responsive to determining that none of the plurality of patches qualify for selection in accordance with the extraction policy. In some implementations, the method can include converting the biomedical image to grayscale to generate a second biomedical image. In some implementations, the second biomedical image can have a first area corresponding to the presence of the tissue sample and a second area corresponding to the absence of the tissue sample in grayscale. In some implementations, the method can include applying an image thresholding to the second biomedical image to classify each pixel of the second biomedical image as one of a foreground pixel or a background pixel. In some implementations, the method can include determining a total area of the tissue sample on a slide used to derive the biomedical image based on a number of pixels classified as the foreground pixel and a number of pixels classified as the background pixel.

In some implementations, the method can include applying color deconvolution to each pixel of the biomedical image to determine a first intensity value and a second intensity value for the pixel. In some implementations, the first intensity value can be correlated with a first stain on the tissue sample. In some implementations, the second intensity value can be correlated with a second stain on the tissue sample. In some implementations, the method can include determining a nuclear intensity value for each pixel of the biomedical image based on the first intensity value and the second intensity value. In some implementations, the method can include determining a plurality of discretized nuclear intensity values for the biomedical image using the nuclear intensity value for each pixel of the plurality of pixels. In some implementations, each of the plurality of discretized nuclear intensity values can correspond to a range of nuclear intensity values.

In some implementations, the method can include generating a distributive representation of the biomedical image based on the plurality of the discretized nuclear intensity values. In some implementations, the method can include applying an image thresholding to a distributive representation of the biomedical image generated based on the nuclear intensity value for each pixel to determine a number of pixels of a first tissue type and a number of pixels of a second tissue type.

At least one other aspect of the present disclosure relates to a system. The system can include a data processing system having one or more processors coupled with memory. The system can obtain, by a data processing system, a biomedical image derived from a tissue sample. The biomedical image can have a first area corresponding to a presence of the tissue sample and a second area corresponding to an absence of the tissue sample. The system can identify from a plurality of sample types, a sample type for the tissue sample based on a comparison of a first size of the first area and a second size of the second area within the biomedical image. The system can generate by the data processing system, from at least the first area of the biomedical image, a plurality of patches. Each patch of the plurality of patches can have a plurality of pixels. The system can identify from a plurality of extraction policies corresponding to the plurality of sample types, an extraction policy for the sample type to apply to each patch of the plurality of patches to select at least one patch including a candidate region of interest. The extraction policy can define one or more pixel types present in a corresponding patch to qualify for selection from the plurality of patches. The system can select a subset of patches from the plurality of patches based on the plurality of pixels in each patch of the subset in accordance with the extraction policy. The system can store in one or more data structures, the subset of patches as a reduced representation of the biomedical image.

In some implementations, the extraction policy can specify that the corresponding patch qualifies for selection when a number of the plurality of pixels of the patch identified as one of a plurality of permissible pixel types satisfies a threshold number for the sample type. In some implementations, the extraction policy can specify that the corresponding patch qualifies for selection when each pixel of the plurality of pixels in the patch has a number of adjacent pixels of the one or more pixel types satisfying a threshold number for the sample type. In some implementations, the one or more pixel types defined by the extraction policy specify that at least one of the plurality of pixels in the corresponding patch is within a range of color values to qualify for selection.

In some implementations, the system can generate the plurality of patches each having the plurality of pixels at a step size defined for the sample type identified for the tissue sample. In some implementations, the system can restrict storage of the reduced representation of the biomedical image, responsive to determining that none of the plurality of patches qualify for selection in accordance with the extraction policy.

In some implementations, the system can convert the biomedical image to grayscale to generate a second biomedical image. In some implementations, the second biomedical image can have a first area corresponding to the presence of the tissue sample and a second area corresponding to the absence of the tissue sample in grayscale. In some implementations, the system can apply an image thresholding to the second biomedical image to classify each pixel of the second biomedical image as one of a foreground pixel or a background pixel. In some implementations, the system can determine a total area of the tissue sample on a slide used to derive the biomedical image based on a number of pixels classified as the foreground pixel and a number of pixels classified as the background pixel.

In some implementations, the system can apply color deconvolution to each pixel of the biomedical image to determine a first intensity value and a second intensity value for the pixel. In some implementations, the first intensity value can be correlated with a first stain on the tissue sample. In some implementations, the second intensity value can be correlated with a second stain on the tissue sample. In some implementations, the system can determine a nuclear intensity value for each pixel of the biomedical image based on the first intensity value and the second intensity value. In some implementations, the system can determine a plurality of discretized nuclear intensity values for the biomedical image using the nuclear intensity value for each pixel of the plurality of pixels. In some implementations, each of the plurality of discretized nuclear intensity values can correspond to a range of nuclear intensity values.

In some implementations, the system can generate a distributive representation of the biomedical image based on the plurality of the discretized nuclear intensity values. In some implementations, the system can apply an image thresholding to a distributive representation of the biomedical image generated based on the nuclear intensity value for each pixel to determine a number of pixels of a first tissue type and a number of pixels of a second tissue type.

At least one other aspect of the present disclosure relates to a method. The method can include obtaining, by a data processing system, a first patch identified from a biomedical image derived from a tissue sample. The first patch can have a first plurality of pixels corresponding to a portion of the biomedical image. Each of the first plurality of pixels can be defined by a first color value. The method can include applying a kernel operator to the plurality of pixels of the first patch to generate a second patch. The second patch can have a second plurality of pixels. Each of the second plurality of pixels can have a second color value corresponding to one or more first color values of a corresponding subset of the first plurality of pixels. The method can include generating a variance metric over a corresponding plurality of second color values of the second plurality of pixels of the second patch. The method can include determining whether the first patch corresponding to the second patch qualifies for selection based on a comparison between the variance metric and a threshold value. The method can include storing in one or more data structures, an association between the first patch and the determination of whether the first patch qualifies for selection.

In some implementations, the method can include identifying the first color value of a pixel of the first plurality of pixels of the first patch, the first color value having a red color component, a green color component, and a blue color component. In some implementations, the method can include comparing the red color component, the green color component, and the blue color component of the first color value of the pixel with one another. In some implementations, the method can include classifying, based on the comparison, the pixel as at least one pixel type of a plurality of pixel types including growable, non-growable, acceptable, or unacceptable. In some implementations, the method can include storing, in the one or more data structures, a second association between the pixel of the first patch and the at least one pixel type.

In some implementations, the method can include applying color deconvolution to each pixel of the first plurality of pixels of the first patch to determine a first intensity value and a second intensity value for the pixel. In some implementations, the first intensity value can be correlated with a first stain on the tissue sample. In some implementations, the second intensity value can be correlated with a second stain on the tissue sample. In some implementations, the method can include classifying each pixel of the first plurality of pixels as a mark type of a plurality of mark types including a nuclear type and a non-nuclear type. In some implementations, the method can include comparing a region in the first patch corresponding to a number of pixels of the first plurality of pixels classified as the nuclear type to a threshold area. In some implementations, the method can include storing, in the one or more data structures, a second association between the first patch with at least one of the number of pixels of the first plurality of pixels classified as the nuclear type, the region in the first patch, and the comparison between the region and the threshold area.

In some implementations, the method can include determining a pixel variance metric over a corresponding plurality second color values of a subset of pixels of the second plurality of pixels in the second patch. In some implementations, the subset of pixels can include a pixel and one or more adjacent pixels in the second plurality of pixels. In some implementations, the method can include comparing the pixel variance metric over the corresponding plurality of second color values of the subset of pixels to a pixel threshold value. In some implementations, the method can include classifying the pixel in the subset of pixels as a pixel type of a plurality of pixel types. In some implementations, the pixel type can include blurred pixel type and non-blurred pixel type. In some implementations, the method can include storing in the one or more data structures, a second association between a corresponding pixel in the first patch and pixel type.

In some implementations, the method can include identifying the first color value of each pixel of the first plurality of pixels of the first patch, the first color value having a red color component, a green color component, and a blue color component. In some implementations, the method can include determining an excessive metric for at least one of the red color component, the green color component, or the blue color component over one or more of the first plurality of pixels of the first patch. In some implementations, the method can include comparing the excessive metric with a threshold metric. In some implementations, the method can include storing in the one or more data structures, a second association between the first patch and the comparison of the excessive metric with the threshold metric.

In some implementations, the method can include applying color deconvolution to each pixel of the first plurality of pixels of the first patch to determine a first plurality of intensity values for the first color value of the pixel. In some implementations, the first plurality of intensity values can include a first intensity value correlated with a first stain on the tissue sample, a second intensity value correlated with a second stain on the tissue sample, and a third intensity value correlated with a residual on the tissue sample. In some implementations, the method can include generating a distribution of intensity values based on the first plurality of intensity values corresponding to the first plurality of pixels of the first patch. In some implementations, the method can include mapping the distribution of intensity values to a target distribution of intensity values defined for the first patch to generate a normalized distribution of intensity values. In some implementations, the method can include generating a second plurality of intensity values for the first plurality of pixels of the patch using the normalized distribution of intensity values. In some implementations, the method can include applying inverse color deconvolution to the second plurality of intensity values to generate a third plurality of pixels for a third patch. In some implementations, each of the third plurality of pixels can be defined by a color value. In some implementations, the color value can have a red color component, a green color component, and a blue color component.

In some implementations, the method can include identifying a first pixel from the first plurality of pixels of the patch classified as a growable type. In some implementations, the method can include identifying one or more pixels adjacent to the first pixel in the first plurality of pixels classified as overwritable type. In some implementations, the method can include setting the one or more pixels to the first color value of the first pixel classified as the growable type.

In some implementations, the method can include identifying a first subset of pixels from the first plurality of pixels of the patch classified as nuclear type. In some implementations, the method can include determining a perimeter of the first subset of pixels classified as the nuclear type within the patch. In some implementations, the method can include identifying a second subset of pixels within the perimeter of the patch classified as non-nuclear type. In some implementations, the method can include setting each pixel of the second subset of pixels to the first color value of a corresponding adjacent pixel of the first subset of pixels.

In some implementations, the method can include identifying a subset of pixels from the first plurality of pixels of the patch classified as nuclear type. In some implementations, each of the subset of pixels can have one or more adjacent pixels in the first plurality of pixels also classified as the nuclear type. In some implementations, the method can include determining that a number of the subset of pixels satisfies a threshold pixel count. In some implementations, the method can include storing in one or more data structures, a second association between the patch and a region corresponding to the subset of pixels, responsive to determining that the number of the subset of pixels satisfies the threshold pixel count. In some implementations, obtaining the first patch can further include identifying the first patch at a magnification factor from a plurality of patches of the biomedical image as having a candidate region of interest.

At least one other aspect of the present disclosure relates to a system. The system can include a data processing system having one or more processors coupled with memory. The system can obtain, by a data processing system, a first patch identified from a biomedical image derived from a tissue sample. The first patch can have a first plurality of pixels corresponding to a portion of the biomedical image. Each of the first plurality of pixels can be defined by a first color value. The system can apply a kernel operator to the plurality of pixels of the first patch to generate a second patch. The second patch can have a second plurality of pixels. Each of the second plurality of pixels can have a second color value corresponding to one or more first color values of a corresponding subset of the first plurality of pixels. The system can generate a variance metric over a corresponding plurality of second color values of the second plurality of pixels of the second patch. The system can determine whether the first patch corresponding to the second patch qualifies for selection based on a comparison between the variance metric and a threshold value. The system can store in one or more data structures, an association between the first patch and the determination of whether the first patch qualifies for selection.

In some implementations, the system can identify the first color value of a pixel of the first plurality of pixels of the first patch, the first color value having a red color component, a green color component, and a blue color component. In some implementations, the system can compare the red color component, the green color component, and the blue color component of the first color value of the pixel with one another. In some implementations, the system can classify based on the comparison, the pixel as at least one pixel type of a plurality of pixel types including growable, non-growable, acceptable, and unacceptable. In some implementations, the system can store in the one or more data structures, a second association between the pixel of the first patch and the at least one pixel type.

In some implementations, the system can apply color deconvolution to each pixel of the first plurality of pixels of the first patch to determine a first intensity value and a second intensity value for the value. In some implementations, the first intensity value can be correlated with a first stain on the tissue sample. In some implementations, the second intensity value can be correlated with a second stain on the tissue sample. In some implementations, the system can classify each pixel of the first plurality of pixels as a mark type of a plurality of mark types including a nuclear type and a non-nuclear type. In some implementations, the system can compare a region in the first patch corresponding to a number of pixels of the first plurality of pixels classified as the nuclear type to a threshold area. In some implementations, the system can store, in the one or more data structures, a second association between the first patch with at least one of the number of pixels of the first plurality of pixels classified as the nuclear type, the region in the first patch, and the comparison between the region and the threshold area.

In some implementations, the system can determine a pixel variance metric over a corresponding plurality second color values of a subset of pixels of the second plurality of pixels in the second patch. In some implementations, the subset of pixels can include a pixel and one or more adjacent pixels in the second plurality of pixels. In some implementations, the system can compare the pixel variance metric over the corresponding plurality of second color values of the subset of pixels to a pixel threshold value. In some implementations, the system can classify the pixel in the subset of pixels as a pixel type of a plurality of pixel types. In some implementations, the pixel type can include blurred pixel type and non-blurred pixel type. In some implementations, the system can store, in the one or more data structures, a second association between a corresponding pixel in the first patch and pixel type.

In some implementations, the system can identify the first color value of each pixel of the first plurality of pixels of the first patch, the first color value having a red color component, a green color component, and a blue color component. In some implementations, the system can determine an excessive metric for at least one of the red color component, the green color component, or the blue color component over one or more of the first plurality of pixels of the first patch. In some implementations, the system can compare the excessive metric with a threshold metric. In some implementations, the system can store in the one or more data structures, a second association between the first patch and the comparison of the excessive metric with the threshold metric.

In some implementations, the system can apply color deconvolution to each pixel of the first plurality of pixels of the first patch to determine a first plurality of intensity values for the first color value of the pixel. In some implementations, the first plurality of intensity values can include a first intensity value correlated with a first stain on the tissue sample, a second intensity value correlated with a second stain on the tissue sample, and a third intensity value correlated with a residual on the tissue sample. In some implementations, the system can generate a distribution of intensity values based on the first plurality of intensity values corresponding to the first plurality of pixels of the first patch. In some implementations, the system can map the distribution of intensity values to a target distribution of intensity values defined for the first patch to generate a normalized distribution of intensity values. In some implementations, the system can generate a second plurality of intensity values for the first plurality of pixels of the patch using the normalized distribution of intensity values. In some implementations, the system can apply inverse color deconvolution to the second plurality of intensity values to generate a third plurality of pixels for a third patch. In some implementations, each of the third plurality of pixels can be defined by a color value. In some implementations, the color value can have a red color component, a green color component, and a blue color component.

In some implementations, the system can identify a first pixel from the first plurality of pixels of the patch classified as a growable type. In some implementations, the system can identify one or more pixels adjacent to the first pixel in the first plurality of pixels classified as overwritable type. In some implementations, the system can set the one or more pixels to the first color value of the first pixel classified as the growable type.

In some implementations, the system can identify a first subset of pixels from the first plurality of pixels of the patch classified as nuclear type. In some implementations, the system can determine a perimeter of the first subset of pixels classified as the nuclear type within the patch. In some implementations, the system can identify a second subset of pixels within the perimeter of the patch classified as non-nuclear type. In some implementations, the system can set each pixel of the second subset of pixels to the first color value of a corresponding adjacent pixel of the first subset of pixels.

In some implementations, the system can identify a subset of pixels from the first plurality of pixels of the patch classified as nuclear type. In some implementations, each of the subset of pixels can have one or more adjacent pixels in the first plurality of pixels also classified as the nuclear type. In some implementations, the system can determine that a number of the subset of pixels satisfies a threshold pixel count. In some implementations, the system can store in one or more data structures, a second association between the patch and a region corresponding to the subset of pixels, responsive to determining that the number of the subset of pixels satisfies the threshold pixel count. In some implementations, the system can identify the first patch at a magnification factor from a plurality of patches of the biomedical image as having a candidate region of interest.

At least one other aspect of the present disclosure relates to a method. The method can include obtaining, by a data processing system, a first set of patches from a biomedical image derived from a tissue sample. Each of the first set of patches adjacent to one another and identified as can include a candidate ROI. The method can include applying a feature detection process onto the candidate ROI of each patch of the first set of patches to determine a first plurality of interest points in a corresponding patch of the first set of patches. The method can include identifying a second plurality of interest points derived from a predetermined ROI of each patch of a second set of patches. The method can include comparing the first plurality of interest points with the second plurality of interest points to determine a subset of matching interest points. The method can include storing in one or more data structure, an association between the candidate ROI of at least one of the first set of patches and the predetermined ROI of at least one of the second set of patches based on the subset of matching interest points.

In some implementations, the method can include determining that a number of the subset of matching interest points does not satisfy a threshold number. In some implementations, the method can include determining that the first set of patches do not correspond to the second set of patches responsive to the determination that the number of the subset of matching interest point does not satisfy the threshold number. In some implementations, the method can include determining that a number of the subset of matching interest points satisfies a threshold number. In some implementations, the method can include performing responsive to determining that the number of the subset of matching interest points satisfies the threshold number, an image registration process the first set of patches and the second set of patches to determine a correspondence between the first set of patches and the second set of patches.

In some implementations, the method can include performing an image registration process to the first set of patches and the second set of patches to determine a number of inlier between the first plurality of interest points from the first set of patches and the second plurality of interest points from the second set of patches. In some implementations, the method can include determining that the number of inliers satisfies a threshold number. In some implementations, the method can include determining, responsive to the determination that the number of inliers satisfies the threshold number, that there is overlap between the candidate ROI of the first set of patches and the predetermined ROI of the second set of patches.

In some implementations, the method can include performing an image registration process to the first set of patches and the second set of patches for a number of iterations. In some implementations, the method can include determining that the number of iterations is greater than or equal to a maximum number. In some implementations, the method can include determining, responsive to the determination that the number of iterations is greater than or equal to the maximum number, that there is no overlap between the candidate ROI of the first set of patches and the predetermined ROI of the second set of patches. In some implementations of the method, identifying the second plurality of interest points can further include applying the feature detection process onto the predetermined ROI of each patch of the second set of patches to determine the second plurality of interest points in a corresponding patch of the second set of patches.

In some implementations of the method, the feature detection process can include at least one of a speeded up robust features a scale-invariant feature transform, or a convolutional neural network. In some implementations, the method can include selecting a first subset of patches at a magnification factor from the biomedical image identified as corresponding to a mode ROI. In some implementations, the method can include selecting a second subset of patches at the magnification factor from the biomedical image identified as corresponding to a random ROI. In some implementations, the method can include obtaining at least one of the first subset of patches or the second subset of patches as the first set of patches.

In some implementations, the method can include selecting a patch at a first magnification factor from the biomedical image identified as corresponding to at least one of a mode ROI or a random ROI. In some implementations, the method can include generating the first set of patches at a second magnification factor greater than the first magnification factor. In some implementations, the method can include identifying a quality control metric for the first set of patches at the second magnification greater. In some implementations, the method can include selecting the first set of patches for use in response to determining that the quality control metric is greater than a threshold metric.

At least one other aspect of the present disclosure relates to a system. The system can include a data processing system having one or more processors coupled with memory. The system can obtain a first set of patches from a biomedical image derived from a tissue sample. Each of the first set of patches adjacent to one another and identified as can include a candidate region of interest. The system can apply a feature detection process onto the candidate ROI of each patch of the first set of patches to determine a first plurality of interest points in a corresponding patch of the first set of patches. The system can identify a second plurality of interest points derived from a predetermined ROI of each patch of a second set of patches. The system can compare the first plurality of interest points with the second plurality of interest points to determine a subset of matching interest points. The system can store in one or more data structure, an association between the candidate ROI of at least one of the first set of patches and the predetermined ROI of at least one of the second set of patches based on the subset of matching interest points.

In some implementations, the system can determine that a number of the subset of matching interest points does not satisfy a threshold number. In some implementations, the system can determine that the first set of patches do not correspond to the second set of patches responsive to the determination that the number of the subset of matching interest point does not satisfy the threshold number. In some implementations, the system can determine that a number of the subset of matching interest points satisfies a threshold number. In some implementations, the system can perform responsive to determining that the number of the subset of matching interest points satisfies the threshold number, an image registration process the first set of patches and the second set of patches to determine a correspondence between the first set of patches and the second set of patches.

In some implementations, the system can perform an image registration process to the first set of patches and the second set of patches to determine a number of inlier between the first plurality of interest points from the first set of patches and the second plurality of interest points from the second set of patches. In some implementations, the system can determine that the number of inliers satisfies a threshold number. In some implementations, the system can determine responsive to the determination that the number of inliers satisfies the threshold number, that there is overlap between the candidate ROI of the first set of patches and the predetermined ROI of the second set of patches.

In some implementations, the system can perform an image registration process to the first set of patches and the second set of patches for a number of iterations. In some implementations, the system can determine that the number of iterations is greater than or equal to a maximum number. In some implementations, the system can determine responsive to the determination that the number of iterations is greater than or equal to the maximum number, that there is no overlap between the candidate ROI of the first set of patches and the predetermined ROI of the second set of patches. In some implementations of the system, identifying the second plurality of interest points can further include applying the feature detection process onto the predetermined ROI of each patch of the second set of patches to determine the second plurality of interest points in a corresponding patch of the second set of patches.

In some implementations of the system, the feature detection process can include at least one of a speeded up robust features a scale-invariant feature transform, or a convolutional neural network. In some implementations of the system, obtaining the first set of patches can further include selecting a first subset of patches at a magnification factor from the biomedical image identified as corresponding to a mode ROI. In some implementations of the system, obtaining the first set of patches can further include selecting a second subset of patches at the magnification factor from the biomedical image identified as corresponding to a random ROI. In some implementations of the system, obtaining the first set of patches can further include obtaining at least one of the first subset of patches or the second subset of patches as the first set of patches.

In some implementations, the system can select a patch at a first magnification factor from the biomedical image identified as corresponding to at least one of a mode ROI or a random ROI. In some implementations, the system can generate the first set of patches at a second magnification factor greater than the first magnification factor. In some implementations, the system can identify a quality control metric for the first set of patches at the second magnification greater. In some implementations, the system can select the first set of patches for use in response to determining that the quality control metric is greater than a threshold metric.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION

Figure 1:
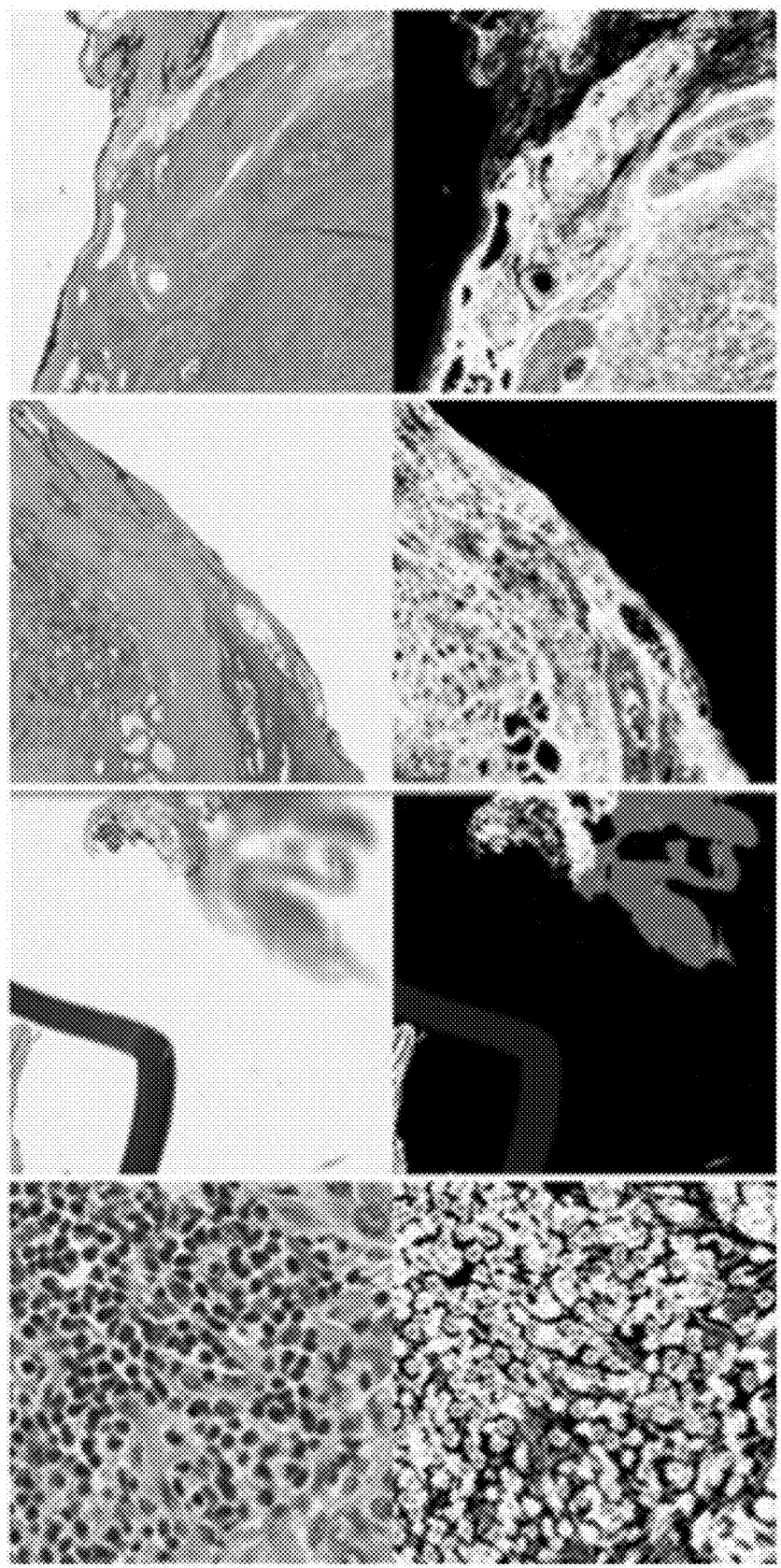
FIG. 1 depicts example biopsies. Top row: low magnification, background in black, foreground in white, blue pen/marker in blue, blood in red, nuclear pixels in yellow, nuclear regions (e.g. tumor foci or glandular structures) in brown, tissue folds (dark regions) in cyan. Pathologists use marker on the tissue to indicate surgical periphery/margin. Second row: low magnification, additionally green pen/marker in green. Third row: low magnification, additionally blur in magenta. Blur is any low complexity region detected by the Laplacian kernel. This blue pen is applied to the slide rather than the tissue, and may indicate where tissue swabbed for additional (molecular) testing. Fourth row: high magnification, nuclear regions are cell nuclei here.
Figure 2:
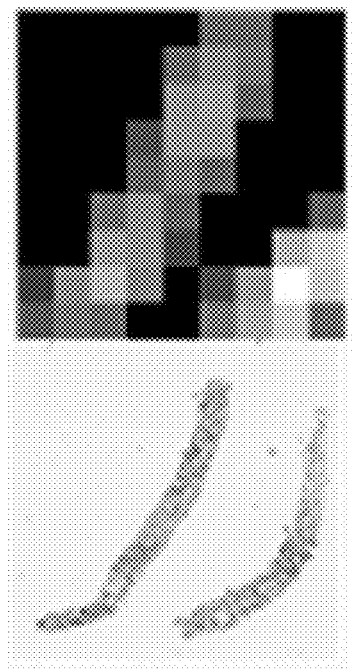
FIG. 2 depicts an example prostate needle biopsy. Top: whole slide image and 1.25× magnification nuclear region heatmap per use case 4. In the heatmap, white means high nuclear region count while black means zero. Bottom: regions of interest at various magnifications. Only central patch is shown. Surrounding octagon of patches for each ROI not shown. Mode ROIs at left and random ROIs at right. Mode ROI 1 farthest left. Random ROI 6 farthest right. ROIs at 5×, 10×, and 20×, top to bottom. Three mode ROIs present at these magnifications. No random ROIs passed QC at 5×. Four and six random ROIs passed QC at 10× and 20×, respectively.
Figure 2:
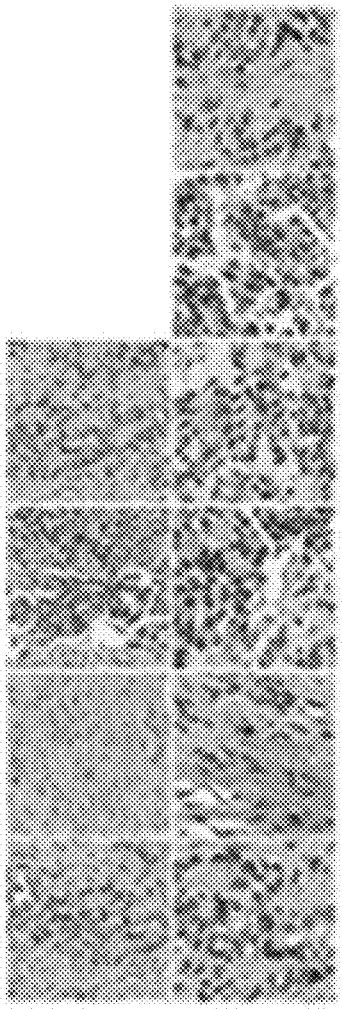
Figure 2:
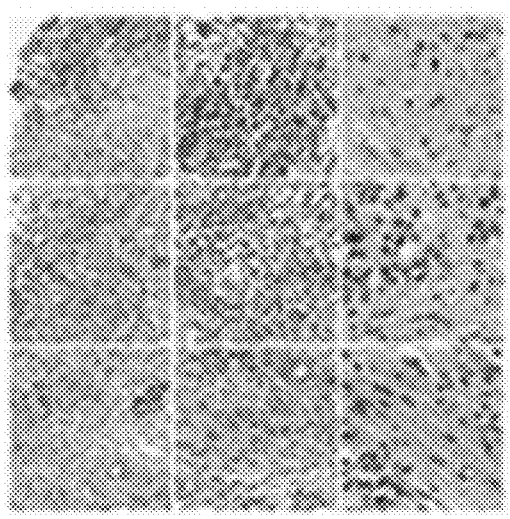
Figure 3:
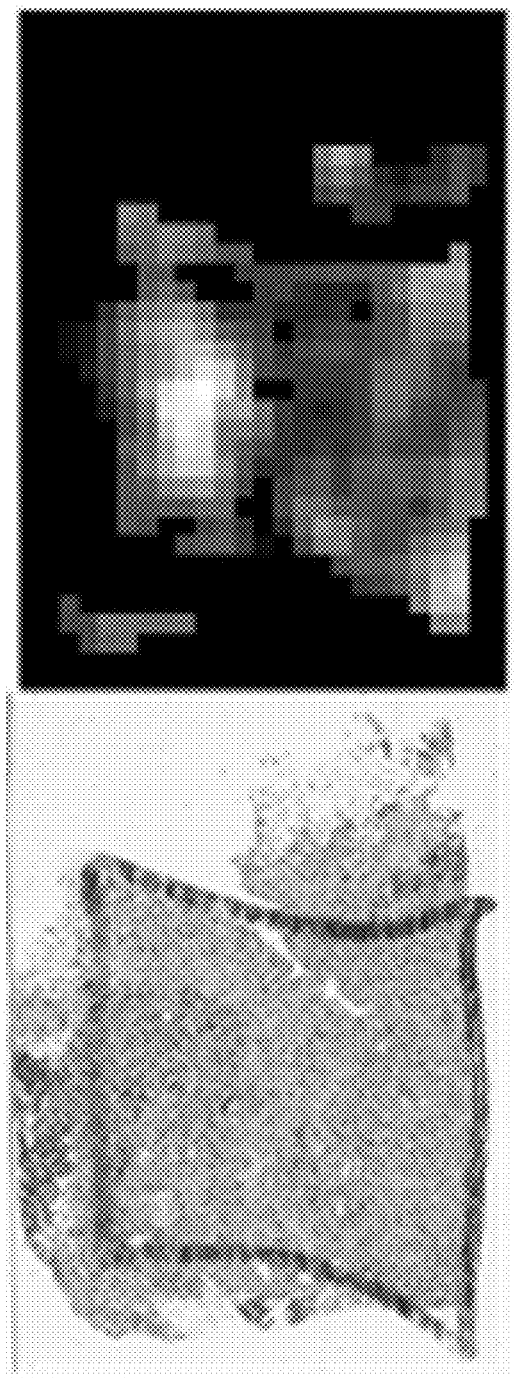
FIG. 3 depicts an example prostatectomy. Top: whole slide image and 1.25× magnification nuclear region heatmap per use case 4. The heatmap shows zero heat over the regions with blue pen mark, because these regions do not pass quality control, so they are assigned a default of zero nuclear regions. Bottom: regions of interest at various magnifications.
Figure 3:
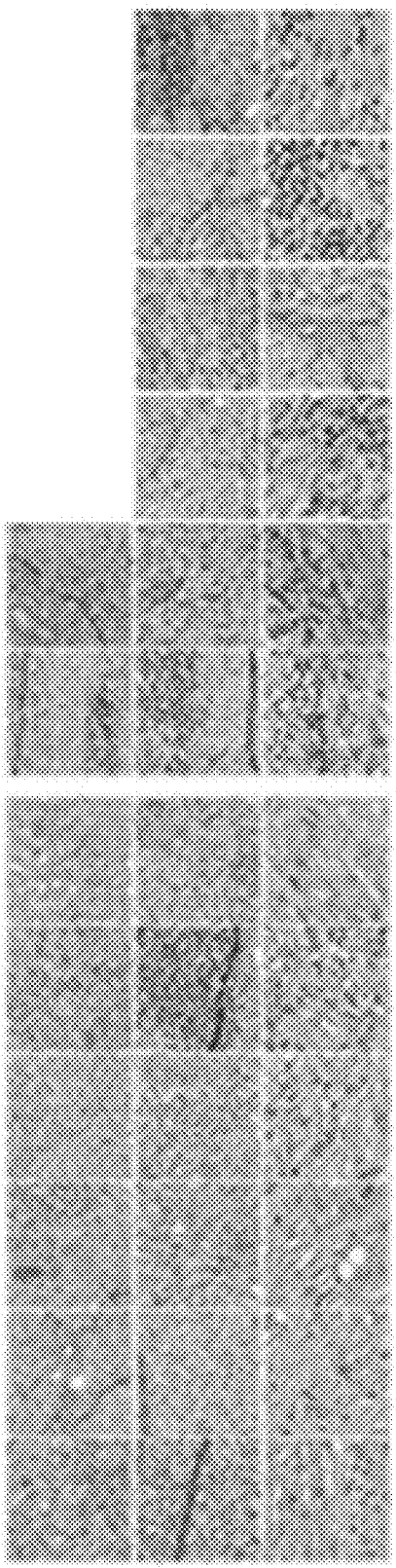
Figure 4:
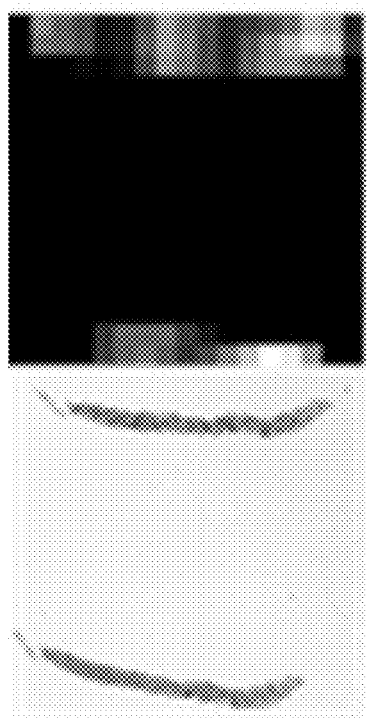
FIG. 4 depicts an example prostate needle biopsy. Top: whole slide image and 1.25× magnification nuclear region heatmap per use case 4. Bottom: regions of interest at various magnifications.
Figure 4:
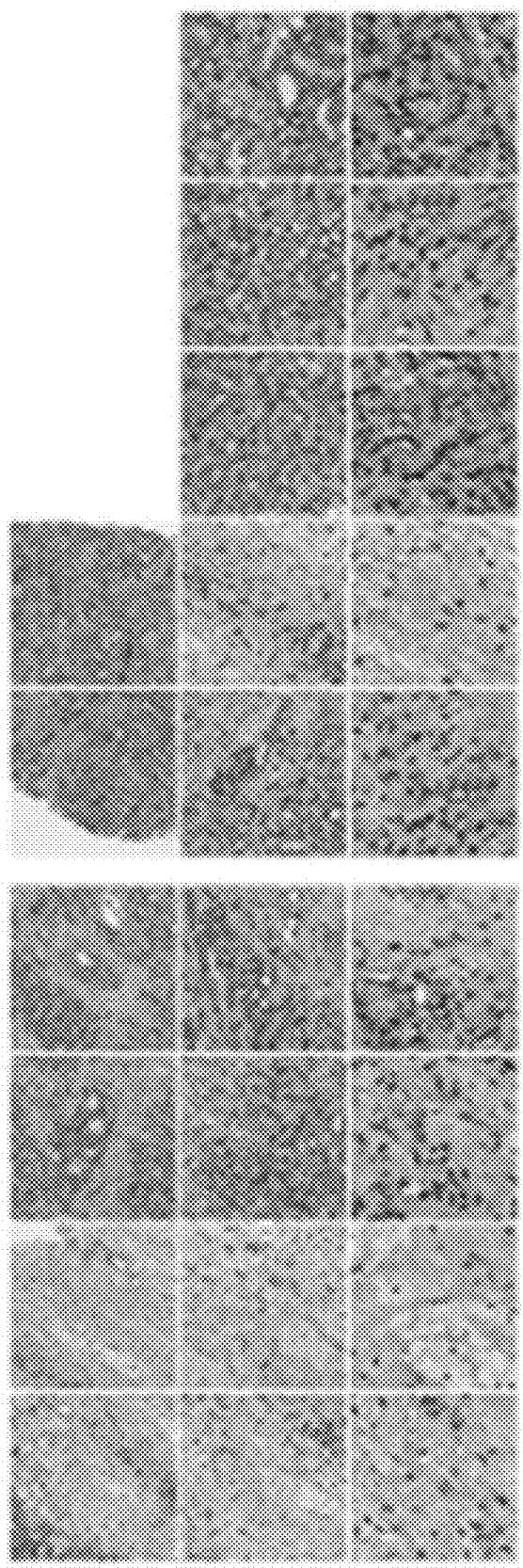
Figure 5:
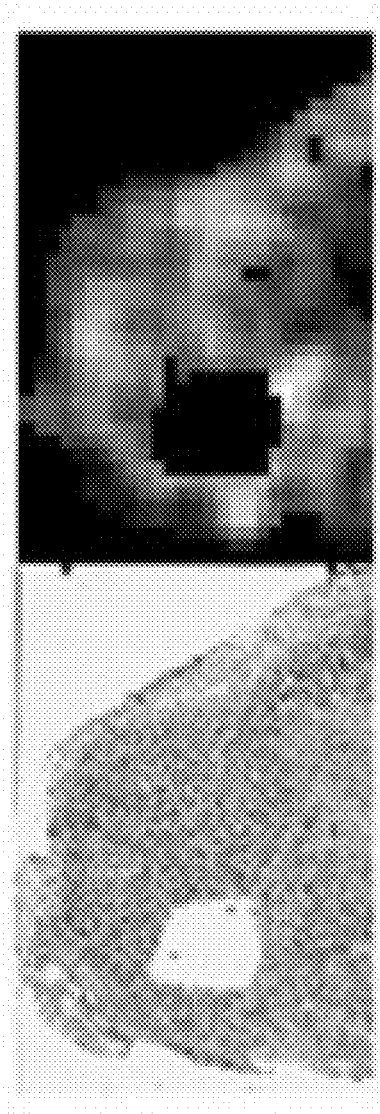
FIG. 5 depicts an example prostatectomy. Top: whole slide image and 1.25× magnification nuclear region heatmap per use case 4. Bottom: regions of interest at various magnifications.
Figure 5:
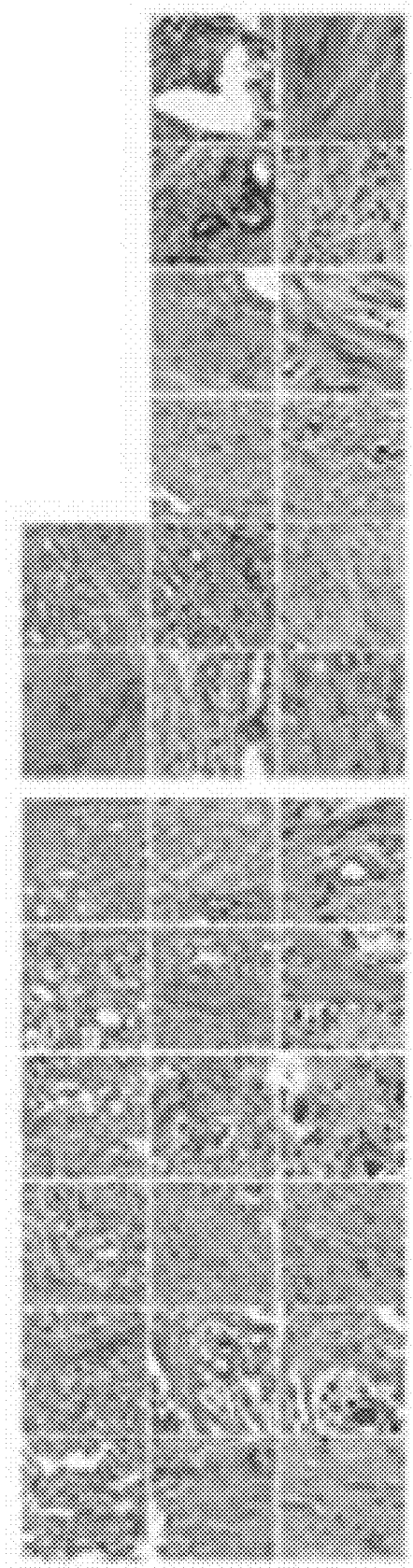
Figure 6:
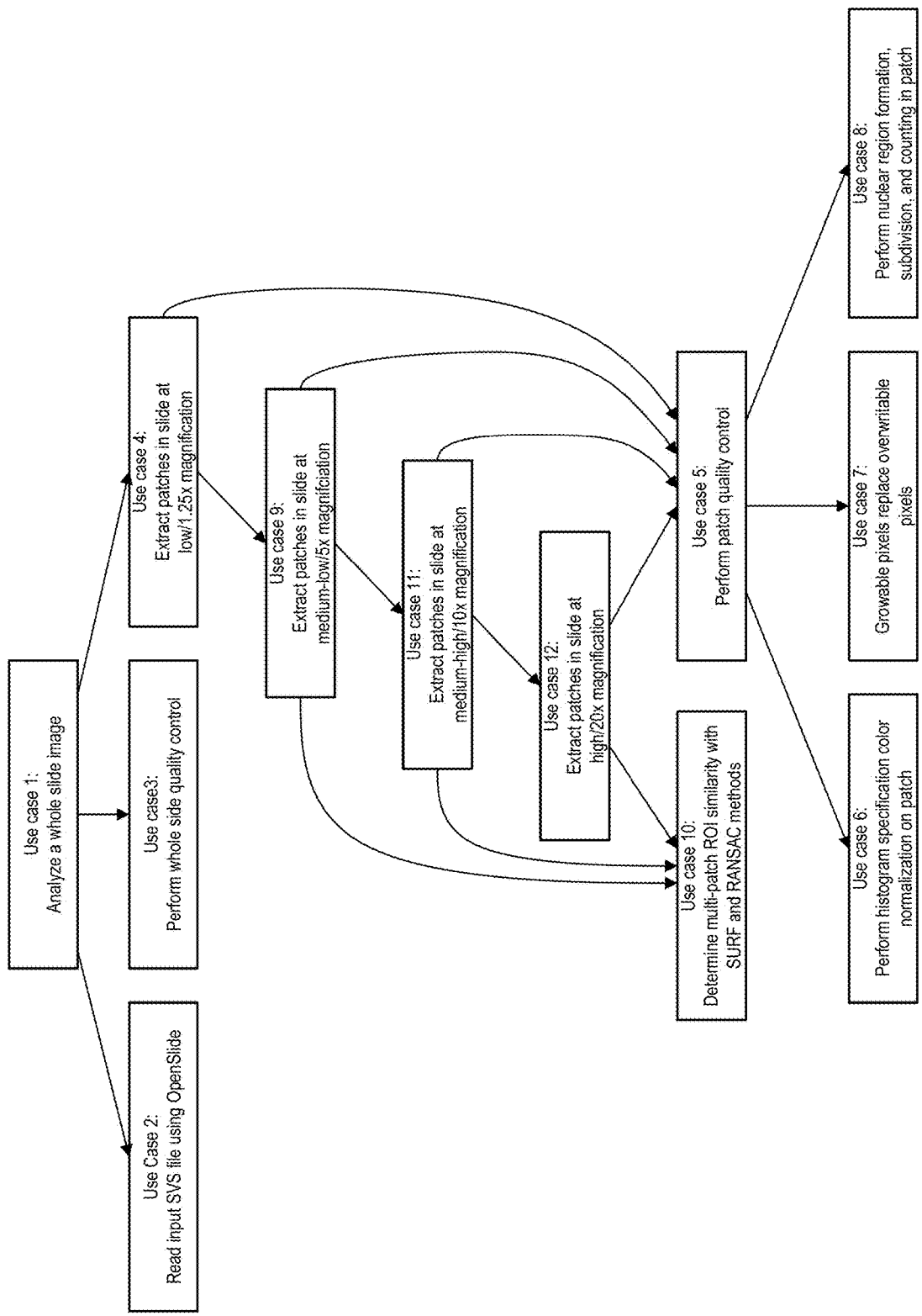
FIG. 6 depicts a flow diagram of a use case control. Analysis proceeds from use case 1. Multiple use cases may call a common use case for a common function, such as patch quality control or similarity.
Figure 7:
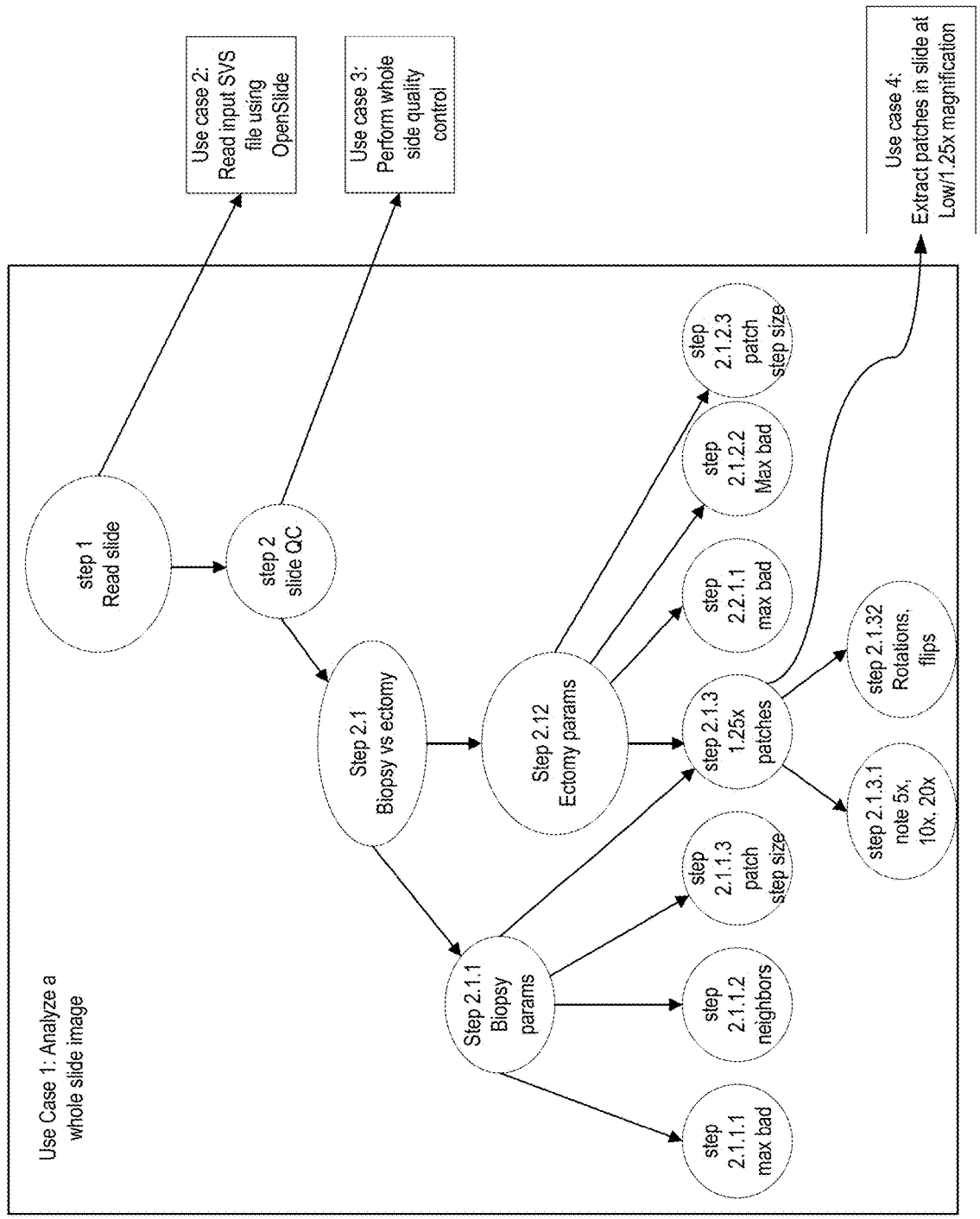
FIG. 7 depicts a flow diagram of a use case on analyzing whole slide images in accordance with an illustrative embodiments.
Figure 8:
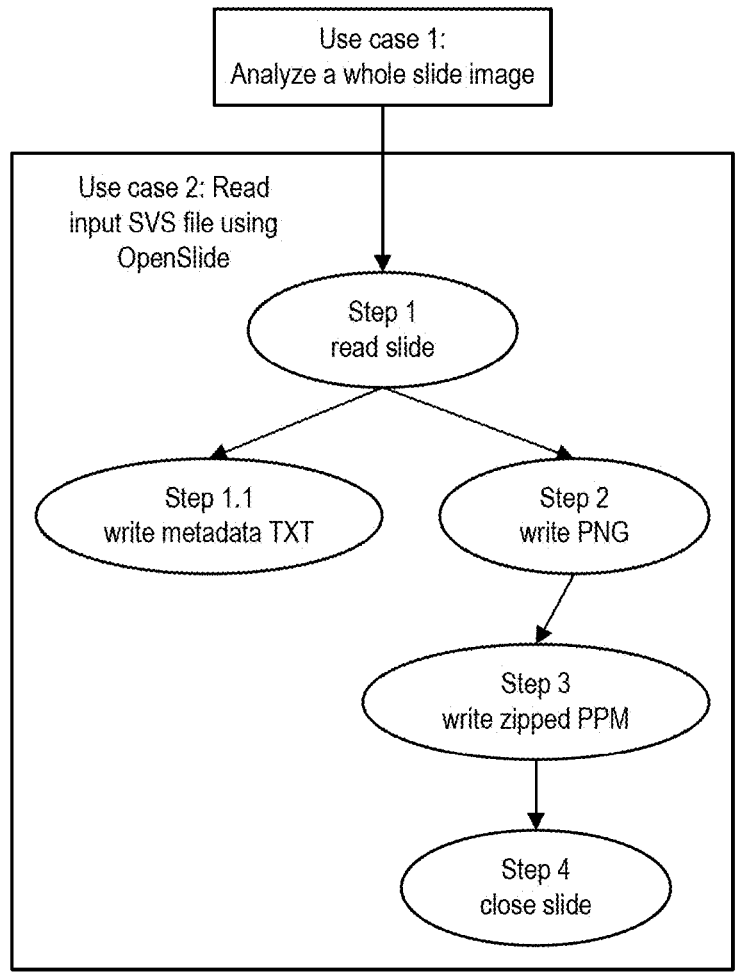
FIG. 8 depicts a flow diagram of a use case on reading input files in accordance with an illustrative embodiments.
Figure 9:
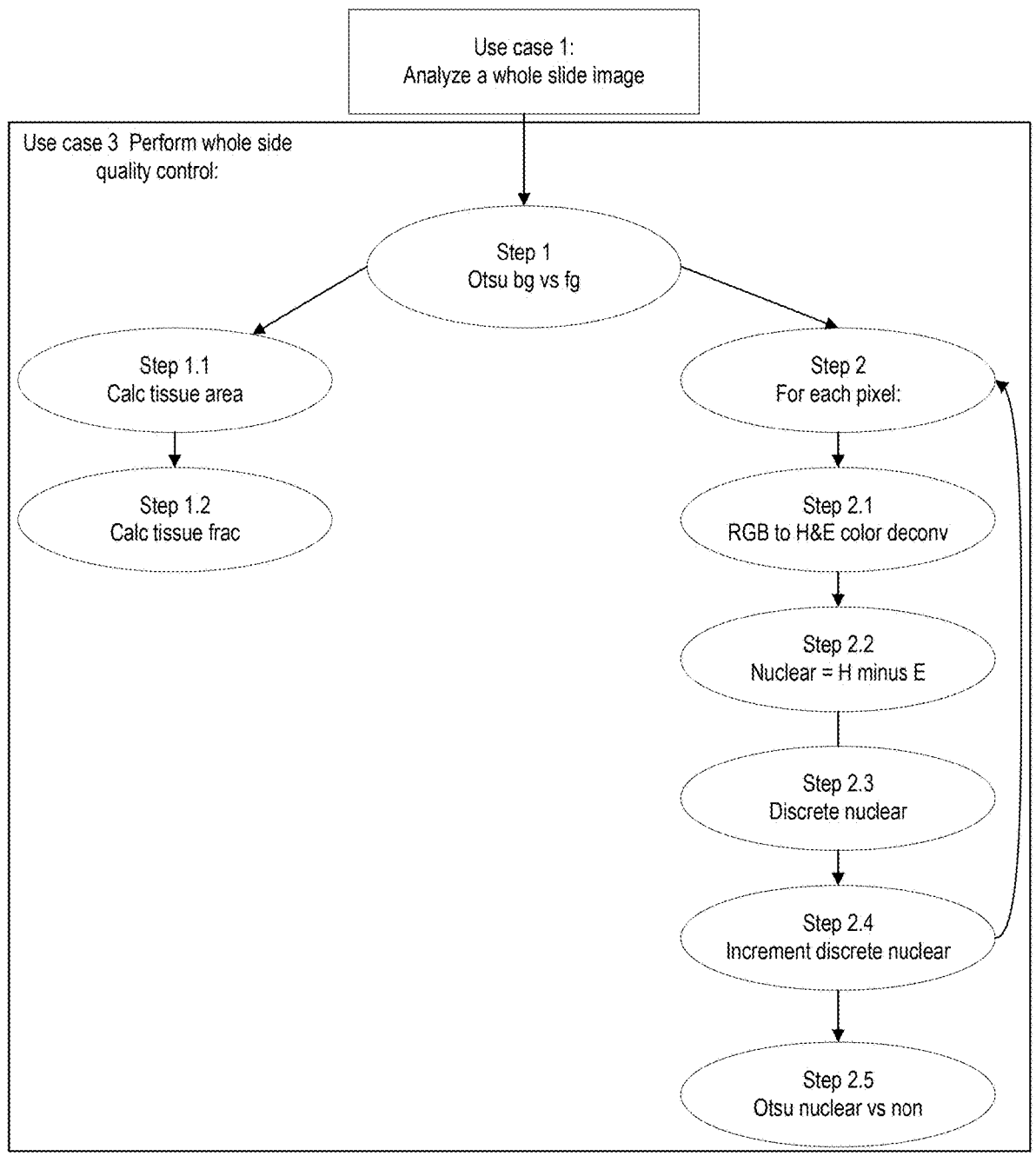
FIG. 9 depicts a flow diagram of a use case on in accordance with an illustrative embodiments.
Figure 10:
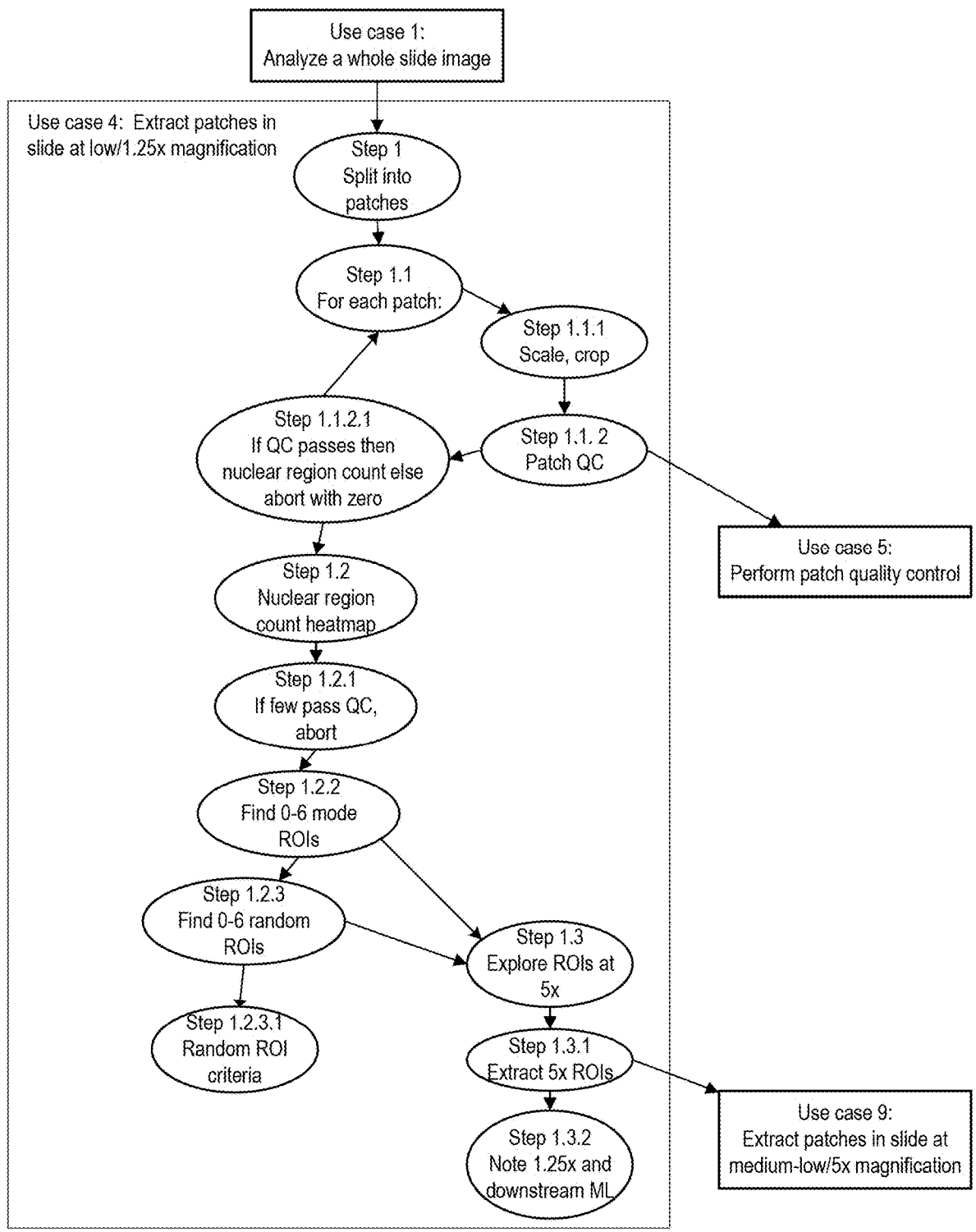
FIG. 10 depicts a flow diagram of a use case on extracting patches at 1.25× magnification in accordance with an illustrative embodiments.
Figure 11:
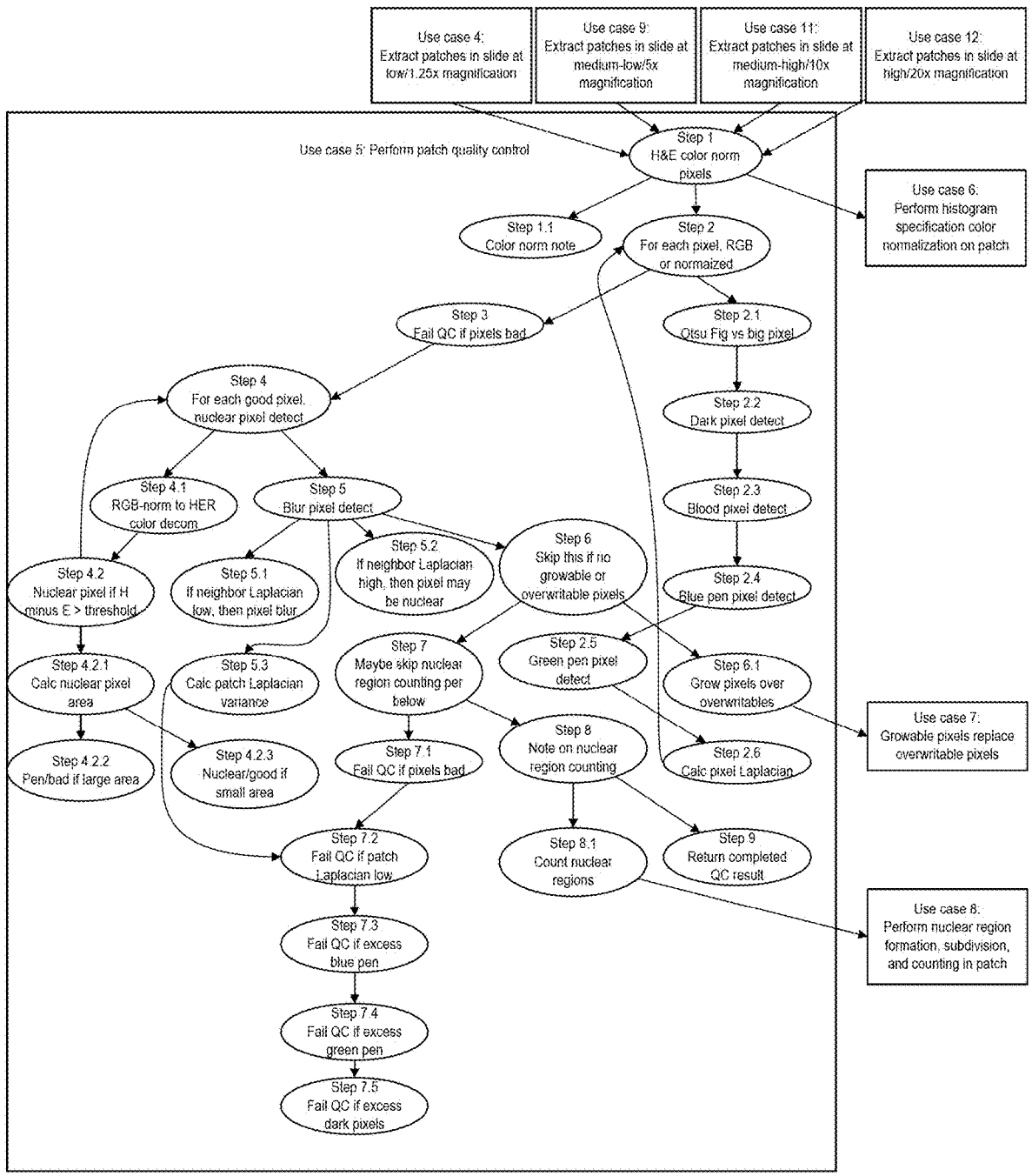
FIG. 11 depicts a flow diagram of a use case on performing patch quality control in accordance with an illustrative embodiments.
Figure 12:
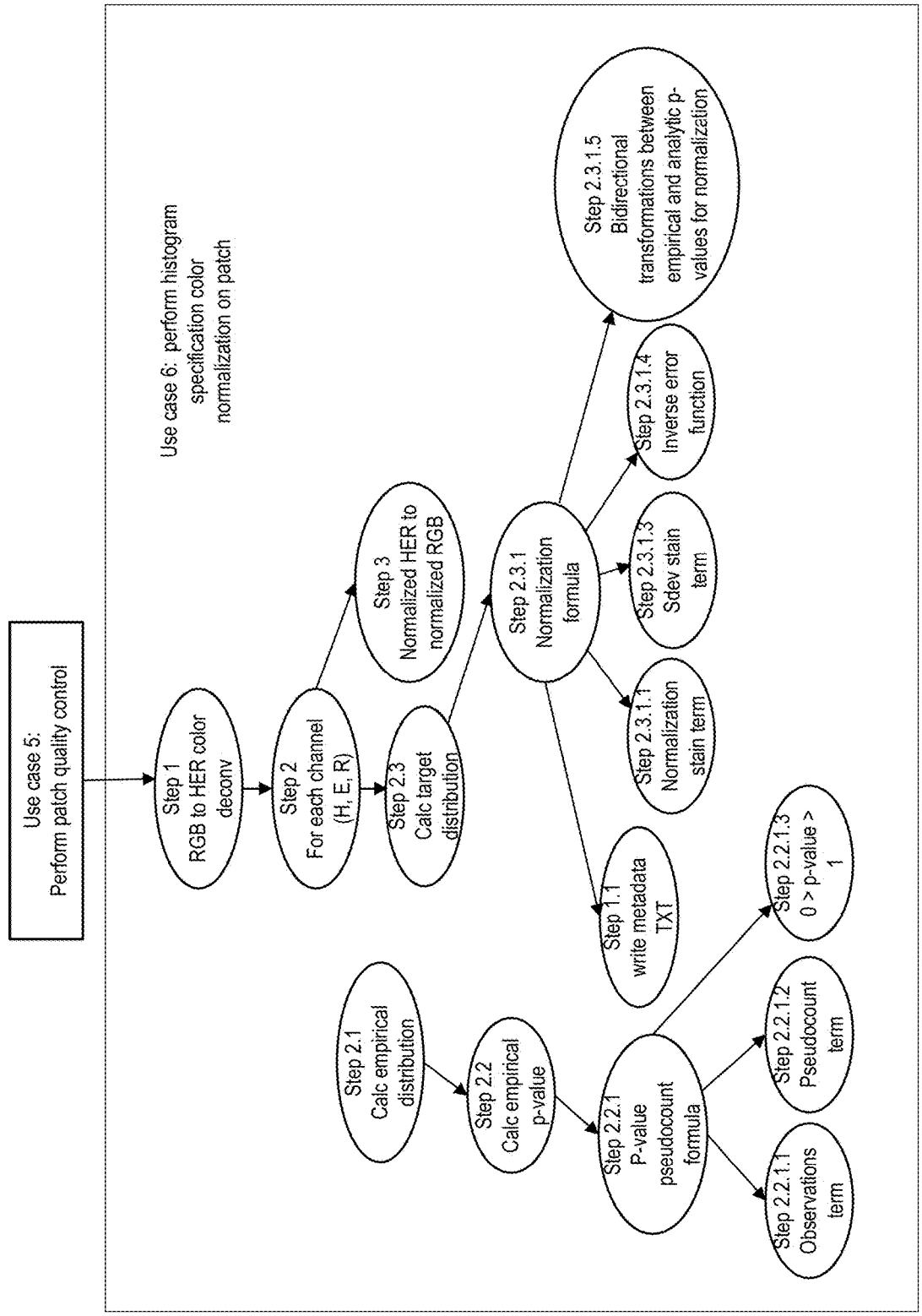
FIG. 12 depicts a flow diagram of a use case on performing histogram specification color normalization on patches in accordance with an illustrative embodiments.
Figure 13:
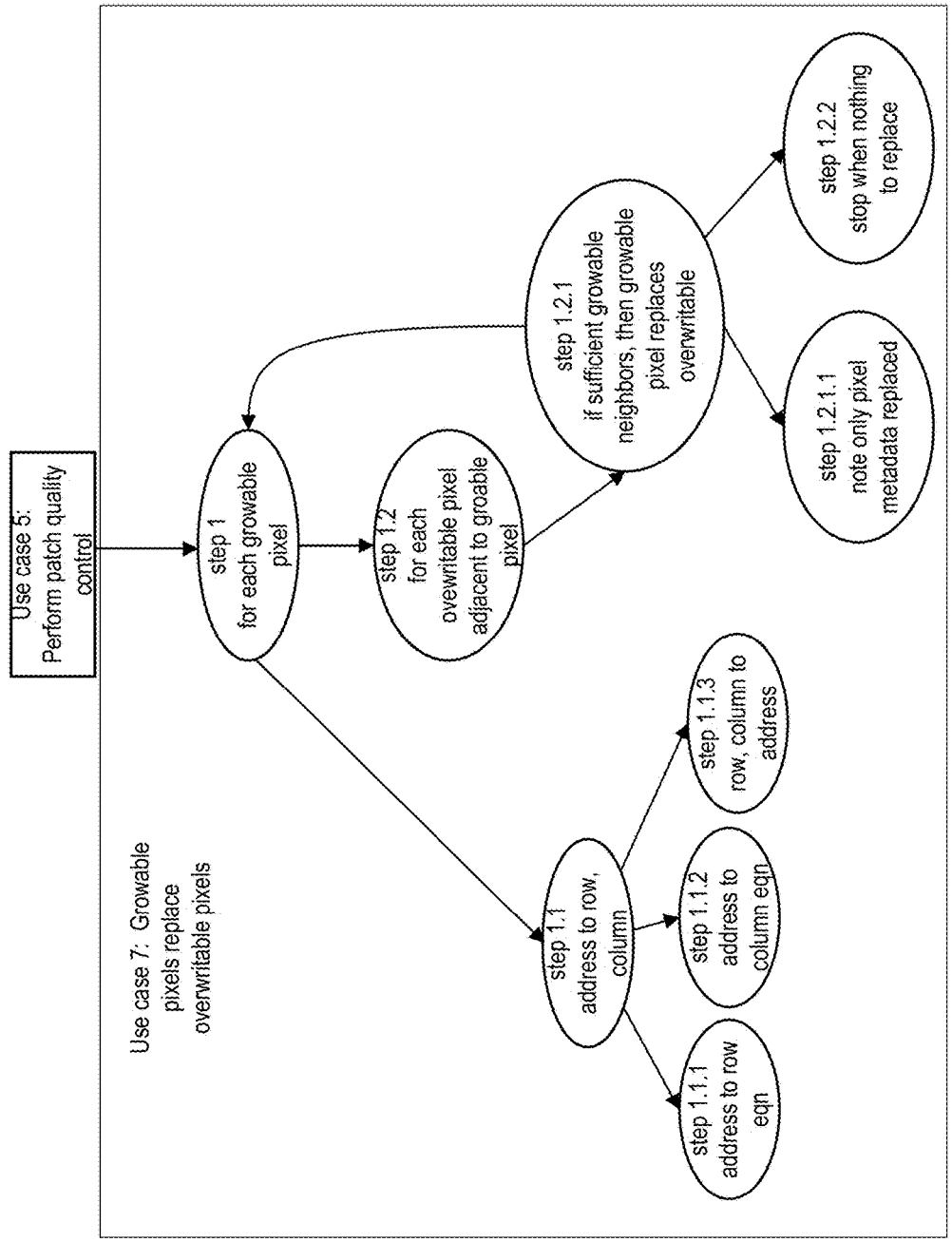
FIG. 13 depicts a flow diagram of a use case on replacing growable pixels with overwritables pixels in accordance with an illustrative embodiments.
Figure 14:
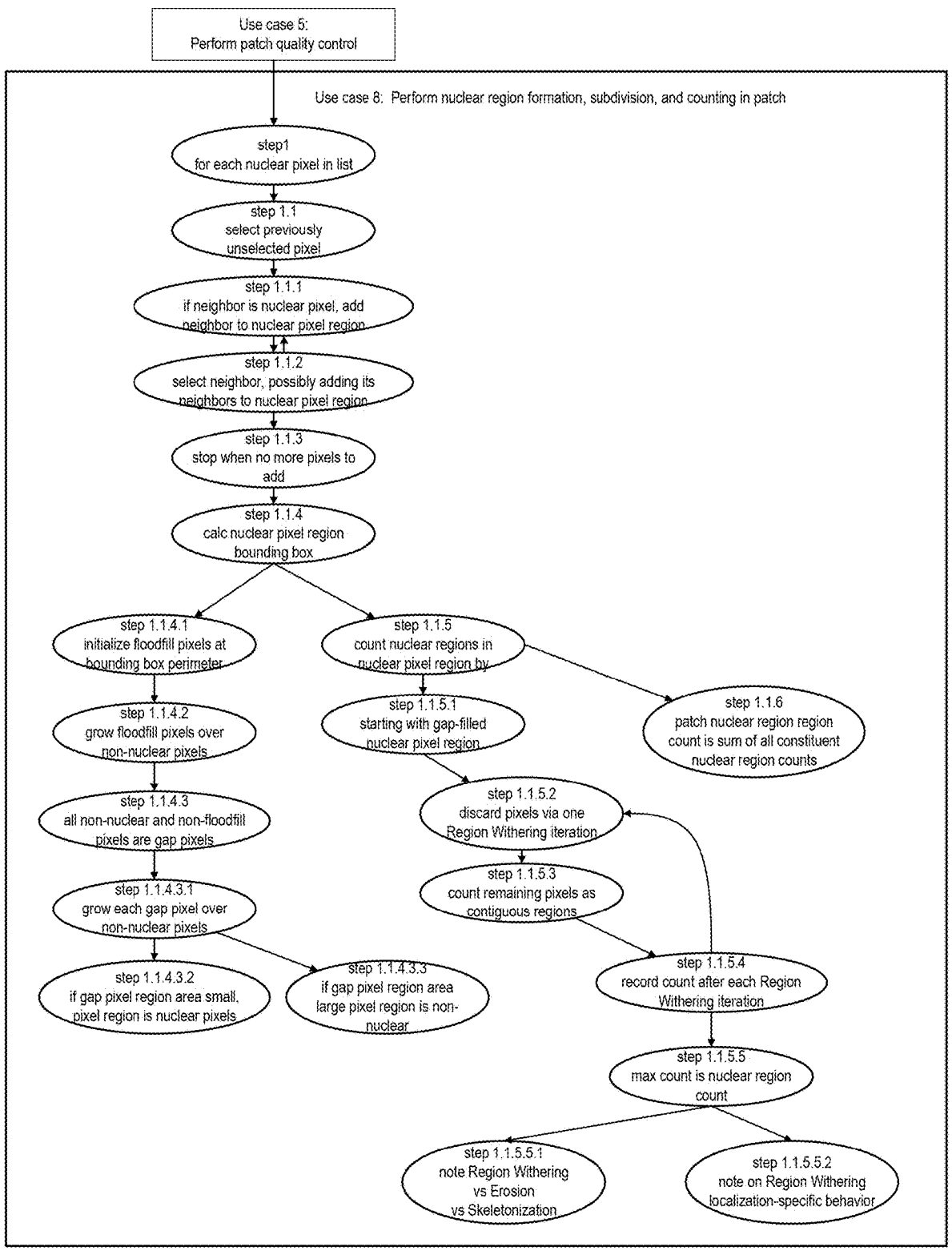
FIG. 14 depicts a flow diagram of a use case on performing nuclear region formation, subdivision, and counting in patches in accordance with an illustrative embodiments.
Figure 15:
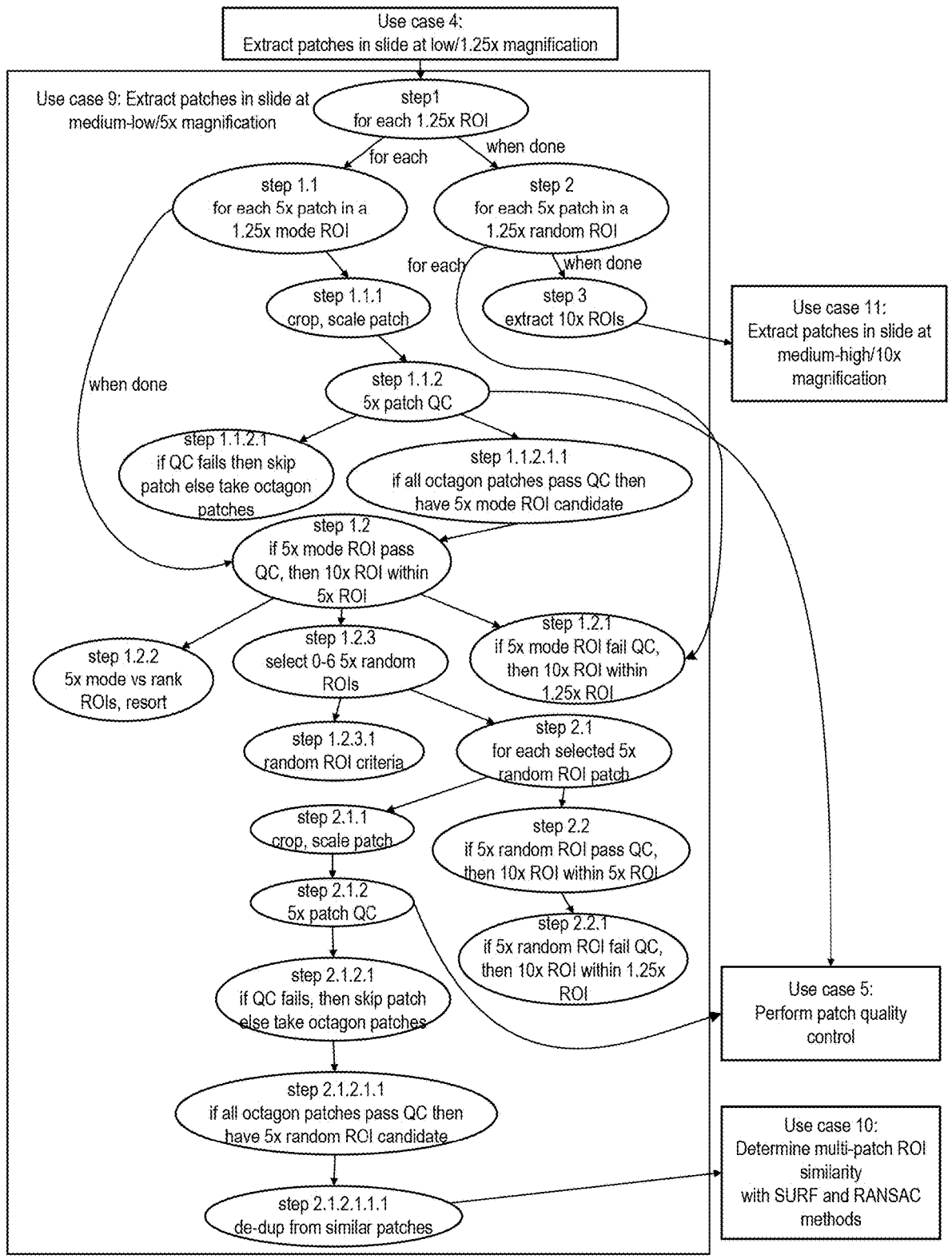
FIG. 15 depicts a flow diagram of a use case on extracting patches in a slide at 5× magnification in accordance with an illustrative embodiments.
Figure 16:
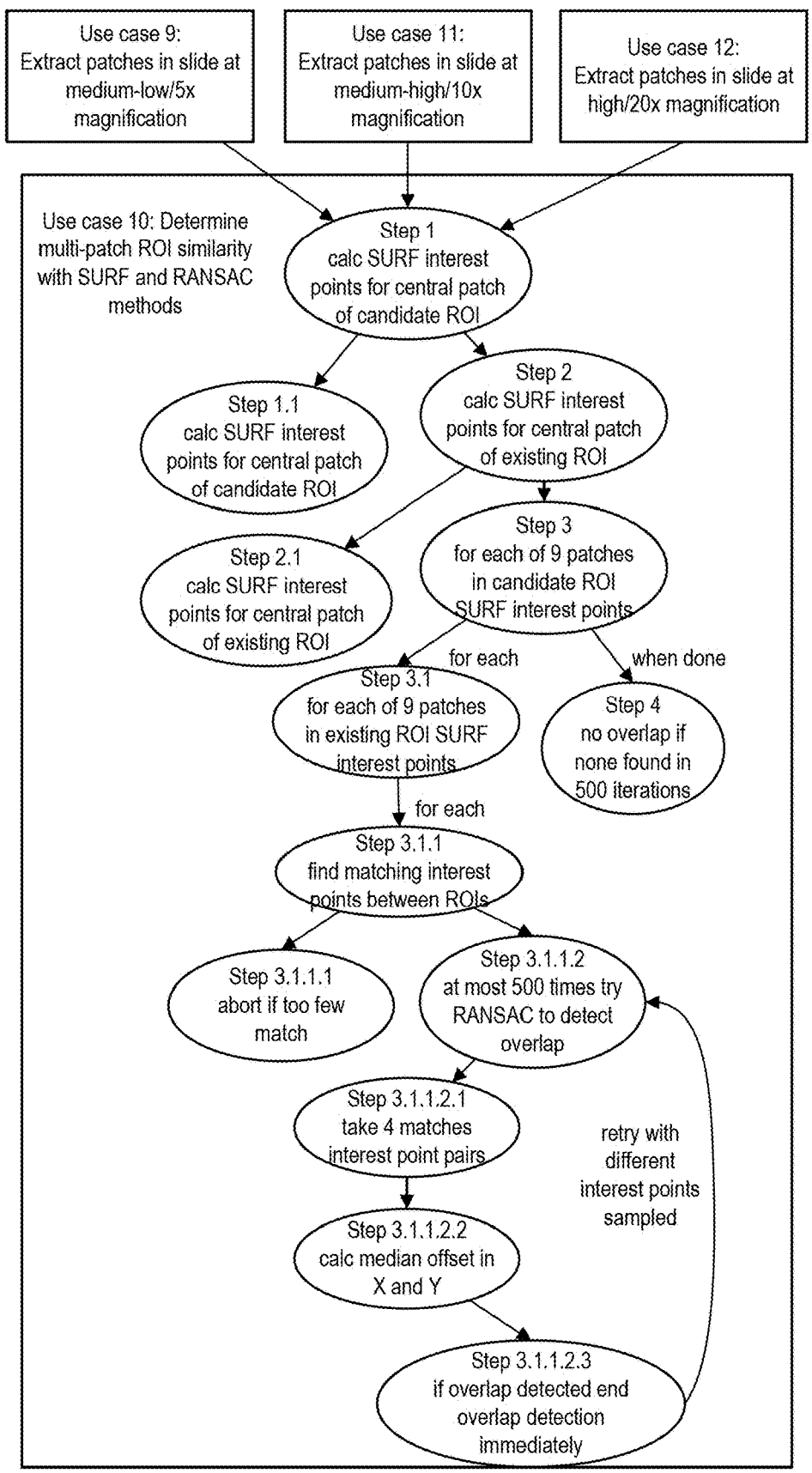
FIG. 16 depicts a flow diagram of a use case on determining multi-patch region of interest (ROI) similarity in accordance with an illustrative embodiments.
Figure 17:
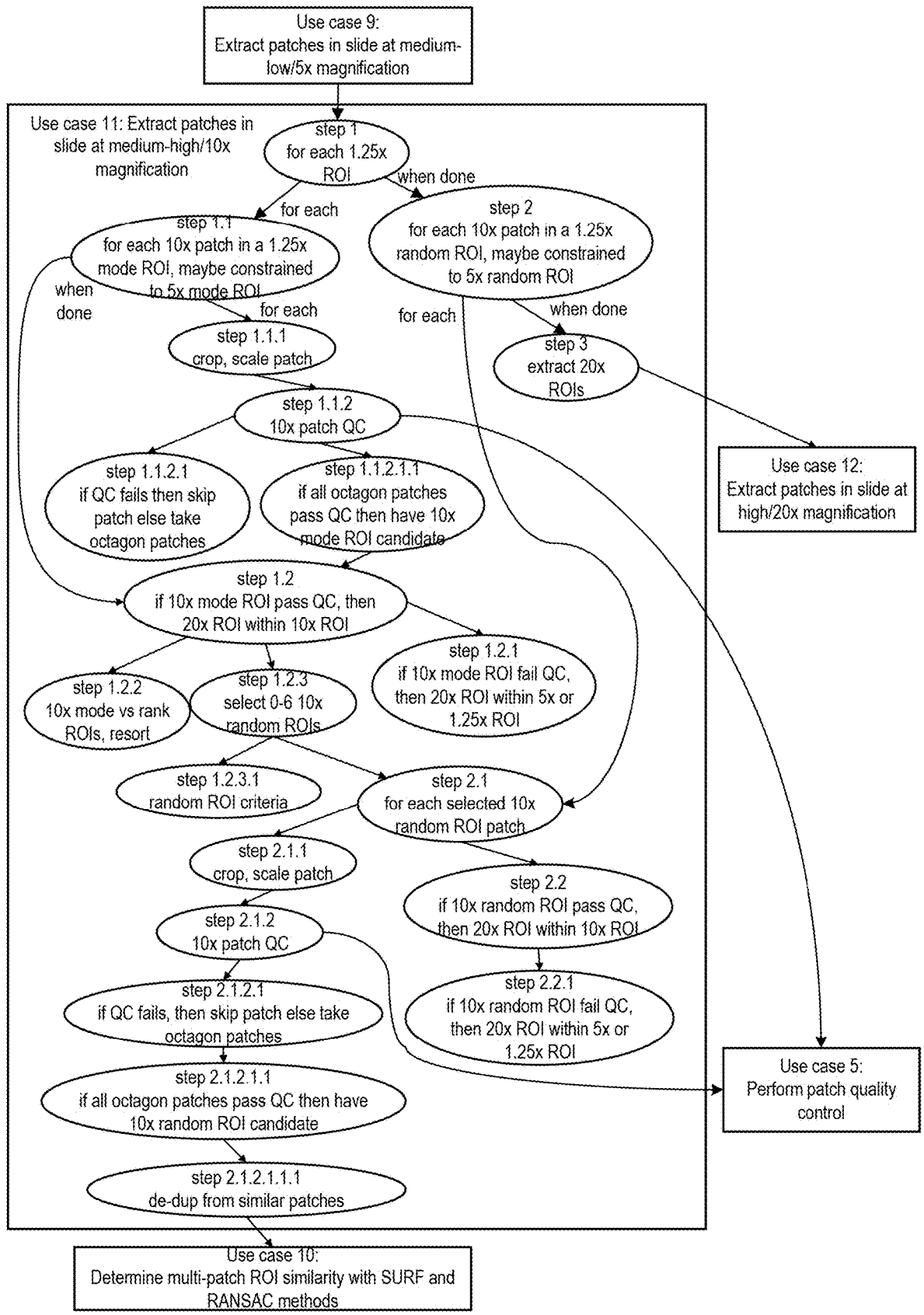
FIG. 17 depicts a flow diagram of a use case on extracting patches in a slide at 10× magnification in accordance with an illustrative embodiment.
Figure 18:
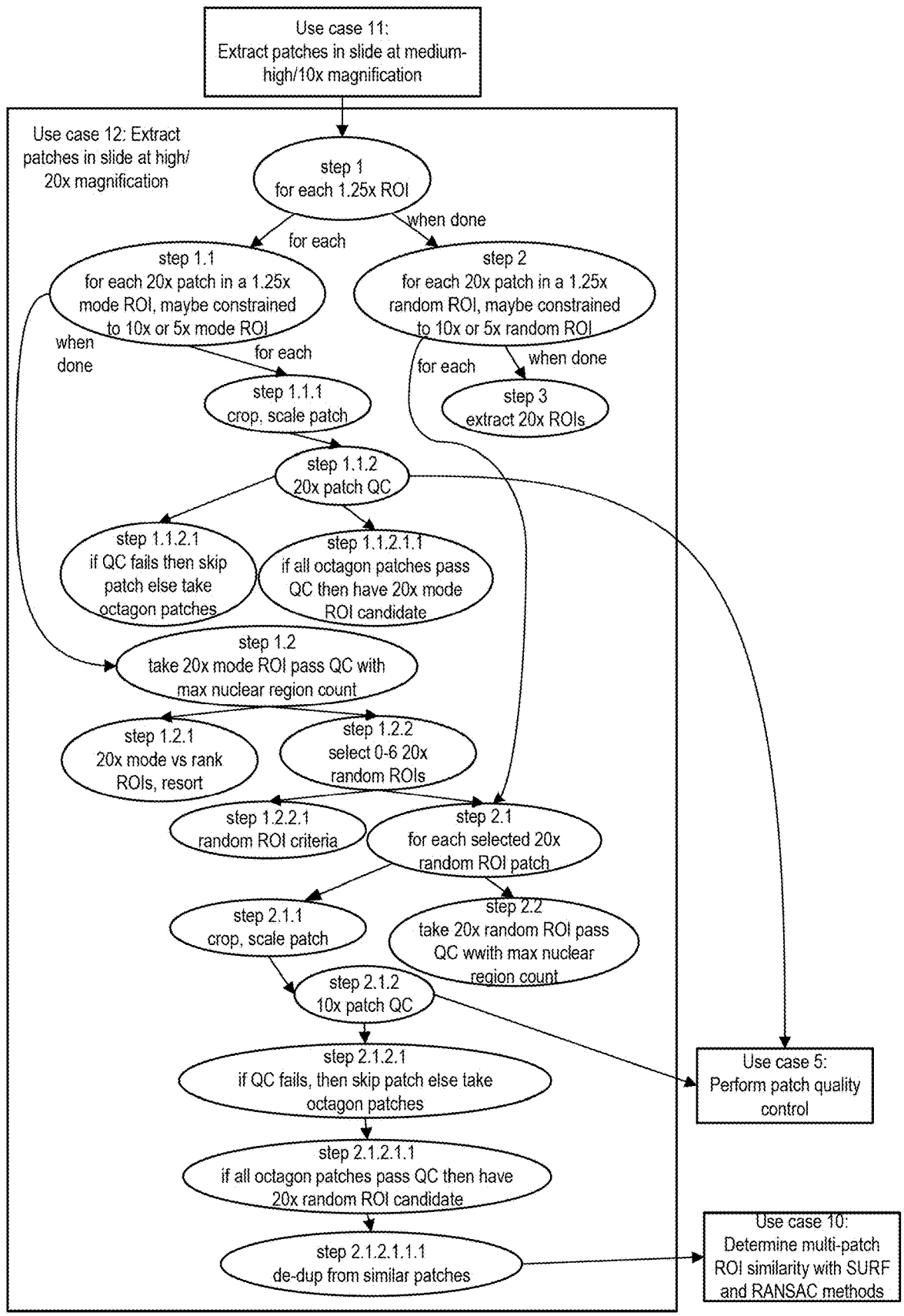
FIG. 18 depicts a flow diagram of a use case on extracting patches in a slide at 20× magnification in accordance with an illustrative embodiments.

The present techniques, including nuclear region counting, can allow nuclei-rich slide regions to be detected, segmented, and counted at any magnification. At low magnification, a nuclear region is a nuclear-rich gland structure. At high magnification, a nuclear region is a cell nucleus. So nuclear region counting allows whole slide image patches to be compared to each other within any magnification, for any magnification. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

Section A describes use cases for analyzing whole slide images;

Section B describes systems and methods of analyzing and performing quality control on whole slide images and extracted patches;

Section C describes a network environment and computing environment which may be useful for practicing various embodiments described herein.

A. Use Cases for Analyzing Whole Slide Images

Disclosed herein are machine vision techniques for this nuclear region counting. First, the conditional Region Growing uses three classes of pixels: growables, overwritables, and ignorables. Growable pixels grow over adjacent overwritable pixels, but do not grow over ignorable pixels. A pen may be defined as a growable pixel subtype, which can overwrite blur and nuclear pixels, because pen over the glass slide background may otherwise be called as blur, and pen may also be mistaken for nuclei, since hematoxylin is blue and nuclei strain strongly with hematoxylin. Growable pen allows larger regions of the slide to be discarded, minimizing the chance that pen occurs in a ROI. Second, the Floodfill operator is a type of conditional region growing, where pixels at the perimeter of a bounding box are growable, while some pixels in the box are overwritable or ignorable. By growing these pixels to overwrite foreground pixels and ignore nuclear pixels, small gaps within nuclear pixel regions are be identified and filled, to minimize the impact of noise in the image on nuclear region counting. Third, the Region Withering method iteratively applies an operator similar to Mathematical Morphology Erosion, but within a localized bounding box, to select the number of erosions that maximizes a nuclear region count within the bounding box, and requires a minimum number of pixels in a region to count. An image's overall nuclear region count is the sum of nuclear region counts within all the bounding boxes in an image, with erosions independently tuned within each bounding box. Nuclei may become densely packed in pairs, triplets, or more—and nuclei may have different sizes in different portions of the image. Thus Region Withering (i) does not apply much erosion to small nuclei pairs etc. that are already well-separated, to count all such nuclei, and (ii) does apply extensive erosion to large nuclei pairs etc. that are not well-separated, to count all of these nuclei as well. More erosion can logically separate nuclei, but only larger nuclei have enough pixels to persist after multiple iterations of erosion.

The white-box methods involve a number of parameters and simple algorithms to remove uninteresting regions, then enumerate nuclear region pixels outside said regions, and finally count regions of contiguous pixels rich in hematoxylin stain and poor in eosin stain, for the nuclear region count. These simple algorithm are described in detail as use cases, and outlined below:

Otsu's method is used over the entire slide to calculate the threshold intensity that separates grayscale pixel intensities into "foreground" and "background", where foreground is tissue and background is empty glass in the whole slide image.

An entire slide is bad if a minimum cross sectional area of tissue, rather than background, is not met. Empty slides are not interesting.

The steps below are part of per-tile quality control (QC). A ROI can comprise a central 256×256 pixel patch, with 8 surrounding 256×256 pixel patches. A ROI passes QC only if all patches in the ROI pass QC. A whole slide is split into a grid of central patches, and ROIs are formed by taking patches around a central patch. To minimize the chances of two ROIs overlapping, SURF interest points are calculated over all patches in the two ROIs of interest, and if RANSAC-based point set registration identifies overlap in patches of two ROIs, the second tentative ROI is discarded. Below are QC steps.

Because hematoxylin and eosin staining varies between slides and between protocols (e.g. frozen section slides and formalin fixed paraffin embedded (FFPE) slides), each patch extracted from a whole slide image is transformed by color histogram specification in heatoxylin and eosin stain space. Pixel RGB channel values are converted to hematoxylin, eosin, and residual channels (HER), and the distribution of HER intensities is transformed to conform to a Gaussian distribution with a specified mean and standard deviation, before being transformed back to RGB. In this approach, understained or overstained slides are computationally normalized to have a similar amount of apparent stain. This improves nuclear pixel detection.

In RGB space, a pixel is background if the grayscale pixel intensity is above the Otsu threshold. This pixel is "bad". For example, a bad pixel may not contain information that is relevant to cancer foci or other regions of interest in the image. Bad pixels can represent regions that do not include relevant information, and can thus be excluded from further processing steps without affecting the performance or accuracy of other processing aspects described herein. In RGB space, a pixel is dark (either black pen or tissue fold) if red, green, and blue channels for a pixel are below a threshold, e.g. 10, where each channel takes a value between 0 and 255. This pixel is "growable" and "bad".

In RGB space, a pixel is blood if the red channel is greater than blue plus green channels. This may also capture red pen, but in practice red pen is rarely used. This pixel is "bad" but is not "growable". In RGB space, a pixel is blue pen if the blue channel is greater than red plus green channels. This pixel is "growable" and "bad". In RGB space, a pixel is green if the green channel is greater than red plus blue channels. This pixel is "growable" and "bad".

In HER-normalized RGB space, A pixel is nuclear if the hematoxylin signal minus the eosin signal exceeds a threshold and has not been "grown over" by growable pixels. This Region Growing is described more in the next step, for blur pixels, which also may be "grown over". Hematoxylin and eosin signals are derived through color deconvolution and are normalized via color histogram specification. For nuclear region counting, a contiguous region of nuclear pixels is progressively Region Withered from its perimeter one pixel-width at a time to disentangle touching nuclear regions, e.g. an "8"-shaped region may be withered to a region shaped as a ":" which counts as two nuclear regions rather than one. The cross sectional area of Region Withered regions must be above a threshold to be counted, i.e. a region smaller than half of the cross sectional area of a nucleus cannot be a nuclear region. The maximum such region count after all Region Erosions are performed is taken to be the true region count for this set of nuclear pixels. This Region Erosion does not change the pixel labels, e.g. nuclear pixels remain nuclear pixels. Region Erosion is only used for region counting, and is the opposite of Region Growing—much like how Dilation and Erosion are opposite operations in Mathematical Morphology.

In RGB space, a pixel is blur if the 3×3 Laplacian kernel [0,1,0; 1, −4, 1; 0, 1, 0] has a value less than a specified threshold, as do all adjacent pixels, in grayscale. This pixel is "bad". This pixel may be "grown over" by a growable pixel, e.g. if a blur pixel is adjacent to 3 or more growable pixels, the blur pixel is replaced with the growable pixel, e.g. pen. In this way, light blue pixels at the edge of a blue pen mark over the slide background are still called blue, even if the blue channel intensity is less than the red plus green channel intensities. The light blue pixels would otherwise have low complexity and be mistakenly called blur.

If the cross-sectional area of a contiguous group of dark/pen pixels is below a threshold, then call this area a nuclear region instead, e.g. a small blue spot is actually a nucleus rather than blue pen.

An entire patch is bad if the number of bad pixels exceeds a threshold.

An entire patch is bad if the Laplacian kernel variance has not exceeded a threshold. Slides of uniform blurred pink are not interesting.

An entire slide is bad if a minimum cross sectional area of tissue, rather than background, is not met. Empty slides are not interesting.

This present disclosure provides per-pixel labels of background, foreground, pen, blur, blood, tissue folds, dark smudges, nuclei. Moreover nuclear regions are counted to give an overall "goodness" measure of a patch and ROI. This approach uses color histogram specification to normalize apparent hematoxylin and eosin staining, to improve nuclear pixel detection. All methods are algorithmic, interpretable, and "white-box", in contrast to opaque machine learning methods. White-box approaches may be more amenable to application in the clinic, because there is a clear mathematical definition of how every pixel is categorized. The concept of "nuclear regions" may be defined, which can occur at low magnifications as glands and high magnifications as cell nuclei, to compare the "goodness" of ROIs within any magnification.

Referring now to FIGS. 1-5, depicted are biopsies performed in accordance with the techniques detailed herein. Referring now to FIGS. 6-18, depicted are flow diagrams of use cases. The details of each use case are provided herein below.

Use Case 1: Analyze a Whole Slide Image
Inputs:
  1. Whole slide image file, e.g. an Aperio SVS file.
  2. Thresholds and other parameters for quality control, color normalization, etc.
Outputs:
  1. Coordinates and PNG image files of regions of interest.
Alternate Outputs:
  1. If no ROIs are found at low magnification (1.25×) then analysis aborts early, without processing higher magnifications, and no coordinates or PNG files for ROIs are written.
Steps:
  1. Read input SVS file using OpenSlide (use case 2).
  2. Perform whole side quality control (use case 3).
  2.1. If total cross-sectional area if below a threshold, then treat the slide as a needle biopsy, otherwise treat the slide as an ectomy. Needle biopsies have very little tissue in the slide, so further analysis should conservatively discard slide regions. However, ectomies have a great deal of tissue in the slide, so further analysis should liberally discard region regions. This means some parameters for analysis will differ, namely patch extraction.
    2.1.1. For needle biopsies, patch extraction parameters are:
      2.1.1.1. The max allowed fraction of "bad" pixels in a patch is 0.9, so much of the patch can be background etc. Needle biopsies are thin strips of tissue and cover little of the slide, and cover little of the patch at low/1.25× magnification.
      2.1.1.2. A minimum of 4 of a pixel's 8 neighbor pixels (1 above, 1 below, 1 left, 1 right, and 4 diagonals) must be "growable", e.g. pen/marker/dark, to "grow over" an overwriteable pixel, e.g. blur/nuclear. In this way, growth is conservative, to not overwrite too many pixels. For needle biopsies, which have very little tissue in the slide, it is better to risk calling some pixels as not pen/marker/dark when they are, than being too aggressive and overwriting otherwise valid tissue with false pen/marker/dark pixel labels to potentially miss regions of interest.
      2.1.1.3. The step size for patch extraction is 200, so every 200 pixels a patch will be extracted and evaluated as a potential region of interest. Little steps like this allow regions of interest to fit well within the limited tissue available in needle biopsies, at a computational expense of trying many patches in a slide. This expense is mitigated by fast background detection with Otsu's method in a patch, and aborting further analysis in the patch if too many pixels in the patch is background.
    2.1.2. For ectomies, patch extraction parameters are:
      2.1.2.1. The max allowed fraction of "bad" pixels in a patch is 0.5, so the patch must be half foreground or nuclear pixels or more. Blur, pen, tissue fold, background, and other "bad" pixels must be half of the pixels in a patch or fewer. Ectomies are large portions of tissue that cover the slide, but because there is more tissue, there is a greater chance that some tissue folded, is blurred, etc. The 0.5 threshold here stringently discards patches, and there are plenty of patches to extract.
      2.1.2.2. A minimum of 3 of a pixel's 8 neighbor pixels (1 above, 1 below, 1 left, 1 right, and 4 diagonals) must be "growable", e.g. pen/marker/dark, to "grow over" an overwriteable pixel, e.g. blur/nuclear. In this way, growth is aggressive, potentially overwriting large portions of nuclear pixels as pen/marker/dark and discarding these patches. For ectomies, which have much tissue in the slide, it is better to risk discarding too many patches as not pen/marker/dark when they are not, than being too conservative and including patches that actually have pen/marker/dark pixels to potentially confound the regions of interest in the slide with bad pixels. There are plenty of patches.
      2.1.2.3. The step size for patch extraction is 400, so every 400 pixels a patch will be extracted and evaluated as a potential region of interest. Large steps like this allow computationally efficient patch extraction, because fewer patches are extracted. There is plenty of tissue, so regions of interest will still be found in the slide.
    2.1.3. Extract patches in slide at low/1.25× magnification (use case 4), and whole slide image analysis aborts if too few ROIs found in slide.
      2.1.3.1. Note the above use case 4 will involve extracting patches at 5× (use case 9), 10× (use case 11), and 20× (use case 12) magnifications as well.
      2.1.3.2. All mode ROI and random ROI images will be written to disk, including coordinates as well as image transformations such as rotations and flips.

Use Case 2: Read Input SVS File Using Openslide
Inputs:
  1. Whole slide image file, e.g. an Aperio SVS file.
Outputs:
  1. A TXT file of SVS file metadata.
  2. A PNG file of SVS image at low magnification.
  3. A zipped PPM file of SVS image at high magnification.
Steps:
  1. Read SVS file metadata for magnifications used in slide scan, e.g. how many microns in the glass slide there are per digital slide pixel.
    1.1. Write all SVS metadata to a TXT file.
  2. Write SVS level 1 to a PNG file. This PNG file compresses well, and many software libraries can reliably read PNG. The PNG file is used as a cache of the whole slide for region of interest identification a low power (1.25×).
  3. Write SVS level 0 to a zipped PPM file. There are too many pixels to fit into a PNG file, but this zipped PPM file is a full description of every pixel in the slide. PPM files are plain text, are easily readable, and are compressible.
  4. Close the SVS file and OpenSlide. The SVS is no longer necessary and will no longer be used. This avoids any software defects in OpenSlide from potentially crashing the analysis software later in the analysis.

Use Case 3: Perform Whole Slide Quality Control
Inputs:
  1. A PNG file of SVS image at low magnification.
Outputs:
  1. Otsu's method threshold for background/foreground pixel classification.
  2. Total cross-sectional area of tissue on slide.

3. Fraction of total pixels in the slide that are foreground.

4. Otsu's method threshold for nuclear/nonnuclear pixel classification.

Steps:

1. On PNG file of SVS image at low magnification, for each pixel convert the RGB value to grayscale, then use Otsu's method to calculate the threshold that separates light from dark pixels, i.e. slide background from foreground pixels, i.e. empty glass from tissue pixels.

1.1. Calculate the total cross-sectional area of tissue on the slide, which is the number of foreground pixels.

1.2. Calculate the fraction of total pixels in the slide that are foreground, which is the number of foreground pixels divided by the total number of pixels.

2. One PNG file of SVS image at low magnification, for each pixel:

2.1. perform color deconvolution from RGB color space to hematoxylin and eosin (H&E) stain space, then 2.2. subtract the eosin intensity value from the hematoxylin intensity value at that pixel, this difference being the "nuclear intensity", then 2.3. rescale and round this nuclear intensity to be an integer between 0 and 255, which is the "discretized nuclear intensity", then 2.4. increment by one the counter for this discretized nuclear intensity, i.e. there are 256 counters, one for each possible discretized nuclear intensity, to computer an overall histogram of such intensities for the whole slide image, then 2.5. use Otsu's method on this histogram to calculate the threshold separating nuclear from non-nuclear pixels, i.e. from heavily and primarily hematoxylin-stained pixels from lightly hematoxylin-stained pixels or heavily eosin-stained pixels, i.e. nuclei-related pixels from stroma-related pixels.

Use Case 4: Extract Patches in Slide at Low/1.25× Magnification

Inputs:

1. A PNG file of SVS image at low magnification.

2. Max bad pixel fraction in patch (biopsy=0.9, ectomy=0.5).

3. Growable pixel neighbor count threshold (biopsy=4, ectomy=3).

4. Patch extraction step size (both biopsy=400 and ectomy=400, since magnification low).

5. Patch size of 800 pixels.

Outputs:

1. Coordinates of top (at most) six "mode" ROIs at 1.25×, which pass patch quality control and have the greatest nuclear region count in the slide of all ROIs, and each "mode" has a greater nuclear region count than adjacent patches at low/1.25× magnification.

2. Coordinates of (at most) six "random" ROIs at 1.25×, which pass patch quality control, which are not modes, and which are not adjacent to modes.

Alternate Outputs:

1. If fewer than 10 (ten) ROIs are found at low magnification (1.25×) because not patches pass quality control, then slide analysis aborts early, without processing higher magnifications, and no coordinates or PNG files for ROIs are written. Slide is too empty or confounded with blur/pen/etc. to process.

Steps:

1. The PNG file of SVS image at low magnification is calculated to be split into overlapping patches of size 800×800 pixels (px), which overlap by at least 400 pixels on a side, where the patch extraction step size is 400. So the patch immediately to the right of a patch will share at least 800×400px. The patches will evenly span slide edge to slide edge, with patches overlapping slightly more to cover this space evenly as needed, using the minimum possible number of patches.

1.1. For each of these patches:

1.1.1. Take the center crop of 512×512px of the 800×800px patch, and scale the 512×512px to 256×256px. This allows whole slide images scanned at higher resolution (in microns per pixel (mpp)) to be downsampled. For most slides, Memorial Sloan Kettering Cancer Center*MSKCC) scans its slides at half the resolution (0.5 mpp) of The Cancer Genome Atlas (TCGA) (0.25 mpp). So MSKCC slides are first scaled up 200% to "double" their resolution, then scaled down 50% for effectively unchanged resolution (still 0.5 mpp), while TCGA slides are not scaled up but are scaled down 50% to effectively halve their resolution (originally 0.25 mpp, now 0.5 mpp). This procedure leaves MSKCC and TCGA slides at the same effective resolution for analysis (0.5 mpp). Also, a center 512×512px may be rotated any number of degrees and still fit within the contained 800×800px image, which is how rotated patches are sampled.

1.1.2. Perform patch quality control (use case 5) on the 256×256px patch.

1.1.2.1. If patch QC fails, record a nuclear region count of zero for this patch. If patch QC passes, record the nuclear region count.

1.2. After every patch has QC run in this way, with a nuclear region counted for each patch, this "heatmap" of nuclear region counts may be visualized and analyzed computationally.

1.2.1. If fewer than 10 patches has passed QC, then patch extraction terminates early (use case 4), and the entire slide's quality control fails (use case 3), because insufficient tissue passing QC is available in the slide. This can occur for largely empty slides, or slides for which stain is poured over the slide resulting in large streaks of black throughout.

1.2.2. If a patch has a greater nuclear region count than its 8 neighbors (1 above, 1 below, 1 left, 1 right, and 4 diagonal), the patch is a "mode". This technique is similar to the mean shift algorithm with a very small kernel size, which is a mode-seeking algorithm. The modes discovered in the method are sorted by nuclear region count, with the top 6 (six) such modes being used as ROIs for the slide. If fewer than 6 mode ROIs exist in the slide, then that many mode ROIs will be used.

1.2.3. After mode ROIs have been selected, up to 6 "random" ROIs are selected sequentially.

1.2.3.1. A patch may be a random ROI if (i) the patch passes QC, (ii) the patch is not a mode ROI, (iii) the patch is not one of the 8 adjacent patches to a mode ROI.

1.3. For each of the at most 6 mode ROIs and at most 6 random ROIs at this low/1.25× magnification, the ROI is explored at medium-low/5× magnification to find higher magnification ROIs. This exploration from lower to higher magnifications is modeled after how a pathologist inspects a slide first at low magnification then at higher magnifications.

1.3.1. Extract patches in slide at medium-low/5× magnification (use case 9)

1.3.2. The 1.25× magnification ROIs are not used as ROIs for downstream machine learning or other analyses. Rather, these 1.25×ROIs are used as constrain the search for higher magnification ROIs. Higher magnification ROIs that are used for downstream machine learning or other analyses include a central patch and 8 (eight) surrounding patches in an octagon/circle formation. This circular formation may be similar to a TMA spot or the view of a glass slide at a microscope eyepiece, to closely model the information a pathologist sees at a microscope.

Use Case 5: Perform Patch Quality Control
Inputs:
 1. A 256×256px PNG image of a patch
 2. Max bad pixel fraction in patch (biopsy=0.9, ectomy=0.5).
 3. Growable pixel neighbor count threshold (biopsy=4, ectomy=3).
 4. Otsu's method threshold for background/foreground pixel classification.
 5. Otsu's method threshold for nuclear/nonnuclear pixel classification.
Outputs:
 1. A patch quality control result is returned, indicating if QC passed for the patch, and including numerous quality control statistics, namely:
    nuclear pixel count (overwritable, i.e. growable pixels "grow over" overwritable pixels, replacing the pixels labeled nuclear with pixels labeled pen, for instance, because pen is growable)
    background pixel count
    background threshold (from Otsu's method)
    if color normalization was applied or not for QC (true/false parameter)
    extreme red pixel count (blood/erythrocytes or possibly red pen, R>G+B, not growable)
    extreme blue pixel count (pen/marker, B>R+G, growable)
    extreme green pixel count (pen/marker, G>R+B, growable)
    QC max pen threshold (blue+green+black pen/marker pixels, fail QC if exceeded)
    QC max pen nuclear area threshold (small pen spots converted to nuclei)
    blurred pixel count (by 3×3 Laplacian kernel, overwriteable)
    QC max blurred pixel count (fail QC if exceed)
    Laplacian variance in patch overall (from 3×3 Laplacian kernel, for blur)
    QC max Laplacian variance in patch overall (fail QC if exceeded)
    dark pixel count (tissue folds or black pen, R<X and G<X and B<X for some threshold X, growable)
    QC dark pixel count threshold (fail QC if exceeded)
    if dark pixels are added into the total "bad" pixel count or not (true/false parameter)
    nuclear region pixel count (how many pixels are in contiguous regions of nuclear pixels large enough to be valid regions)
    nuclear region count (number of contiguous regions of nuclear pixels)
    total pixels in patch (256×256px is 65536 total pixels)
    total bad pixels in patch (background+blur+extreme red/blue/green+dark)
    ratio of pixels passing QC ((1-total bad pixels)/(total pixels))
    complexity (proxy measure of Kolmogorov Complexity in PNG patch image, which is simply the PNG file size, since PNG uses Lempel-Ziv compression, and Lempel-Ziv complexity is a proxy for Kolmogorov complexity. More complex images have a greater variety of pixels, loosely speaking, and have more information. Another way to evaluate the "goodness" of a patch is its complexity, rather than its nuclear region count.)
 2. A PNG image file with pixels colored according to their QC-classified state, in a color scheme that is easy to visually interpret, namely:
    MaskExtremeRed=0x00ff0000 // Red
    MaskExtremeGreen=0x0000ff00 // Green
    MaskExtremeBlue=0x000000ff // Blue
    MaskNuclear=0x00ffff00 // Yellow
    MaskBlur=0x00ff00ff // Magenta
    MaskDark=0x0000ffff // Cyan
    MaskForeground=0x00ffffff // White
    MaskBackground=0x00000000 // Black
    MaskDummy=0xdaffffff // Semitransparent, distinct value, placeholder
    MaskNuclearRegion=0x00ffd700 // Gold color
    MaskNuclearRegion=0x00d2691e // HTML color "Chocolate", i.e. Brown
Steps:
 1. Perform histogram specification color normalization on patch (use case 6).
  1.1. Note, because hematoxylin and eosin staining varies between slides and between protocols (e.g. frozen section slides and formalin fixed paraffin embedded (FFPE) slides), the patch is transformed by color histogram specification in heatoxylin and eosin stain space. In this approach, understained or overstained slides are computationally normalized to have a similar amount of apparent stain. This improves nuclear pixel detection.
 2. For each pixel, where a pixel may be processed in RGB space of RGB-normalized space, as appropriate for the particular test at hand:
  2.1. In RGB space, a pixel is background if the grayscale pixel intensity is above the Otsu threshold. This pixel is "bad".
  2.2. In RGB space, a pixel is dark (either black pen or tissue fold) if R, G, and B values for a pixel are below a threshold, e.g. 10, where each channel takes a value between 0 and 255. This pixel is "growable" and "bad".
  2.3. In RGB-normalized space, a pixel is blood if Rnorm is greater than Gnorm plus Bnorm. This may also capture red pen, but in practice red pen is rarely used. Color normalization allows fewer blood pixels to be missed than not using color normalization. This pixel is "bad" but is not "growable".
  2.4. In RGB space, a pixel is blue pen if the blue channel is greater than red plus green channels. Color normalization does not help pen detection. This pixel is "growable" and "bad".
  2.5. In RGB space, a pixel is green if the green channel is greater than red plus blue channels. Color normalization does not help pen detection. This pixel is "growable" and "bad".
  2.6. In RGB space converted to grayscale values 0-255 inclusive, a 3×3 Laplacian kernel (matrix [0,1,0; 1, −4, 1; 0, 1, 0]) is applied over a pixel and its 8 neighbors, with each pixel's grayscale value being multiplied by the corresponding matrix element, and the summed together, e.g. the sum is zero if the pixel and its 8 neighbors have the same pixel value: $x*0+x*1+x*0+x*1+x*(-4)+x*1+x*0+x*1+x*0=x+x-4x+x+x=0$. The sum for this pixel is appended to a list of such sums for blur calculation later. For efficient performance, this is a tentative calculation computed in parallel with the above rules as pixels are iterated in parallel over multiple CPUs. This tentative calculation does not yet classify a pixel as "bad" or otherwise.
 3. If so far the fraction of "bad" pixels in the total count of pixels exceeds a threshold, then QC fails and terminates early with dummy values for not yet calculated QC statistics. This saves considerable computation if the patch is primarily empty/background, as is frequently the case in needle biopsies.

4. For each remaining good pixel, do nuclear pixel detection:

4.1. Transform RGB-normalized space (red, green, blue) pixel to HER space (hematoxylin, eosin, and residual) through color deconvolution.

4.2. A pixel may be nuclear if the hematoxylin signal minus the eosin signal exceeds the nuclear threshold from Otsu's method. However, blue/black/green pen may have a false hematoxylin minus eosin signal that exceeds this threshold also.

4.2.1. After all nuclear pixels detected, as a first step to distinguish blue/black/green pen spots from true nuclear pixels, the cross sectional area of the nuclear pixel region/spot is calculated.

4.2.2. Large swaths of pen have large areas and are classified as including pen pixels, e.g. blue pen pixels if blue pen is detected, or green pen pixels if green pen is detected. These are "bad" pixels.

4.2.3. If the spot's area is less than or equal to a threshold, the area is classified as including nuclear pixels. These are not "bad" pixels. Moreover, the area will later be processed further as a nuclear region, for region withering and nuclear region counting.

5. Given the list of Laplacian sums and pixel coordinates from step 2.6, a pixel is blur if both the Laplacian kernel sum has a value less than a specified threshold, and each of its 4 (four) adjacent pixels (1 above, 1 below, 1 left, 1 right, and no diagonals) have sums below this threshold too. The threshold is taken to be an order of magnitude less than the minimum amount of Laplacian variance required in a patch to pass QC, i.e. this per-pixel blur threshold is the QC-required whole-tile Laplacian variance threshold divided by 10 (ten). This insight identifies a relationship between the Laplacian variance in the image and specific pixels, to identify and segment blurred pixels in the image.

5.1. If all five sums are under this threshold, this pixel is classified as blur. This pixel is "bad" and "overwritable". This pixel may be "grown over" by a growable pixel, e.g. if a blur pixel is adjacent to 3 or more growable pixels, the blur pixel is replaced with the growable pixel, e.g. pen. In this way, light blue pixels at the edge of a blue pen mark over the slide background are still called blue, even if the blue channel intensity is less than the red plus green channel intensities. The light blue pixels would otherwise have low complexity and be mistakenly called blur. This is a definition of Laplacian-based blur, where blurred pixels may not actually be considered blurred if adjacent to pen or tissue folds, or connected to pen/folds via other pixels classified as blur.

5.2. If all five sums are not under this threshold, then this pixel is not blur. If however, after color deconvolution on this pixel in RGB-normalized space suggests the hematoxylin minus eosin signal exceeds the nuclear threshold from Otsu's method like step 4, then the pixel may be nuclear. This pixel will be processed like the other pixels from step 4 for nuclear region counting.

5.3. Laplacian kernel sum variance over the entire patch image is calculated by iterating over all listed pixels in step 5. In practice, few patches fail QC due to insufficient Laplacian variance over the entire patch, so performance does not improve much if the analysis would terminate here early for insufficient variance.

6. With nuclear pixels completely enumerated in steps 4 and 5, "growable" pixels (tissue fold or blue/green/black pen) may be grown over to overwrite "overwritable" pixels (nuclear or blur pixels). This step is skipped, to save considerable computation, if there are both no "growable" pixels and no "overwritable" pixels.

6.1. Growable pixels replace overwritable pixels (use case 7).

7. Because nuclear region counting is computational expensive, runs some checks to possibly abort the QC process early, to save compute cycles:

7.1. If the max bad pixel fraction in patch (biopsy=0.9, ectomy=0.5) has been exceeded, abort QC with dummy placeholder values in uncalculated QC image statistics, e.g. nuclear region count.

7.2. If the Laplacian kernel sum variance over the entire patch image from step 10.3 has not met or exceeded the required threshold, abort QC early with dummy placeholder values etc.

7.3. If the amount of blue pen pixels exceeds the max threshold, abort QC etc.

7.4. If the amount of green pen pixels exceeds the max threshold, abort QC etc.

7.5. If the amount of dark pixels (black pen or tissue fold) exceeds the max threshold, abort QC etc, but only if QC has been configured such that dark pixels are added into the total "bad" pixel count or not (true/false parameter).

8. If the analysis has reached this step, QC has passed, so calculate a "goodness" or "priority" of this patch, for ranking patches. Let this "goodness" be the nuclear region count, which is a computationally expensive analysis over the set of nuclear pixels. Cancer cells, for instance, are expected to proliferate, so high nuclear count regions are cancer foci and of particular interest. The cancer focus with greatest nuclear region count may be considered the "dominant tumor", and primary center of disease represented in the glass slide.

8.1. Perform nuclear region formation, subdivision, and counting in patch (use case 8)

9. Return a completed patch quality control result, with all patch statistics, including nuclear region count.

Use Case 6: Perform Histogram Specification Color Normalization on Patch

Inputs:

1. A 256×256px PNG image of a patch in RGB space.

2. 3×3 color deconvolution matrix, e.g. for RGB to HER. Other matrices exist for other stains and applications, e.g. IHC stains and astronomy. Multiple matrices exist for RGB to HER. The RGB-to-HER matrix [0.49015734, 0.04615336, 0.0; 0.76897085, 0.8420684, 0.0; 0.41040173, 0.5373925, 0.0] may be used. An alternative RGB-to-HER matrix that works much less well is [0.644211, 0.092789, 0.0; 0.716556, 0.954111, 0.0; 0.266844, 0.283111, 0.0]. A matrix is derived experimentally in a laboratory setting and reported in the literature.

3. Target Gaussian distribution mean and standard deviation for hematoxylin channel.

4. Target Gaussian distribution mean and standard deviation for eosin channel.

5. Target Gaussian distribution mean and standard deviation for residual channel.

Outputs:

1. A color normalized 256×256px image of a patch in RGB space.

Variables

1. Let the raw red channel value be "R", and normalized red channel value be "Rnorm".

2. Let the raw green channel value be "G", and normalized red channel value be "Gnorm".

3. Let the raw blue channel value be "B", and normalized red channel value be "Bnorm".

4. Let "RGB space" be R, G, and B values.

5. Let "RGB-normalized space" be Rnorm, Gnorm, and Bnorm values.

6. Let the raw hematoxylin channel value be "H", and normalized hematoxylin channel value be "Hnorm".

7. Let the raw eosin channel value be "E", and normalized eosin channel value be "Enorm".

8. Let the raw residual channel value be "R", and normalized residual channel value be "Rnorm". Generally, R will be referred to in the context of H and E, to distinguish the R meaning red from the R meaning residual.

9. Let "HER space" be H, E, and R values.

10. Let "HER-normalized space" be Hnorm, Enorm, and Rnorm values.

Steps:

1. Transform the RGB image to an HER image via color deconvolution.

2. For each channel independently in the 3-channel HER image, namely H, E, and R:

2.1. Calculate the empirical distribution of channel intensities, e.g. for a 256×256 image there are at most 65536 counters, one counter for each of the observed H values in the image, and in practice far fewer than 65536 counters are needed. For computational efficiency, atomic counters may be used in a trie map, so all counters may be incremented in parallel by multiple CPUs, and counters may be added to the trie map in parallel atomically as previously unobserved H values are encountered in the image. Using the minimum number of counters reduces memory usage, which is important as many patches may be processed in parallel independently, for best performance.

2.2. Use this empirical distribution to calculate an empirical p-value for any channel value by the formula:

2.2.1. pvalue=1.0−((observations_greater_or_equal+0.5)/pseudocount_pixels), where 2.2.1.1. observations_greater_or_equal is the number of pixels of the value of interest, e.g. how many pixels have at least H value 1.234.

2.2.1.2. pseudocount_pixels is the total number of pixels in the patch plus 1.

2.2.1.3. In this way empirical p-values are always greater than zero and less than 1. For instance, the minimum p-value in a 256×256px image (65536px total) is for intensity 0, which is:

$$p\text{value}=1.0-((65536+0.5)/(65536+1))=7.629e-06=0.0000007629$$

2.3. The target Gaussian distribution specifies the desired amount of stain, for example the desired amount of hematoxylin stain in the patch. Given the input mean and standard deviation parameters for this stain, the Gaussian distribution has an analytical quantile function (a.k.a. inverse cumulative distribution function) that transforms a p-value into a target value. This target value is the normalized stain value, e.g. Hnorm. The analytical quantile function for a Gaussian is:

2.3.1. normalized_stain_value=mu+sigma*sqrt(2)*erfi(2*pvalue−1), where 2.3.1.1. normalized_stain_value is Hnorm if using H.

2.3.1.2. mu is the mean of the target Gaussian distribution, e.g. how much hematoxylin there is on average in the patch after normalization.

2.3.1.3. sigma is the standard deviation of the target Guassian distribution, e.g. how hematoxylin varies through the patch after normalization.

2.3.1.4. erfi is the inverse error function, a.k.a. erf^(−1).

2.3.1.5. pvalue is the empirical p-value calculated above in 2.2.1. This allows the non-normalized empirical distribution to be mapped via p-values into the normalized target Gaussian distribution via 2.3.1. Because hematoxylin values are floating point numbers rather than integers, there is no loss of information in this normalization due to rounding, so the mapping is fully invertible, e.g. Hnorm may be mapped back to H via p-values, the Gaussian distribution's cumulative distribution function, and the trie map representing the histogram of H values. This inverse mapping may be used as a software test or sanity check.

3. Transform the HER-normalized image to an RGB-normalized image by inverse color deconvolution. The 3×3 matrix for color deconvolution is an invertible matrix, and LU decomposition is used for this. LU decomposition is computationally more efficient than singular value decomposition (SVD), and SVD can also invert a matrix. Final RGB-normalized values are rounded to integers taking values 0-255 inclusive, to be easily viewed. This rounding results in some quantization error and information loss, but the image may be treated as any other RGB image, easily viewed with commodity software, or processed with unmodified machine learning pipelines that read PNG images from the filesystem.

Use Case 7: Growable Pixels Replace Overwritable Pixels

Inputs:

1. Growable pixel neighbor count threshold (biopsy=4, ectomy=3).

2. A list of
  (i) "growable" pixel addresses into a 256×256px PNG image of a patch (an address here is a number 0-65535) and
  (ii) the type (blue pen, green pen, or dark, where dark may be black pen or tissue fold) of the "growable" pixel with that address Note: for computational efficiency, a trie map may be used as the list here, mapping addresses to types.

3. A similar list of "overwritable pixels", with
  (i) addresses (0-65535) and
  (ii) types (nuclear or blur)

Note: for computational efficiency, a trie map may be used as the list here, mapping addresses to types.

Outputs:

1. Revised image statistics in QC for various pixel type counts, namely:
  nuclear pixel count (overwritable, i.e. growable pixels "grow over" overwritable pixels, replacing the pixels labeled nuclear with pixels labeled pen, for instance, because pen is growable)
  extreme blue pixel count (pen/marker, B>R+G, growable)
  extreme green pixel count (pen/marker, G>R+B, growable)
  blurred pixel count (by 3×3 Laplacian kernel, overwritable)
  dark pixel count (tissue folds or black pen, R<X and G<X and B<X for some threshold X, growable)
  nuclear region pixel count (how many pixels are in contiguous regions of nuclear pixels large enough to be valid regions)
  total bad pixels in patch (background+blur+extreme red/blue/green+dark)
  ratio of pixels passing QC ((1−total bad pixels)/(total pixels))

2. A revised PNG image file with pixels colored according to their QC-classified state, in a color scheme that is easy to visually interpret, per use case 5.

Definitions

1. A "growable" pixel is blue pen, green pen, or dark. Dark is black pen or tissue fold. These are identified in patch quality control (use case 5)

2. An "overwritable" pixel is blur or nuclear. These are identified in patch quality control (use case 5).

Steps:

1. For each of the growable pixels:

1.1. The growable pixel's address may be converted to a row and column coordinate in the square patch image via:

1.1.1. row=address/patch_width, where patch_width is 256 in a 256×256px image and address is 0-65535, for a row 0-255. For example the row for address 2000 is 7, i.e. 2000/256=7, as in the C programming language.

1.1.2. column=address % patch_width, where % calculates the remainder after division, e.g. the column for address 2000 is 208, i.e. 2000% 256=208, as in the C programming language.

1.1.3. likewise, given a row and column, an address may be calculated:

address=row*patch_width+column so the address of row 7 and column 208 is: 7*256+ 208=2000

1.2. for the row and column of a growable pixel address, if there is an overwritable pixel immediately above, below, left, or right (4 neighbors), then consider the overwritable pixel for replacement by the growable pixel.

1.2.1. for the overwritable pixel under consideration, of its 8 neighbors (1 above, 1 below, 1 right, 1 left, and 4 diagonal), if the total number of neighbors is greater than or equal to the growable pixel neighbor count threshold (biopsy=4, ectomy=3), then replace the overwritable pixel type (blur or nuclear) with the type of the growable pixel (blue pen, green pen, or dark). 1.2.1.1 Note, this does not change pixel RGB or HER values, rather only the type of pixel that QC considers this pixel to be is replaced, e.g. this is no longer an overwritable nuclear pixel but rather a growable blue pen pixel. In this way growable pixels may continue to grow, replacing large contiguous areas of overwritable pixels, changing the number of "bad" pixels in the image according to QC. This gives a conservative estimate of how man pixels are nuclear, and so patches with even a little pen may not readily be considered as "mode" ROIs, which are a proxy for cancer foci, interesting regions in the slide.

1.2.2. Computation stops when no more growable pixels can replace overwritable pixels.

Use Case 8: Perform Nuclear Region Formation, Subdivision, and Counting in Patch Inputs:

1. List of nuclear pixel addresses
2. A 256×256 PNG image patch
3. QC max pen nuclear area threshold (small nuclei pixel gaps converted to nuclei pixels)

Outputs:

1. Count of nuclear regions in patch

Steps:

1. To create a contiguous region of nuclear pixels from the list of nuclear pixel addresses, 1.1. select a nuclear pixel that has not been previously selected or previously grouped into a contiguous region of nuclear pixels, converting the address to a row and column as done in use case 7 for growable pixels.

1.1.1. for each of this pixels 4 (four) neighbors (above, below, left, right, and no diagonals) if the neighbor pixel is also a nuclear pixel, add the pixel to the contiguous region of nuclear pixels 1.1.2. repeat this procedure for each of the pixels added to the region, inspecting the pixel's 4 neighbors, adding neighbors to the contiguous region of pixels, etc.

1.1.3. the procedure for this region stops when there are no new nuclear pixels added to the contiguous nuclear pixel region.

1.1.4. calculate the bounding box for this nuclear pixel region as the min row, max row, min column, and max column for all nuclear pixels in the nuclear pixel region 1.1.4.1. initialize a set of "floodfill pixels" as all pixels along the perimeter of the bounding box (along min row, max row, min column, max column) that are not currently in the nuclear pixel region. the bounding box that are not nuclear pixels.

1.1.4.2. Treat these floodfill pixels as growable pixels, which can replace pixels within the bounding box that are not nuclear region pixels. Grow these floodfill pixels in a manner similar to use case 7, but instead of pen pixels growing over nuclear pixels and ignoring background pixels for instance, floodfill pixels grow over non-nuclear pixels and ignore nuclear pixels.

1.1.4.3. All pixels in the bounding box that are not nuclear pixels and are not floodfill pixels are gap pixels.

1.1.4.3.1. Grow each gap pixel, forming contiguous gap regions. Then, for each gap region:

1.1.4.3.2. If a gap region's cross-section area in pixels is less than half the expected cross sectional area of a nuclear pixel region at this magnification (namely, QC max pen nuclear area threshold), then replace all the pixels in this gap with nuclear pixels. In this way, small amounts of noise where just a couple pixels are not called as nuclear pixels are replaced as nuclear pixels. However, leave the gap intact if the cross sectional area is greater than half the QC max pen nuclear area threshold, because this gap is not noise.

1.1.4.3.3. In this way, if the nuclear pixel region has non-nuclear pixel gaps, the floodfill pixels comprise all nonnuclear pixels outside the nuclear pixel region, leaving the non-nuclear pixel gaps intact within the nuclear pixel region. Small gaps are filled in as nuclear pixels in the region. For instance, if a nuclear pixel region has a gap center, e.g. "o", this gap may be filled in as being solidly nuclear pixels, e.g. "•". Small gaps are taken to be noise, large gaps are not. If small gaps are not filled in, Region Withering drastically reduces the number of pixels in the region with each withering iterating, because there are so many edges in the region. Withering discards fewer pixels each iteration if the region is solid, i.e. has no gaps.

1.1.5. For this nuclear region that has had all small gaps filled in, the region is subjected to successive iterations of Region Withering until no more regions remain, to determine the total number of nuclear regions within the nuclear pixel region in the bounding box.

1.1.5.1 This procedure starts with the nuclear pixel region, with small gaps filled in.

1.1.5.2. One iteration of Region Withering is performed over every nuclear pixel in the nuclear pixel region. For all nuclear pixels, a pixel is discarded unless the pixel's 8 (eight) neighbors (1 above, 1 below, 1 left, 1 right, 4 diagonals) are all nuclear pixels. This is similar to Mathematical Morphology Erosion.

1.1.5.3. After discarding pixels, the remaining pixels are counted as contiguous regions, using a similar procedure to steps 1.1, 1.1.1, 1.1.2, and 1.1.3. To be counted, a region must have a minimum number of pixels in it, namely QC max pen nuclear area threshold. This region count is saved.

1.1.5.4. The procedure in steps 1.1.5.2 and 1.1.5.3 are repeated until no more pixels can be removed. Each repeat, a region count is saved.

1.1.5.5. The maximum region counts of all region counts is taken to be the true nuclear region count. This is how Region Withering differs from Mathematical Morphology Erosion and Mathematical Morphology Skeletonization. Region Withering converges to the set of pixels that maximizes region count after iterative transformations. Erosion converges to zero pixels remaining after iterative transformations. Skeletonization converges to a thin line of pixels after iterative transformations.

1.1.5.5.1. Moreover, Mathematical Morphology Erosion and Skeletonization are global transformations over an entire image, whereas Region Withering is applied independently to each localized nuclear pixel region within the entire image overall. In this way, for instance, some nuclear pixel region A may have the maximal nuclear region count after five iterations of erosion-like pixel discarding per step 1.1.5.2, while some other nuclear pixel region B may have a maximal nuclear region count after only two iterations of erosion-like pixel discarding per step 1.1.5.2. Each localized nuclear pixel region has its own bounding box, as calculated in step 1.1.4. This localization-specific behavior and counting is important, because nuclei in some parts of the image may be closely packed together, so more erosion-like pixel discarding steps are needed to logically separate the two nuclei, while nuclei in other parts of the image may have much less physical contact with each other, so fewer erosion-like pixel discarding steps are needed to logically separate these other two nuclei. In this way, small nuclei that are barely touching are not eroded as much as large nuclei that are extensively touching. Extensively eroding small nuclei risks erasing these pixels entirely, while not eroding extensively large nuclei that are packed closely together risks not counting both nuclei.

1.1.6. Each bounding box has a nuclear pixel region, which is Region Withered into zero or more nuclear regions, with a maximum nuclear region count, where a nuclear region must contain a minimum number of nuclear pixels, namely QC max pen nuclear area threshold. The sum of all these counts is the nuclear region count for the entire image overall.

Use Case 9: Extract Patches in Slide at Medium-Low/5× Magnification

Inputs:
1. A zipped PPM file of SVS image at high magnification.
2. Max bad pixel fraction in patch (biopsy=0.9, ectomy=0.5).
3. Growable pixel neighbor count threshold (biopsy=4, ectomy=3).
4. Patch extraction step size (both biopsy=200 and ectomy=400, since magnification is not low).
5. Patch size of 800 pixels.

Outputs:
1. Coordinates of top (at most) six "mode" ROIs at 5×, which pass patch quality control and have the greatest nuclear region count in the slide of all ROIs in the containing 1.25× magnification mode ROI. There is at most 1 such 5× mode ROI per 1.25× mode ROI.
2. Coordinates of (at most) six "random" ROIs at 5×, which pass patch quality control, and have the greatest nuclear region count in the slide of all ROIs in the containing 1.25× magnification random ROI. There is at most 1 such 5× random ROI per 1.25× random ROI.

Steps:
1. For each 1.25× mode ROI, the 1.25× mode ROI region is expanded to full resolution using the zipped PPM file of the SVS image at high magnification, which has every pixel scanned, at 0.25-0.5 mpp. This 1.25× mode region is, now at 3200×3200px with increased resolution, split into overlapping patches of size 800×800 pixels (px), which overlap by at least 200 or 400 pixels on a side, where the patch extraction step size is 200 or 400, based on whether or not this is a biopsy or ectomy. While patches evenly span the 3200×3200px side-to-side, the patches closest to sides are skipped, such that an octagon of patches may still be sampled from around a central patch that passed QC per step 1.1.2.1.

1.1. For each of these patches:
1.1.1. Take the center crop of 512×512px of the 800×800px patch, and scale the 512×512px to 256×256px.
1.1.2. Perform patch quality control (use case 5) on the 256×256px patch. Some QC parameters change depending on magnification, e.g. 1.25× or 5×, e.g. the number of required nuclear pixels in a nuclear pixel region, and the whole-image Laplacian blur threshold. One intuition for these changes are that at very high magnification, a nucleus is expected to have a large number of pixels to be real, while at low magnification nuclei cannot be seen so even small glands including a few pixels may be real nuclear regions. Also, at low magnification not much fine detail may be visible, to the minimum Laplacian variance is expected to be lower, but at higher magnification pixels are expected to have increased detail and higher variance, so a minimum Laplacian variance is expected to be higher.

1.1.2.1. If patch QC fails, skip this patch. If patch QC passes, additionally take patches in an octagonal neighborhood around this central patch, where each surrounding patch is offset from the central patch by 115 and 200 pixels. In this way, patches in the octagon are approximately 230 pixels diagonally from the central patch (230=sqrt(115^2+200^2)) and 230 pixels from each other on an octagon side (230=115+115). This octagonal area may accommodate circular TMA spots and approximate the view of a pathologist at the microscope eyepiece, which is circular.

1.1.2.1.1. Only if every one of these 8 patches in the octagon also passes QC is this full octagon considered as a potential medium-low/5× magnification ROI, with a nuclear region count equal to the sum of nuclear region counts in the 9 patches (1 central patch+8 surrounding patches in an octagon). This repeated application of QC (i) minimizes the chances that some image artifacts allowed QC to pass spuriously, (ii) minimizes the chances that an image passed QC by "threading the needle" between two closeby pen marks or large regions of background, and (iii) ensures that the image data still passes QC if subjected to small translations. Small translations are an important part of data augmentation for deep learning algorithms, so it is important for QC to check several such small translations, to avoid a large hole or blurred regions near an image patch edge to dominate an image patch if cropped, translated, and mirrored during data augmentation.

1.2. The 9-patch octagon region with the maximum nuclear region count is taken to be the 5× mode ROI for the 1.25× mode ROI of interest. This nuclear region count optimization at 5× ensures helps avoid the case that the center of the 1.25× mode ROI is empty, blurred, pen-marked, blood-dominated, tissue-folded, etc and this defect would dominate the 5× ROI if taken at the 1.25× mode ROI center. The 5× mode ROI can be taken anywhere in the 1.25× mode ROI region, optimized for nuclear region count, passing QC, and avoiding such defects. For computational efficiency, the 10× mode ROI will be bounded to the 5× mode ROI central patch region.

1.2.1. If no 5× mode ROI passes QC, the 10× mode ROI will be bounded to the 1.25× mode ROI of interest. This explores a greater neighborhood that explored in step 1.2, which comes at some computational expense, but this expense is justified because the "difficulty" in this slide did not allow a 5× mode ROI to be found.

1.2.2. After all 5× mode ROIs are selected, where 5× mode ROIs are ordered by 1.25× mode nuclear region counts, the 5× mode ROIs are re-sorted based on the 5× mode nuclear region counts. This re-sorting of 5× mode ROIs is called "5× rank ROIs", which is an alternative hypothesis for where molecular or other latent events may be histologically evident. If low magnification gland structures explain an underlying molecular or latent event, then the first mode ROIs will likely be salient data. If higher magnification nuclear structures explain an underlying molecular or latent event, then the first rank ROIs will likely be salient data.

1.2.3. After mode ROIs have been selected, up to 6 "random" ROIs are selected sequentially.

1.2.3.1. A patch may be a random ROI if (i) the patch passes QC, (ii) the patch is not a mode ROI, (iii) the patch is not one of the 8 adjacent patches to a mode ROI.

2. For each 1.25× random ROI, the 1.25× random ROI region is expanded to full resolution using the zipped PPM file of the SVS image at high magnification, which has every pixel scanned, at 0.25-0.5 mpp. This 1.25× random region is, now at 3200×3200px with increased resolution, split into overlapping patches of size 800×800 pixels (px), which overlap by at least 200 or 400 pixels on a side, where the patch extraction step size is 200 or 400, based on whether or not this is a biopsy or ectomy. While patches evenly span the 3200×3200px side-to-side, the patches closest to sides are skipped, such that an octagon of patches may still be sampled from around a central patch that passed QC per step 2.1.2.1.

2.1. For each of these patches:

2.1.1. Take the center crop of 512×512px of the 800×800px patch, and scale the 512×512px to 256×256px.

2.1.2. Perform patch quality control (use case 5) on the 256×256px patch. Some QC parameters change depending on magnification, e.g. 1.25× or 5×, e.g. the number of required nuclear pixels in a nuclear pixel region, and the whole-image Laplacian blur threshold. One intuition for these changes are that at very high magnification, a nucleus is expected to have a large number of pixels to be real, while at low magnification nuclei cannot be seen so even small glands including a few pixels may be real nuclear regions. Also, at low magnification not much fine detail may be visiable, to the minimum Laplacian variance is expected to be lower, but at higher magnification pixels are expected to have increased detail and higher variance, so a minimum Laplacian variance is expected to be higher.

2.1.2.1. If patch QC fails, skip this patch. If patch QC passes, additionally take patches in an octagonal neighborhood around this central patch, where each surrounding patch is offset from the central patch by 115 and 200 pixels.

2.1.2.1.1. Only if every one of these 8 patches in the octagon also passes QC, and if none of the nine patches (1 central patch plus 8 patches in a surrounding octagon) is similar to any set of nine patches in any mode ROI or random ROI selected thus far, then this 9 patch region is a random ROI. For the image similarity calculation, see step 2.1.2.1.1.1. This similarity calculation to rule out ROI duplication is especially important for random ROIs because (i) random ROIs may be adjacent to have >50% overlap with other random ROIs at 1.25× and higher magnifications (400px of 800px overlap), and (ii) because random ROIs can be anywhere in the slide that passes QC and the slide may have multiple 5-micron-different slices of an identical needle biopsy then it is important to not include similar-looking random ROIs from different biopsy slices located in two very distant parts of the glass slide.

2.1.2.1.1.1. Determine multi-patch ROI similarity with SURF and RANSAC methods (use case 10).

2.2. The 9-patch octagon region with the maximum nuclear region count is taken to be the 5× random ROI for the 1.25× random ROI of interest. For computational efficiency, the 10× random ROI will be bounded to the 5× random ROI central patch region.

2.2.1. If no 5× random ROI passes QC, the 10× random ROI will be bounded to the 1.25× random ROI of interest. This explores a greater neighborhood that explored in step 1.2, which comes at some computational expense, but this expense is justified because the "difficulty" in this slide did not allow a 5× random ROI to be found.

3. Extract patches in slide at medium-high/10× magnification (use case 11)

Use Case 10: Determine Multi-Patch ROI Similarity with Surf and Ransac Methods

Inputs:

1. A candidate ROI including a central patch image and 8 (eight) surrounding patch images in an octagon formation.

2. An existing ROI, of 9 images, to compare for overlap to the above candidate ROI.

Outputs:

1. True if candidate ROI overlaps with the existing ROIs, otherwise false.

Spatial neighborhoods may be used to restrict the search space of similar images, because images from across the slide in different slices of the same biopsy would otherwise be spuriously matched. The computationally more efficient median-based method of registration may not be used, because video camera images and slide scan images were too different for this to find matches reliably.

Steps:

1. Calculate upright SURF interest points for candidate ROI's central patch. Upright SURF interest points are not rotation-invariant, but are computationally cheaper to calculate. Rotation invariance is not required because this candidate ROI and all existing ROIs all come from the same slide. Upright SURF interest points are robust to rotations of +−15 degrees, and multiple slices of the same needle biopsy are not expected to be laid on the glass slide at rotations beyond 15 degrees with respect to each other.

1.1. Calculate upright SURF interest points for each of the 8 surrounding patches in the candidate ROI.

2. Calculate upright SURF interest points for existing ROI.

2.1. Calculate upright SURF interest points for each of the 8 surrounding patches in the existing ROI.

3. For each of the 9 patches in the candidate ROI, select the upright SURF interest points for a patch:

3.1. For each of the 9 patches in the existing ROI, select the upright SURF interest points for a patch:

3.1.1. Find the matching points, of the selected candidate ROI upright SURF interest points and the selected existing ROI upright SURF interest points. Point matches are calculated based on distance of the points in SURF feature space. Point matching must be bidirectional, i.e. the best-matching existing ROI upright SURF interest point for a candidate point must also be the best match for that candidate ROI point to that existing ROI point.

3.1.1.1. Return false if fewer than 4 interest points match. To few interest points are in common to calculate how overlapping these images are, especially when some of these four interest points are spurious matches, so images do not overlap. If patches overlap, many points should overlap too, because all patches are taken from the same whole slide image, so some pixels should be nearly identical in the patches.

3.1.1.2. At most 500 times, try the RANSAC method to estimate patch overlap, assuming 75%+ of points are "inliers" and fewer than 25% of points are "outliers" or spurious matches.

3.1.1.2.1. Take 4 matched point pairs, so 8 total points, 4 points for the candidate ROI and 4 points for the existing ROI.

3.1.1.2.2. Take the median X offset and median Y offset in these 4 pairs, for an approximation of how much the candidate and existing ROI patches overlap. Check how many inlier points there are, which should have an X offset and Y offset within a threshold distance of the median X offset and median Y offset distances. Four (4) inliers are required, so all 4 matches point pairs may include inliers.

3.1.1.2.3. To get the best estimate of overlap, all 500 iterations to be repeated. If just interested in overlap detection and not concerned with quantifying how much overlap there is, then return true as soon as overlap detected in step 3.1.1.2.2. to save significant computational work.

4. If after 500 iterations no overlap could be detected between any candidate ROI patch and any existing ROI patch, return false.

Use Case 11: Extract Patches in Slide at Medium-High/10× Magnification

Inputs:

1. A zipped PPM file of SVS image at high magnification.
2. Max bad pixel fraction in patch (biopsy=0.9, ectomy=0.5).
3. Growable pixel neighbor count threshold (biopsy=4, ectomy=3).
4. Patch extraction step size (both biopsy=200 and ectomy=400, since magnification is not low).
5. Patch size of 800 pixels.

Outputs:

1. Coordinates of top (at most) six "mode" ROIs at 10×. There is at most one 10× mode ROI per 1.25× mode ROI.
2. Coordinates of (at most) six "random" ROIs at 10×. There is at most one 10× random ROI per 1.25× random ROI.

Steps:

1. For each 1.25× mode ROI, the 1.25× mode ROI region is expanded to full resolution using the zipped PPM file of the SVS image at high magnification, which has every pixel scanned, at 0.25-0.5 mpp. This 1.25× mode region is, now at 6400×6400px with increased resolution, further constrained to be only the 5× mode ROI pixels if a 5× mode ROI was found. This region is then split into overlapping patches of size 800×800 pixels (px), which overlap by at least 200 or 400 pixels on a side, where the patch extraction step size is 200 or 400, based on whether or not this is a biopsy or ectomy. While patches evenly span the region side-to-side, the patches closest to sides are skipped, such that an octagon of patches may still be sampled from around a central patch that passed QC per step 1.1.2.1

1.1. For each of these patches:

1.1.1. Take the center crop of 512×512px of the 800×800px patch, and scale the 512×512px to 256×256px.

1.1.2. Perform patch quality control (use case 5) on the 256×256px patch. Some QC parameters change depending on magnification.

1.1.2.1. If patch QC fails, skip this patch. If patch QC passes, additionally take patches in an octagonal neighborhood around this central patch, where each surrounding patch is offset from the central patch by 115 and 200 pixels.

1.1.2.1.1. Only if every one of these 8 patches in the octagon also passes QC is this full octagon considered as a potential medium-high/10× magnification ROI, with a nuclear region count equal to the sum of nuclear region counts in the 9 patches (1 central patch+8 surrounding patches in an octagon).

1.2. The 9-patch octagon region with the maximum nuclear region count is taken to be the 10× mode ROI for the 1.25× mode ROI of interest. For computational efficiency, the 20× mode ROI will be bounded to the 10× mode ROI central patch region.

1.2.1. If no 10× mode ROI passes QC, the 10× mode ROI will be bounded to the 5× mode ROI region if available, or the 1.25× mode ROI region otherwise. This explores a greater neighborhood that explored in step 1.2, which comes at some computational expense, but this expense is justified because the "difficulty" in this slide did not allow a 10× mode ROI to be found.

1.2.2. After all 10× mode ROIs are selected, where 10× mode ROIs are ordered by 1.25× mode nuclear region counts, the 10× mode ROIs are re-sorted based on the 10× mode nuclear region counts. This re-sorting of 10× mode ROIs is called "10× rank ROIs", which is an alternative hypothesis for where molecular or other latent events may be histologically evident. If low magnification gland structures explain an underlying molecular or latent event, then the first mode ROIs will likely be salient data. If higher magnification nuclear structures explain an underlying molecular or latent event, then the first rank ROIs will likely be salient data.

1.2.3. After mode ROIs have been selected, up to 6 "random" ROIs are selected sequentially.

1.2.3.1. A patch may be a random ROI if (i) the patch passes QC, (ii) the patch is not a mode ROI, (iii) the patch is not one of the 8 adjacent patches to a mode ROI.

2. For each 1.25× random ROI, the 1.25× random ROI region is expanded to full resolution using the zipped PPM file of the SVS image at high magnification, which has every pixel scanned, at 0.25-0.5 mpp. This 1.25× random region is, now at 6400×6400px with increased resolution, further constrained to be only the 5× random ROI pixels if a 5× random ROI was found. This region is then split into overlapping patches of size 800×800 pixels (px), which overlap by at least 200 or 400 pixels on a side, where the patch extraction step size is 200 or 400, based on whether or not this is a biopsy or ectomy. While patches evenly span the region side-to-side, the patches closest to sides are skipped, such that an octagon of patches may still be sampled from around a central patch that passed QC per step 2.1.2.1.

2.1. For each of these patches:

2.1.1. Take the center crop of 512×512px of the 800×800px patch, and scale the 512×512px to 256×256px.

2.1.2. Perform patch quality control (use case 5) on the 256×256px patch. Some QC parameters change depending on magnification.

2.1.2.1. If patch QC fails, skip this patch. If patch QC passes, additionally take patches in an octagonal neighborhood around this central patch, where each surrounding patch is offset from the central patch by 115 and 200 pixels.

2.1.2.1.1. Only if every one of these 8 patches in the octagon also passes QC, and if none of the nine patches (1 central patch plus 8 patches in a surrounding octagon) is similar to any set of nine patches in any mode ROI or random ROI selected thus far, then this 9 patch region is a random ROI. For the image similarity calculation, see step 2.1.2.1.1.1. This similarity calculation to rule out ROI duplication is especially important for random ROIs because (i) random ROIs may be adjacent to have >50% overlap with other random ROIs at 1.25× and higher magnifications (400px of 800px overlap), and (ii) because random ROIs can be anywhere in the slide that passes QC and the slide may have multiple 5-micron-different slices of an identical needle biopsy then it is important to not include similar-looking random ROIs from different biopsy slices located in two very distant parts of the glass slide.

2.1.2.1.1.1. Determine multi-patch ROI similarity with SURF and RANSAC methods (use case 10).

2.2. The 9-patch octagon region with the maximum nuclear region count is taken to be the 10× random ROI for the 1.25× random ROI of interest. For computational efficiency, the 20× random ROI will be bounded to the 10× random ROI central patch region.

2.2.1. If no 10× random ROI passes QC, the 20× random ROI will be bounded to the 5× random ROI region if available, and bounded to the 1.25× random ROI region otherwise. This explores a greater neighborhood that explored in step 1.2, which comes at some computational expense, but this expense is justified because the "difficulty" in this slide did not allow a 5× random ROI to be found.

3. Extract patches in slide at high/20× magnification (use case 12)

Use Case 12: Extract Patches in Slide at High/20× Magnification

Inputs:

1. A zipped PPM file of SVS image at high magnification.
2. Max bad pixel fraction in patch (biopsy=0.9, ectomy=0.5).
3. Growable pixel neighbor count threshold (biopsy=4, ectomy=3).
4. Patch extraction step size (both biopsy=200 and ectomy=400, since magnification is not low).
5. Patch size of 800 pixels.

Outputs:

1. Coordinates of top (at most) six "mode" ROIs at 20×. There is at most one 20× mode ROI per 1.25× mode ROI.
2. Coordinates of (at most) six "random" ROIs at 20×. There is at most one 20× random ROI per 1.25× random ROI.

Steps:

1. For each 1.25× mode ROI, the 1.25× mode ROI region is expanded to full resolution using the zipped PPM file of the SVS image at high magnification, which has every pixel scanned, at 0.25-0.5 mpp. This 1.25× mode region is, now at 12800×12800px with increased resolution, further constrained to be only the 5× mode ROI pixels if a 5× mode ROI was found, or to the 10× mode ROI pixels instead if a 10× mode ROI was found. This region is then split into overlapping patches of size 800×800 pixels (px), which overlap by at least 200 or 400 pixels on a side, where the patch extraction step size is 200 or 400, based on whether or not this is a biopsy or ectomy. While patches evenly span the region side-to-side, the patches closest to sides are skipped, such that an octagon of patches may still be sampled from around a central patch that passed QC per step 1.1.2.1

1.1. For each of these patches:

1.1.1. Take the center crop of 512×512px of the 800×800px patch, and scale the 512×512px to 256×256px.

1.1.2. Perform patch quality control (use case 5) on the 256×256px patch. Some QC parameters change depending on magnification.

1.1.2.1. If patch QC fails, skip this patch. If patch QC passes, additionally take patches in an octagonal neighborhood around this central patch, where each surrounding patch is offset from the central patch by 115 and 200 pixels.

1.1.2.1.1. Only if every one of these 8 patches in the octagon also passes QC is this full octagon considered as a potential high/20× magnification ROI, with a nuclear region count equal to the sum of nuclear region counts in the 9 patches (1 central patch+8 surrounding patches in an octagon).

1.2. The 9-patch octagon region with the maximum nuclear region count is taken to be the 20× mode ROI for the 1.25× mode ROI of interest.

1.2.1. After all 20× mode ROIs are selected, where 20× mode ROIs are ordered by 1.25× mode nuclear region counts, the 20× mode ROIs are re-sorted based on the 20× mode nuclear region counts. This re-sorting of 20× mode ROIs is called "20× rank ROIs", which is an alternative hypothesis for where molecular or other latent events may be histologically evident. If low magnification gland structures explain an underlying molecular or latent event, then the first mode ROIs will likely be salient data. If higher magnification nuclear structures explain an underlying molecular or latent event, then the first rank ROIs will likely be salient data.

1.2.2. After mode ROIs have been selected, up to 6 "random" ROIs are selected sequentially.

1.2.2.1. A patch may be a random ROI if (i) the patch passes QC, (ii) the patch is not a mode ROI, (iii) the patch is not one of the 8 adjacent patches to a mode ROI.

2. For each 1.25× random ROI, the 1.25× random ROI region is expanded to full resolution using the zipped PPM file of the SVS image at high magnification, which has every pixel scanned, at 0.25-0.5 mpp. This 1.25× random region is, now at 12800×12800px with increased resolution, further constrained to be only the 5× random ROI pixels if a 5× random ROI was found, or to the 10× random ROI pixels instead if a 10× random ROI was found. This region is then split into overlapping patches of size 800×800 pixels (px), which overlap by at least 200 or 400 pixels on a side, where the patch extraction step size is 200 or 400, based on whether or not this is a biopsy or ectomy. While patches evenly span the region side-to-side, the patches closest to sides are skipped, such that an octagon of patches may still be sampled from around a central patch that passed QC per step 2.1.2.1.

2.1. For each of these patches:

2.1.1. Take the center crop of 512×512px of the 800×800px patch, and scale the 512×512px to 256×256px.

2.1.2. Perform patch quality control (use case 5) on the 256×256px patch. Some QC parameters change depending on magnification.

2.1.2.1. If patch QC fails, skip this patch. If patch QC passes, additionally take patches in an octagonal neighborhood around this central patch, where each surrounding patch is offset from the central patch by 115 and 200 pixels.

2.1.2.1.1. Only if every one of these 8 patches in the octagon also passes QC, and if none of the nine patches (1 central patch plus 8 patches in a surrounding octagon) is similar to any set of nine patches in any mode ROI or random ROI selected thus far, then this 9 patch region is a random ROI. For the image similarity calculation, see step 2.1.2.1.1.1. This similarity calculation to rule out ROI duplication is especially important for random ROIs because (i) random ROIs may be adjacent to have >50% overlap with other random ROIs at 1.25× and higher magnifications (400px of 800px overlap), and (ii) because random ROIs can be anywhere in the slide that passes QC and the slide may have multiple 5-micron-different slices of an identical needle biopsy then it is important to not include similar-looking random ROIs from different biopsy slices located in two very distant parts of the glass slide.

2.1.2.1.1.1. Determine multi-patch ROI similarity with SURF and RANSAC methods (use case 10).

2.2. The 9-patch octagon region with the maximum nuclear region count is taken to be the 20× random ROI for the 1.25× random ROI of interest.

Figure 19:
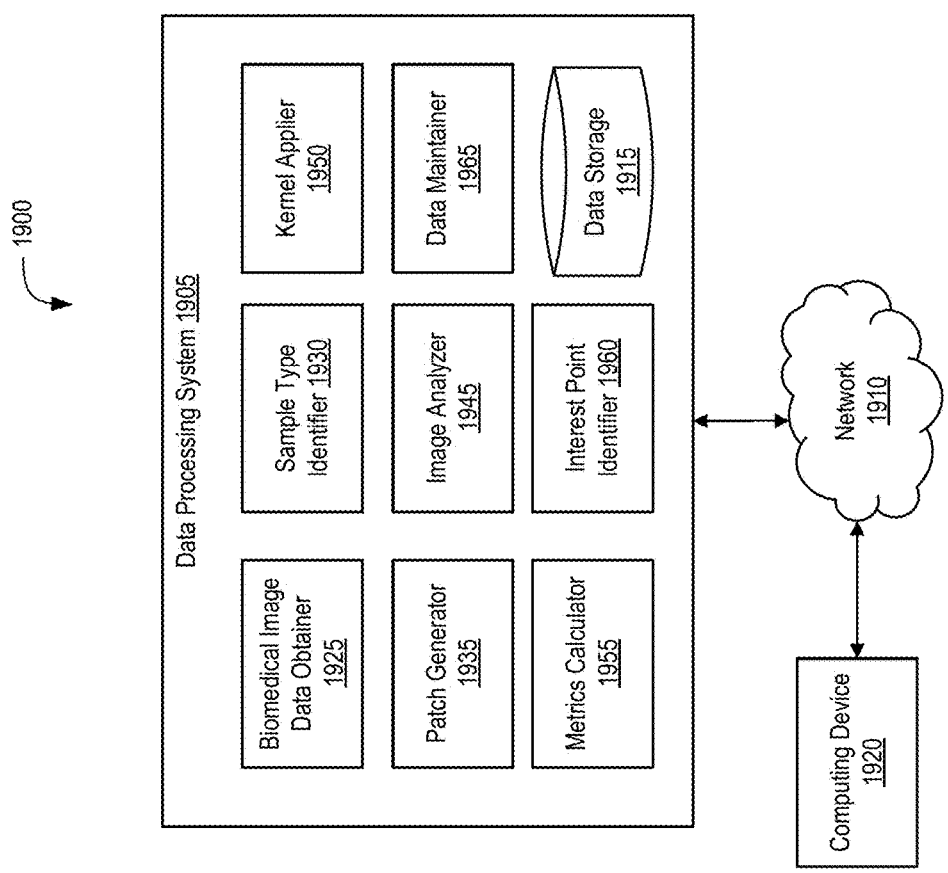
FIG. 19 depicts a block diagram of an example system for analyzing and performing quality control on whole slide images and extracted patches in accordance an illustrative embodiment.

B. Systems and Methods of Analyzing and Performing Quality Control on Whole Slide Images and Extracted Patches Referring now to FIG. 19, depicted a block diagram of an example system 1900 for analyzing and performing quality control on whole slide images and extracted patches in accordance an illustrative embodiment. In brief overview, the system can include at least one data processing system 1905, at least one network 1910 (which may be the same as, or a part of, network 2329 described herein below in conjunction with FIG. 23), and at least one other computing device 1920. The data processing system 1905 can include at least one biomedical image data obtainer 1925, at least one sample type identifier 1930, at least one patch generator 1935, at least one image analyzer 1945, at least one kernel applier 1950, at least one metrics calculator 1955, at least one interest point identifier 1960, and at least one data maintainer 1965. In some implementations, the data processing system 1905 can include the data storage 1915, and in some implementations, the data storage 1915 can be external to the data processing system 1905. For example, when the data storage 1915 is external to the data processing system 1905, the data processing system 1905 (or the components thereof) can communicate with the data storage 1915 via the network 1910. In some implementations, the data processing system 1905 can implement or perform any of the functionalities and operations discussed herein in any of the use cases of Section A.

Each of the components (e.g., the data processing system 1905, network 1910, other computing device 1920, biomedical image data obtainer 1925, sample type identifier 1930, patch generator 1935, image analyzer 1945, kernel applier 1950, metrics calculator 1955, interest point identifier 1960, and data maintainer 1965, etc.) of the system 1900 can be implemented using the hardware components or a combination of software with the hardware components of a computing system (e.g., server system 2300, client computing system 2314, any other computing system described herein, etc.) detailed herein in conjunction with FIG. 2300. Each of the components of the data processing system 1905 can perform the functionalities detailed herein.

In further detail, the data processing system 1905 can include at least one processor and a memory, e.g., a processing circuit. The memory can store processor-executable instructions that, when executed by processor, cause the processor to perform one or more of the operations described herein. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language. The data processing system 1905 can include one or more computing devices or servers that can perform various functions as described herein. The data processing system 1905 can include any or all of the components and perform any or all of the functions of the server system 2300 or the client computing system 2314 described herein below in conjunction with FIG. 23.

The network 1910 can include computer networks such as the Internet, local, wide, metro or other area networks, intranets, satellite networks, other computer networks such as voice or data mobile phone communication networks, and combinations thereof. In some implementations, the network 1910 can be, be a part of, or include one or more aspects of the network 2329 described herein below in conjunction with FIG. 23. The data processing system 1905 of the system 1900 can communicate via the network 1910, for instance with at least one other computing device 1920. The network 1910 can be any form of computer network that can relay information between the data processing system 1905, the other computing device 1920, and one or more external or third-party computing device, such as web servers, amongst others. In some implementations, the network 1910 can include the Internet and/or other types of data networks, such as a local area network (LAN), a wide area network (WAN), a cellular network, a satellite network, or other types of data networks. The network 1910 can also include any number of computing devices (e.g., computers, servers, routers, network switches, etc.) that are configured to receive and/or transmit data within the network 1910. The network 1910 can further include any number of hardwired and/or wireless connections. Any or all of the computing devices described herein (e.g., the data processing system 1905, the other computing device 1920, the server system 2300, the client computing device 2314, etc.) can communicate wirelessly (e.g., via WiFi, cellular, radio, etc.) with a transceiver that is hardwired (e.g., via a fiber optic cable, a CAT5 cable, etc.) to other computing devices in the network 1910. Any or all of the computing devices described herein (e.g., the data processing system 1905, the other computing device 1920, the server system 2300, the client computing device 2314, etc.) can also communicate wirelessly with the computing devices of the network 1910 via a proxy device (e.g., a router, network switch, or gateway).

The data storage 1915 can be a database configured to store and/or maintain any of the information described herein. The data storage 1915 can maintain one or more data structures, which may contain, index, or otherwise store each of the values, pluralities, sets, variables, vectors, or thresholds described herein. The data storage 1915 can be accessed using one or more memory addresses, index values, or identifiers of any item, structure, or region maintained in the data storage 1915. The data storage 1915 can be accessed by the components of the data processing system 1905, or any other computing device described herein, via the network 1910. In some implementations, the data storage 1915 can be internal to the data processing system 1905. In some implementations, the data storage 1915 can exist external to the data processing system 1905, and may be accessed via the network 1910. The data storage 1915 can be distributed across many different computer systems or storage elements, and may be accessed via the network 1910 or a suitable computer bus interface. The data processing system 1905 can store, in one or more regions of the memory of the data processing system 1905, or in the data storage 1915, the results of any or all computations, determinations, selections, identifications, generations, constructions, or calculations in one or more data structures indexed or identified with appropriate values. Any or all values stored in the data storage 1915 may be accessed by any computing device described herein, such as the data processing system 1905, to perform any of the functionalities or functions described herein.

The other computing device 1920 can include at least one processor and a memory, e.g., a processing circuit. The memory can store processor-executable instructions that, when executed by processor, cause the processor to perform one or more of the operations described herein. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language. The other computing device 1920 can include one or more computing devices or servers that can perform various functions as described herein. The other computing device 1920 can include any or all of the components and perform any or all of the functions of the server system 2300 or the client computing system 2314 described herein below in conjunction with FIG. 23.

1. Analysis and Quality Control of Whole Slide Images

Still referring to FIG. 19, the data processing system 1905 (or the components thereof) can perform the steps of various biomedical image processing algorithms or methods, such as the method 2000 described herein below in conjunction with FIG. 20. For example, data processing system 1905 (or the components thereof) can perform analysis and quality control on whole slide images of one or more tissue samples. Implementations of the data processing system 1905 used for the purposes of tissue sample analysis and quality control are described herein below.

The biomedical image data obtainer 1925 can identify, receive, or otherwise obtain a biomedical image derived from a tissue sample (e.g., from a biopsy, a sample of living tissue, preserved tissue, or other biological matter, etc.), for example by receiving the biomedical image from the other computing device 1920 in one or more image processing requests. The image processing request can include, for example, an identification of a tissue type, a request for a particular type of image processing (e.g., quality of overall slide image, etc.). After receiving the biomedical images, the biomedical image data obtainer 1925 can store the biomedical images in one or more data structures of the data storage 1915. The images obtained by the biomedical image data obtainer 1925 can include, for example, any type of image file (e.g., JPEG, JPEG-2000, PNG, GIF, TIFF, etc.), including an SVS image file. The biomedical image data obtainer 1925 can open, parse, or otherwise load an SVS file into working memory of the data processing system 1905 (e.g., accessible by any of the components of the data processing system 1905, etc.), using a slide parsing software, for example, OpenSlide.

In some implementations, the data processing system 1905 can be communicatively coupled with one or more medical imaging systems that can capture and provide the biomedical images to the biomedical image data obtainer 1925. In some implementations, one or more biomedical image capturing systems can store biomedical image(s) in one or more data structures of the data storage 1915. The one or more data structures containing the biomedical images can be indexed by various parameters or characteristics of the tissues sample, such as the sample source (e.g., tissue type, sample donor identifier, or other type of biomedical image identifier, etc.). The biomedical image data obtainer 1925 can retrieve one or more images from the data storage 1915 and provide the biomedical images to any of the components of the data processing system 1905 for further processing.

The biomedical image can be, for example, a slide image that corresponds to a type of tissue that can be analyzed for diagnostic purposes. In some implementations, the biomedical image can be stored with an identifier of the type of tissue to which the biomedical image corresponds. The biomedical image can be comprised of one or more pixels, and may include portions or groups of pixels that are relevant for analysis (e.g., regions of interest, etc.), and may include portions or groups of pixels that are not relevant for analysis (e.g., blue pen, blood, background of slide, etc.). For example, one portion of the biomedical image can have a first area corresponding to a presence of the tissue sample, such as cells depicted on a slide used to capture images of tissues (e.g., biopsy samples, etc.) for diagnostic analysis. Another region or area of the image may indicate an absence of tissue, for example one or more pixels that correspond to the background of the slide or a portion of the image that does not include cells of the tissue that is to be examined.

The sample type identifier 1930 can determine or identify, a sample type for the tissue sample based on a comparison of a first size of the first area and a second size of the second area within the biomedical image. A sample type can include, for example, an indication of whether the tissue sample represented in the biomedical image is viable for further analysis and classification. Certain pixels in the biomedical image may not be relevant for diagnostic or other image processing purposes (e.g., the pixels do not represent tissue, the pixels represent occluded or unclear tissue, the pixels represent a fold in tissue that cannot be analyzed, etc.). A sample type can be a needle biopsy or an ectomy, among others. Needle biopsies are thin strips of tissue and cover little of the slide, and cover little of the patch at low (e.g., 1.25×, etc.) magnification. Needle biopsies may have little tissue present on a slide, and therefore the sample type identifier 1930 can determine that the tissue sample represented in the biomedical image is a needle biopsy if the pixels representing the tissue occupy an area of the image that is less than a predetermined threshold. The sample type identifier 1930 can identify the pixels in the biomedical image that correspond to tissue and the pixels that do not correspond to tissue. In contrast, ectomies can occupy a large area of a biomedical image because they can include a larger tissue portion than a needle biopsy. Thus, if the sample type identifier 1930 determines that the number of pixels (e.g., an area of the image) corresponding to the tissue sample in the biomedical image exceeds a threshold, the sample type identifier 1930 can identify the sample the tissue sample as an ectomy sample.

The patch generator 1935 can generate a plurality of patches from the biomedical image based on the size (e.g., the area, number of pixels, etc.) of the tissue sample in the biomedical image. A patch can include a region or grouping of adjacent pixels that are extracted from the biomedical image that represent a particular region of the biomedical image. In some implementations, a patch can represent one or more features of interest or may be identified by the patch generator 1935 as representing a region of interest in the biomedical image, such as an important or relevant region in the tissue sample. The patch generator 1935 can divide (e.g., segment, etc.) one or more regions of the pixels in the biomedical image, and extract the regions of the pixels as one or more initial patches. In some implementations, the patch generator 1935 can generate one or more initial patches using a sliding window technique, where the size and step of the sliding window corresponds to an extraction policy selected based on the type of tissue sample present in the biomedical image. The patch generator 1935 can generate one or more patches of the patches identified through segmentation by utilizing at least one extraction policy, the parameters of which can be identified based on the type of tissue sample represented in the biomedical image.

In the case where the biomedical image represents a needle biopsy, the patch generator 1935 can utilize an extraction policy that extracts regions (e.g., square or rectangular regions, etc.) of the biomedical image where the maximum allowed fraction of "bad" (e.g., pixels containing information not relevant to further analysis, such as pen marks, red blood cells, blurry regions, or background not containing tissue, etc., or otherwise unacceptable) pixels can be 0.9. Because needle biopsies include little tissue in comparison to ectomy slides, the patch generator 1935 can utilize an extraction policy that conservatively discards slide regions. For example, when determining if a pixel adjacent to a "bad" pixel should also be considered a "bad" pixel, the patch generator 1935 can utilize an extraction policy that determines whether at least four of the neighboring pixels of a pixel under analysis are "bad". If four or more neighbor pixels (e.g., 1 above, 1 below, 1 left, 1 right, and 4 diagonals) can identified as "growable" (e.g. pixels that correspond to pen, marker, or are too dark, etc.), the patch generator 1935 can "grow over" an over-writable pixel, (e.g. blur, nuclear, etc.), causing the pixel to also be considered "bad". Otherwise, the patch generator 1935 does not consider the pixel bad, unless it has been identified as corresponding to pen, marker, or is too dark for further analysis. Because needle biopsies may have very little tissue in the slide (e.g., few pixels in the biomedical image that correspond to tissue, etc.), a more favorable output can be produced when an extraction policy is utilized that falsely identifies some pixels as not containing pen, marker, or a dark region when they may in fact be irrelevant to the overall image analysis than to be too aggressive and overwrite otherwise valid tissue with false pen, marker, or dark pixel labels.

The patch generator 1935 can generate the patches such that they occupy a certain number of pixels, or steps. The steps can be defined, for example, based on the type of tissue sample that has been identified as present in the biomedical image. For example, in the case of a the biomedical image representing needle biopsy, the patch generator 1935 can evaluate a 200 pixel sized region (e.g., a square region of pixels having dimensions of 200 pixels by 200 pixels). The patch generator 1935 can divide or segment the biomedical image based on the step size. In a non-limiting example case of a needle biopsy, if the biomedical image is 400 pixels by 400 pixels, the patch generator 1935 can identify and generate 4 patches, where each patch is 200 pixels by 200 pixels (e.g., each patch representing a quadrant of the biomedical image). The patch generator 1935 can select a different step size than 200 pixels, for example, such as 10 pixels, 25 pixels, 50 pixels, 75 pixels, 100 pixels, or 150 pixels, among any other step size. It should be understood that in reality, biomedical images often have sizes or resolutions that are much greater than 400 pixels by 400 pixels. The extraction policy utilized by the patch generator 1935 can identify a level of magnification at which to extract the one or more patches from the image.

In the case where the biomedical image represents an ectomy tissue sample, the patch generator 1935 can utilize an extraction policy that extracts regions (e.g., square or rectangular regions, initial patches, etc.) of the image where the maximum allowed fraction of "bad" (e.g., pixels containing information not relevant to further analysis, such as pen marks, red blood cells, blurry regions, or background not containing tissue, etc.) pixels can be 0.5. Thus, in the case of an ectomy, the patch generator 1935 can utilize an extraction policy that extracts an initial patch of pixels if the number of "bad" pixels (pixels not including information relevant to further processing) represents less than half of the total number of pixels in the evaluation region (e.g., step, region of pixels in the biomedical image, the initial patch, etc.). Ectomies can include large portions of tissue that cover more area of the slide than needle biopsies, but because there is more tissue, there can be a greater chance that some tissue folded, is blurred, or otherwise obscured such that it is no longer relevant for further processing or analysis. Utilizing an extraction policy with a threshold of 0.5 for ectomies is more stringent than the 0.9 threshold used in extraction policies for needle biopsies.

Because biomedical images that represent ectomy tissue samples often include a greater amount of tissue than a needle biopsy, the patch generator 1935 can utilize an extraction policy that liberally discards slide regions. For example, when determining if a pixel that is adjacent to a "bad" pixel should also be considered a "bad" pixel, the patch generator 1935 can utilize an extraction policy that determines whether at least three of the neighboring pixels of a pixel under analysis are "bad". If three or more neighbor pixels (e.g., 1 above, 1 below, 1 left, 1 right, and 4 diagonals) can identified as "growable" (e.g. pixels that correspond to pen, marker, or are too dark, etc.), the patch generator 1935 can "grow over" an over-writable pixel, (e.g. blur, nuclear, etc.), causing the pixel to also be considered "bad". Otherwise, the patch generator 1935 does not consider the pixel bad, unless it has been identified as corresponding to pen, marker, or is too dark for further analysis. Because ectomies can have much tissue represented in the biomedical image than needle biopsies, the system arrives at a more favorable outcome even when utilizing an extraction policy that may falsely identify patches as pen, marker, or too dark when they are not, as compared to being too conservative and including patches that actually have pen, marker, or dark pixels and potentially confound the regions of interest in the slide with bad pixels.

In the case where the biomedical image represents an ectomy tissue sample, the step size can be greater than that of the needle biopsy, for example 400 pixels by 400 pixels. However, it should be understood that a step size can contain any number of pixels for a biomedical image representing either a needle biopsy or an ectomy. The patch generator 1935 can divide or segment the biomedical image based on the step size. In a non-limiting example case of an ectomy, if the biomedical image is 800 pixels by 800 pixels, the patch generator 1935 can identify and generate 4 patches, where each patch is 400 pixels by 400 pixels (e.g., each patch representing a quadrant of the biomedical image). The patch generator 1935 can select a different step size than 200 pixels, for example, such as 10 pixels, 25 pixels, 50 pixels, 75 pixels, 100 pixels, or 150 pixels, among any other step size. It should be understood that in reality, biomedical images often have sizes or resolutions that are much greater than 800 pixels by 800 pixels. Thus, utilizing the above described extraction policies, the patch generator 1935 can select a subset of the initial patches enumerated by segmentation or sliding window techniques.

In some implementations, the extraction policy may define one or more pixel types present in a corresponding patch to qualify for selection from the initial patches. For example, the extraction policy can specify that the evaluation area of the biomedical image (e.g., one of the initial patches, etc.) must include a number of pixels that represent the tissue sample represented in the biological image in order to be selected. Other pixel types identified in the extraction policy that may disqualify an evaluation region from selection by the patch generator 1935 can include, for example, pixels that represent pen, pixels that represent marker, pixels that represent red blood cells, pixels that represent regions that are too dark for further analysis, pixels that represent blurry regions, or any other pixel type that is irrelevant for further image analysis. Pixel types identified in the extraction policy as relevant to further image analysis can include, for example, pixels representing an unobscured region of tissue, nuclear regions of tissue, cellular regions of tissue, or pixels that are relevant to further image analysis.

The extraction policy can specify that a corresponding initial patch qualifies for selection or extraction when a number of the plurality of pixels of the patch identified as one of a plurality of permissible pixel types satisfying a threshold number for the sample type. Each sample type (e.g., type of tissue sample represented in the biomedical image) can be associated with a particular threshold for the number of permissible pixel types (e.g., those relevant for further analysis) present in a patch or evaluation region of the biomedical image in order for that region to be extracted by the patch generator 1935. In the case of needle biopsies, for example, which can make up a small region of the slide or the biomedical image, the threshold can be 0.1 (e.g., 10% of pixels in the evaluation region must correspond to pixels representing regions that are relevant to further analysis, etc.). In the case of an ectomy, for example, which can make up a larger region of the slide or the biomedical image than the needle biopsy case, the threshold can be 0.5 (e.g., 50% of pixels in the evaluation region must correspond to pixels representing regions that are relevant to further analysis, etc.).

The extraction policy may specify that the corresponding patch is to qualify for selection when each pixel of the plurality of pixels in the patch has a number of adjacent pixels of the one or more pixel types satisfying a threshold number for the sample type. The extraction policy utilized by the patch generator 1935 can specify a number of neighbor pixels that cause a pixel under analysis to be "overwritten" (e.g., changed from representing a region that is relevant to representing a region that is irrelevant, etc.). Because pixels that are surrounded by irreverent or obscured pixels are unlikely to represent data that is relevant for further analysis, the extraction policy can specify a threshold that disqualifies a pixel from counting towards the thresholds for relevant pixels in an evaluation region. In the case of a needle biopsy, for example, the number of neighbor pixels can that cause the pixel to be overwritten can be four (e.g., if a pixel is surrounded by four or more irrelevant or obscured pixels, that pixel is also considered irrelevant by the extraction policy). In the case of an ectomy, for example, the number of neighbor pixels can that cause the pixel to be overwritten can be three (e.g., if a pixel is surrounded by three or more irrelevant or obscured pixels, that pixel is also considered irrelevant by the extraction policy).

The one or more pixel types defined by the extraction policy specify that at least one of the plurality of pixels in the corresponding patch may be to be within a range of color values to qualify for selection. The color of the pixels in a region of the biomedical image under analysis can be used to determine whether the region being evaluated by the patch generator 1935 satisfies the extraction policy. For example, the extraction policy can specify one or more color value (e.g., RBG color values, etc.) thresholds that can be used to identify pixels that are irrelevant for further analysis. For example, in RGB space, a pixel is dark (either black pen or tissue fold) if red, green, and blue channels for a pixel are below a threshold (e.g., 10), where each channel takes a value between 0 and 255. In another example, a pixel can be considered by the extraction policy as blood if the red channel of the pixel is greater than blue color channel of the pixel plus the green channel of the pixel. In yet another example, a pixel can be considered blue pen if the blue color channel of the pixel is greater than the red color channel of the pixel plus the green color channel of the pixel. In yet another example, a pixel is green (e.g., green pen, or an irrelevant region, etc.) if the green color channel of the pixel is greater than red color channel of the pixel plus the blue color channel of the pixel. In yet another example, a pixel can be considered by the extraction policy as representing a blurry region if the 3×3 Laplacian kernel [0,1,0; 1, −4, 1; 0, 1, 0] has a value less than a specified threshold, as do all adjacent pixels, in grayscale.

The data maintainer 1965 can store, the patches of the biomedical image extracted by the patch generator 1935 in accordance with a selected extraction policy as a reduced representation of the biomedical image in one or more data structures in the data storage 1915. The data maintainer 1965 can allocate one or more regions of memory in the data storage 1915 that are equal to or greater than the size of the patches of the biomedical image extracted by the patch generator 1935. In some implementations, the data maintainer 1965 can store the extracted patches in association with an identifier of the biomedical image, or with the biomedical image, from which the patches were extracted. The one or more data structures containing the extracted patches can be indexed by the number of extracted patches stored in the one or more data structures, and each extracted patch can be assigned a respective index value corresponding to its location in the data storage 1915 or the one or more data structures. Any of the components of the data processing system 1905 can access the one or more data structures to retrieve the patches that are extracted from the biomedical image by the patch generator 1935.

In some implementations, the data maintainer 1965 can restrict the storage of the reduced representation of the biomedical image in response to determining that none of the plurality of patches qualify for selection in accordance with the extraction policy. A biomedical image may be deemed unsuitable for analysis when none of its respective segments, evaluation regions, or initial patches satisfy the requirements of the extraction policy selected by the patch generator 1935. When a biomedical image is deemed unsuitable for further analysis, its storage would otherwise waste valuable storage resources for other relevant or analyzable biomedical images. Thus, the data maintainer 1965 can restrict such irrelevant biomedical images from being stored in the data storage 1915, and instead save the resources of the data storage 1915 for relevant images. In some implementations, the data maintainer 1965 can restrict the storage of the extracted patches when the number of extracted patches is less than a predetermined threshold.

The image analyzer 1945 can convert the biomedical image to grayscale to generate a second biomedical image. The second biomedical image may have a first area corresponding to the presence of the tissue sample and a second area corresponding to the absence of the tissue sample in grayscale. Transforming the image to grayscale can averaging the color channels of each pixel in an image to generate a corresponding gray pixel. In some implementations, to improve image fidelity, a weighted average is used instead of a standard mean average. The image analyzer 1945 can store the grayscale version of the biomedical image in one or more data structures in the data storage 1915.

The image analyzer 1945 can then apply an image thresholding (e.g., Otsu's method or histogram thresholding) to the grayscale version of the biomedical image to classify each pixel of the second biomedical image as one of a foreground pixel or a background pixel. As a grayscale image includes only one channel for color data per pixel, each pixel can be compared with a single threshold as part of an image thresholding technique. Pixels identified as exceeding the threshold (e.g., closer to white than black, greater than or equal to a predetermined value, etc.) can be identified as corresponding to foreground pixels. Pixels identified as failing to exceed the threshold (e.g., closer to black than white, less than a predetermined threshold value, etc.) can be identified as corresponding to background pixels. Foreground pixels can represent portions of the biomedical image that correspond to a tissue sample (or other marking, not empty space, etc.), and background pixels can represent portions of the biomedical image that correspond to blank or empty space (e.g., empty slide, etc.). Thus, by counting the number of foreground pixels in the image, the image analyzer 1945 can determine the total area (e.g., total number of pixels, etc.) that can potentially correspond to a tissue sample.

In some implementations, the image analyzer 1945 can apply color deconvolution to each pixel of the biomedical image to determine a first intensity value and a second intensity value for the pixel. The first intensity value can be correlated with a first stain on the tissue sample, and the second intensity value can be correlated with a second stain on the tissue sample. Color deconvolution can include separating the biomedical image into three discrete color channels (e.g., red, green, blue) to determine or identify one or more discrete stains used on the tissue sample. Different chemical stains can bind to and emphasize different regions of a tissue sample. Often, chemical stains bind to a specific feature of a tissue sample, such as the nucleus of a cell. Because different stains impart different colors to different regions, the emphasized region of each chemical stain can be more clearly realized when the color channel corresponding to that chemical stain is separated from that of another chemical stain. Thus, different stained and emphasized regions can be extracted and analyzed using color deconvolution. One such stain can correspond to eosin, and another stain can correspond to hematoxylin. An intensity value can be derived from the color deconvolution of the biomedical image for each stain. For example, after performing color deconvolution on the biomedical image, the image analyzer 1945 can identify an intensity value for each chemical to which the respective stain corresponds, such as eosin or hematoxylin.

A pixel can be determined by the image analyzer 1945 to represent a nuclear region of a cell if the hematoxylin signal or intensity value minus the eosin signal or intensity value exceeds a threshold and has not been grown over, or rendered otherwise irrelevant, by growable pixels through an extraction policy. Hematoxylin and eosin signals (can be derived by the image analyzer 1945 through color deconvolution, and can be subsequently normalized via color histogram specification. To count the number of nuclear regions in an evaluation region (e.g., initial patch, etc.), the image analyzer 1945 can progressively region wither a contiguous region of nuclear pixels from its perimeter one pixel-width at a time to disentangle touching nuclear regions, e.g. an "8"-shaped nuclear region can be withered to a region shaped as a ":" which can count as two nuclear regions rather than one. The cross sectional area of region withered regions must be above a threshold to be counted, (e.g., a region smaller than half of the cross sectional area of a nucleus cannot be a nuclear region, etc.). The image analyzer 1945 can further determine a nuclear intensity value for each pixel of the biomedical image based on the hematoxylin and eosin signals, for example by subtracting the eosin intensity value from the hematoxylin intensity value for each pixel in the biomedical image.

The metrics calculator 1955 can generate a distributive representation of the biomedical image based on the plurality of the discretized nuclear intensity values. The distributed representation can be, for example, a histogram containing buckets that each correspond to a respective nuclear intensity value. After they are determined, the nuclear intensity values can be discretized by the metrics calculator 1955, such as on a scale from 0 to 256. The metrics calculator 1955 can then increment or update the buckets in the histogram that correspond to the nuclear intensity values of each pixel in the biomedical image.

Figure 20:
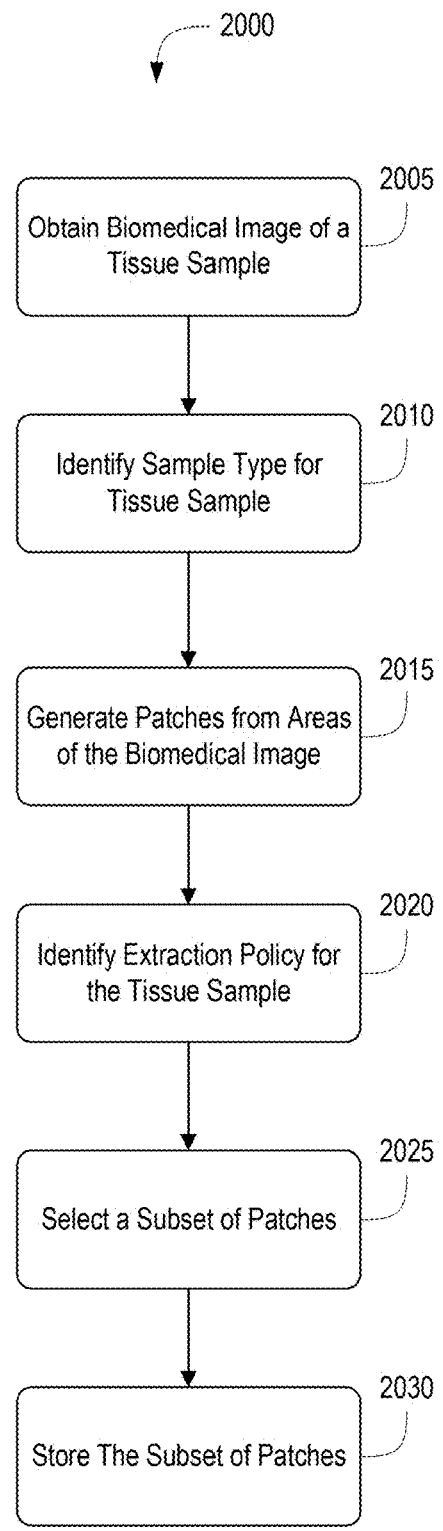
FIG. 20 depicts a flow diagram of an example method of the analysis and quality control of whole slide images in accordance an illustrative embodiment.

Referring now to FIG. 20, depicted is a flow diagram of an example method 2000 of the analysis and quality control of whole slide images in accordance an illustrative embodiment. The method 2000 can be performed, for example, by any computing device described herein, including the data processing system 1905. In brief overview, in performing the method 2000, the data processing system (e.g., the data processing system 1905, etc.) can obtain a biomedical image of a tissue sample (STEP 2005), identify a sample type for the tissue sample in the biomedical image (STEP 2010), generate patches from areas of the biomedical image (STEP 2015), identify an extraction policy for the tissue sample (STEP 2020), select a subset of patches (STEP 2025), and store the subset of patches (STEP 2030).

In further detail of the method 2000, the data processing system (e.g., the data processing system 1905, etc.) can obtain a biomedical image of a tissue sample (STEP 2005). The data processing system can obtain a biomedical image derived from a tissue sample (e.g., from a biopsy, a sample of living tissue, preserved tissue, or other biological matter, etc.), for example by receiving the biomedical image from a computing device (e.g., the other computing device 1920) in one or more image processing requests. The biomedical images can include, for example, any type of image file (e.g., JPEG, JPEG-2000, PNG, GIF, TIFF, etc.), including an SVS image file. An SVS file can be loaded in into working memory of the data processing system (e.g., accessible by any of the components of the data processing system 1905, etc.), using a slide parsing software, for example, Open-Slide.

The images can be received from one or more medical imaging systems that can capture and provide the biomedical images to the data processing system. In some implementations, one or more biomedical image capturing systems can store biomedical image(s) in one or more data structures of a data storage (e.g., the data storage 1915, etc.). The one or more data structures containing the biomedical images can be indexed by various parameters or characteristics of the tissues sample, such as the sample source (e.g., tissue type, sample donor identifier, or other type of biomedical image identifier, etc.). The biomedical image can be, for example, a slide image that corresponds to a type of tissue that can be analyzed for diagnostic purposes. In some implementations, the biomedical image can be stored with an identifier of the type of tissue to which the biomedical image corresponds. The biomedical image can be comprised of one or more pixels, and may include portions or groups of pixels that are relevant for analysis (e.g., regions of interest, etc.), and may include portions or groups of pixels that are not relevant for analysis (e.g., blue pen, blood, background of slide, etc.). For example, one portion of the biomedical image can have a first area corresponding to a presence of the tissue sample, such as cells depicted on a slide used to capture images of tissues (e.g., biopsy samples, etc.) for diagnostic analysis. Another region or area of the image may indicate an absence of tissue, for example one or more pixels that correspond to the background of the slide or a portion of the image that does not include cells of the tissue that is to be examined.

The data processing system can identify a sample type for the tissue sample in the biomedical image (STEP 2010). The sample type of the biomedical image can be identified based on a comparison of the size of a first area and the size of a second area within the biomedical image. A sample type can include, for example, an indication of whether the tissue sample represented in the biomedical image is viable for further analysis and classification. Certain pixels in the biomedical image may not be relevant for diagnostic or other image processing purposes (e.g., the pixels do not represent tissue, the pixels represent occluded or unclear tissue, the pixels represent a fold in tissue that cannot be analyzed, etc.). A sample type can be a needle biopsy or an ectomy. Needle biopsies are thin strips of tissue and cover little of the slide, and may have little tissue present on a slide. The data processing system can identify the number of pixels in the biomedical image that correspond to a tissue sample and the number of pixels that do not correspond to the tissue sample. The data processing system can determine that the tissue sample represented in the biomedical image is a needle biopsy if the pixels representing the tissue occupy an area of the image (e.g., have a number of pixels, etc.) that is less than a predetermined threshold. In contrast to needle biopsies, ectomies can occupy a large area of a biomedical image because they can include a larger tissue portion than a needle biopsy. Thus, if the data processing system determines that the number of pixels (e.g., an area of the image) corresponding to the tissue sample in the biomedical image exceeds a threshold, the data processing system can identify the sample the tissue sample as an ectomy sample.

The data processing system can generate patches from areas of the biomedical image (STEP 2015). A patch can include a region or grouping of adjacent pixels that are extracted from the biomedical image that represent a particular region of the biomedical image. In some implementations, a patch can represent one or more features of interest in the biomedical image, such as an important or relevant region in the tissue sample. The data processing system can divide (e.g., segment, etc.) one or more regions of the pixels in the biomedical image, and extract the regions of the pixels as one or more initial patches. In some implementations, the data processing system can generate one or more initial patches using a sliding window technique, where the size and step of the sliding window corresponds to an extraction policy selected based on the type of tissue sample present in the biomedical image.

The data processing system can identify an extraction policy for the tissue sample (STEP 2020). The extraction policy can be identified from one or more extraction policies that each correspond to a type tissue sample. For example, in the case where the biomedical image represents a needle biopsy, the data processing system can utilize an extraction policy that extracts regions (e.g., square or rectangular regions, etc.) of the biomedical image where the maximum allowed fraction of "bad" (e.g., pixels containing information not relevant to further analysis, such as pen marks, red blood cells, blurry regions, or background not containing tissue, etc.) pixels can be 0.9. Further, the identified extraction policy for needle biopsies can indicate that a pixel adjacent to a "bad" pixel should also be considered a "bad" pixel under certain circumstances. In the case of the needle biopsy sample type, if four or more neighbor pixels (e.g., 1 above, 1 below, 1 left, 1 right, and 4 diagonals) can identified as "growable" (e.g. pixels that correspond to pen, marker, or are too dark, etc.), the patch generator 1935 can "grow over" an over-writable pixel, (e.g. blur, nuclear, etc.), causing the pixel to also be considered "bad". Otherwise, the patch generator 1935 does not consider the pixel bad, unless it has been identified as corresponding to pen, marker, or is too dark for further analysis.

In the case where the biomedical image represents an ectomy tissue sample, the data processing system can identify an extraction policy that extracts regions (e.g., square or rectangular regions, initial patches, etc.) of the biomedical image where the maximum allowed fraction of "bad" (e.g., pixels containing information not relevant to further analysis, such as pen marks, red blood cells, blurry regions, or background not containing tissue, etc.) pixels can be 0.5. Thus, in the case of an ectomy, the extraction policy extracts an initial patch of pixels if the number of "bad" pixels (pixels not including information relevant to further processing) represents less than half of the total number of pixels in the evaluation region (e.g., step, region of pixels in the biomedical image, the initial patch, etc.).

The data processing system can select a subset of patches (STEP 2025). The data processing system can apply the rules in the extraction policy identified for the type of tissue that is represented in the biomedical image to each of the initial patches generated in STEP 2015. If an initial patch satisfies the requirements of the extraction policy, the data processing system can select the initial patch for extraction (e.g., copy the pixels of the initial patch into a different region of the memory of the data processing system, etc.). Selecting a patch can include generating an image that contains only the pixels of the initial patch that is selected by the data processing system.

The data processing system can store the subset of patches (STEP 2030). After the initial patches that satisfy the rules extraction policy are selected, the data processing system can store the selected patches in one or more data structures in a data storage (e.g., the data storage 1915, etc.). The patches can be stored as a reduced representation of the biomedical image (e.g., an image containing only the pixels of the selected patches, etc.). To store the selected subset of patches, the data processing system can allocate one or more regions of memory in the data storage that are equal to or greater than the size of the extracted subset of patches In some implementations, the data processing system can store the extracted patches in association with an identifier of the biomedical image, or with the biomedical image, from which the patches were extracted. In some implementations, the data processing system can store the extracted patches in association with the biomedical image from which the patches were extracted. The one or more data structures containing the extracted patches can be indexed by the number of extracted patches stored in the one or more data structures, and each extracted patch can be assigned a respective index value corresponding to its location in the data storage or the one or more data structures.

2. Extracting Patches at Different Magnification Levels

Still referring to FIG. 19, the data processing system 1905 (or the components thereof) can automatically identify and extract regions of interest in a biomedical image at increasing magnification levels. Generally, slides are analyzed starting at a low magnification (e.g., 1.25× magnification, etc.). When the image is analyzed at low magnification, a candidate region of interest can be identified for further magnification and analysis. An optimal region of interest can then be selected from the candidate region of interest based on an optimization process. The optimization process can attempt to maximize the number or count of certain features of interest within the optimal region. For example, when a desired feature of interest is large number of nuclear pixels, an optimal region having the greatest number of nuclear pixels within the candidate region.

Because ROIs are nested in progressively higher magnifications, glandular and nuclear structures are associated with each other. It may be that glandular features alone, nuclear features alone, or that the composition of glandular and nuclear features together predict a disease-driving molecular event, such as SPOP mutation in prostate cancer. Further details of the extraction of patches at progressive magnification levels are described herein below.

The biomedical image data obtainer 1925 can obtain a patch identified from a biomedical image derived from a tissue sample. The tissue sample can be at least one of a needle biopsy or an ectomy, and can be placed on a slide for imaging by a biomedical image capturing device, such as a microscope. One or more microscopes can communicate with the data processing system 1905 or the components thereof, and can provide biomedical images as they are captured for further analysis. The biomedical images can be stored, for example, in the data storage 1915, and can be used to generate a subset of patches of the biomedical image that satisfy an extraction policy (e.g., using the aspects described above, etc.). To obtain a patch that is identified from a biomedical image representing a tissue sample, the biomedical image data obtainer 1925 can retrieve one or more patches (e.g., copy the data such as the pixel information or other information stored in association with the one or more patches into a region of memory of the data processing system 1905, etc.) from the data storage 1915.

Obtaining the patches of the biomedical image can include identifying a patch at a magnification factor from the patches of the biomedical image as having a candidate region of interest. When starting from a biomedical image to focus on ROIs with progressively increasing focus levels, the biomedical image data obtainer 1925 can use an optimization function to identify a mode ROI, or an ROI that corresponds to a greatest number of a desired feature. One desired feature can be nuclear pixels or nuclear regions. Detection of nuclear regions within patches is discuss in greater detail in the following section. As described herein below, if the image analyzer 1945 can store patches of a biomedical image at various magnification levels with one or more indicators of a number of nuclear regions. Thus, to identify a patch that includes a mode ROI of nuclear pixels, the biomedical image data obtainer 1925 can compare the number of nuclear pixels in each patch (e.g., each patch that passed the whole slide quality control procedures described in the previous section, etc.) to the other patches in the biomedical image to identify a patch that includes the most nuclear pixels. Although the above example case is described with respect to a nuclear pixel feature, it should be understood that this process can utilize any type of classification that is recorded with the patches of the biomedical image in the data storage 1915.

If not already processed through a quality control procedure (e.g., the quality control procedures described herein below in the following section), the mode ROI patch can be processed to determine whether the patch qualifies for analysis. As described herein, a patch may be disqualified for analysis if it contains too many undesirable features, such as pen marks, dark spots, blood cells or components, or other undesirable aspects. If the selected patch at the initial magnification level passed the quality control procedure, or is determined to have already passed the control procedure (e.g., stored in association with one or more indications, etc.), the biomedical image data obtainer 1925 can select candidate patches that surround the selected patch for further quality control procedures. By analyzing the surrounding patches, it can be determined whether the region of interest depicted in the first patch can be analyzed at further magnification levels. The surrounding patches can be selected as the eight patches that are adjacent to the candidate ROI patch, and in some implementations may partially overlap by a predetermined number or range of pixels. In some implementations, the surrounding patches can be selected in a particular pattern, such as an octagonal pattern. In some cases, a patch may be selected that is surrounded by undesirable features. Undesirable features can cause undesired outputs, and if present even in the surrounding patches, the selected patch can be disqualified from further processing.

Accordingly, the image analyzer 1945 can analyze the candidate patches that surrounded the selected mode ROI patch using the same quality control techniques as described in the following section. If the selected mode ROI patch does not pass the quality control procedures (or quality control metrics), or if any of the candidate surrounding patches do not pass the quality control procedures (or quality control metrics), the region of interest can be disqualified, and the biomedical image data obtainer 1925 can select a different region of interest for analysis. Otherwise, if all nine patches pass the quality control procedures (or quality control metrics) (e.g., described herein below), the image analyzer 1945 can select the region of the biomedical image represented by all nine patches (e.g., collectively) as a magnification region.

The image analyzer 1945 can analyze one or more parameters of the magnification region to determine an optimal region from which to extract a patch at the next magnification level (e.g., 1.25× to 5×, 5× to 10×, 10× to 20×, 20× to 40×, etc.). One way to determine the optimal region within the magnification region includes determining the number of nuclear pixels in the magnification region at the next magnification level, and extracting patch from the magnification region that includes the greatest number of nuclear pixels (e.g., the mode ROI). The image analyzer 1945 can perform the steps described below in the following section to identify, extract, and perform nuclear counting on the patches in the magnification region that correspond to a feature of interest (e.g., nuclear pixels). After the patches of the magnification region are analyzed by the image analyzer 1945, the biomedical image data obtainer 1925 can select or extract a patch from the analyzed patches that optimizes for the desired feature under analysis (e.g., nuclear pixels, etc.). With the selection of a patch at the next magnification level, the components of the data processing system 1905 can consider the next magnification level as the current magnification level (e.g., 1.25× becomes 5×, 5× becomes 10×, 10× becomes 20×, 20× becomes 40×, etc.). The selected patch can serve as the new mode ROI for the current magnification level, and the components of the data processing system 1905 can repeat the processes detailed above to perform quality control on the selected patch, identify surrounding patches, perform quality control on the surrounding patches, identify a new magnification region at the next progressively increased magnification level, and select the next mode ROI patch for the next magnification level.

Thus, the components of the data processing system 1905 can progressively analyze features of interest at automatically increasing magnification levels, and store associations between the patches at each magnification level with the patches extracted at the previous magnification level. Thus, for ease of future analysis, the data processing system 1905 can provide a list of increasingly magnified regions of interest to a user (e.g., a pathologist).

3. Analysis and Quality Control of Extracted Patches

Referring back now to FIG. 19, the data processing system 1905 (or the components thereof) can perform the steps of various biomedical image processing algorithms or methods, such as the method 2100 described herein below in conjunction with FIG. 21. For example, data processing system 1905 (or the components thereof) can perform analysis and quality control on patches extracted from slide or biomedical images of one or more tissue samples. Implementations of the data processing system 1905 used for the purposes of patch analysis and quality control are described herein below.

The biomedical image data obtainer 1925 can obtain a patch identified from a biomedical image derived from a tissue sample. The tissue sample can be at least one of a needle biopsy or an ectomy, and can be placed on a slide for imaging by a biomedical image capturing device, such as a microscope. One or more microscopes can communicate with the data processing system 1905 or the components thereof, and can provide biomedical images as they are captured for further analysis. The biomedical images can be stored, for example, in the data storage 1915, and can be used to generate a subset of patches of the biomedical image that satisfy an extraction policy (e.g., using the aspects described above, etc.). To obtain a patch that is identified from a biomedical image representing a tissue sample, the biomedical image data obtainer 1925 can retrieve one or more patches (e.g., copy the data such as the pixel information or other information stored in association with the one or more patches into a region of memory of the data processing system 1905, etc.) from the data storage 1915.

Obtaining the patches of the biomedical image can include identifying a patch at a magnification factor from the patches of the biomedical image as having a candidate region of interest. Candidate regions of interest can be flagged in one or more data structures that store the patches of the biomedical images in the data storage 1915. For example, the one or more patches can each be stored in association with a flag or variable that indicates if a respective patch represents a region of interest in the biomedical image, and a type of the region of interest, if applicable. The biomedical image data obtainer 1925 can access one or more patches at various levels of magnification (e.g., 1.25× magnification, 5× magnification, 10× magnification, 20× magnification, etc.). In some implementations, nested patches at various levels of magnification can be extracted using the techniques described above (the area of patch extracted at 20× magnification is included in the area of a patch extracted at 10× magnification, which can be included in a patch extracted at 5× magnification, which can be included in a patch extracted at 1.25× magnification, etc.). Because the resolution of each patch can vary, certain patches (or areas of patches) may be identified as containing a region of interest at different magnification levels. For example, a patch extracted at 1.25× magnification may not include an indication that the patch represents a region of interest, while a patch at 5× magnification that is included in the same area as the patch extracted at 1.25× magnification can include an indication that the patch represents a region of interest. This results from the fact that higher resolution patches (e.g., higher magnification levels) can contain more detail for analysis.

The first patch may have pixels that correspond to a portion of the biomedical image. Each patch accessed or obtained by the biomedical image data obtainer 1925 can include one or more pixels (e.g., a square area of pixels, such as 512×512, 256×256, 8000×8000, any other resolution, etc.). The pixels of the patch can include color channel data, for example RGB color channel data. In the case of RGB, each pixel in a patch can include three color values that represent an intensity of a particular color channel in a pixel. In some implementations, the patches can be stored in association with a grayscale version of the patch that includes a single color channel (black and white) instead of multichannel color values.

The kernel applier 1950 can apply a kernel operator (e.g., a Laplacian kernel) to the of pixels of the patch obtained by the biomedical image data obtainer 1925 to generate a second processed patch that identifies pixels that may be too blurry for further analysis. To identify which pixels in the patch that are too blurry, the kernel applier 1950 can apply a Laplacian kernel to the grayscale format of the image. Applying a Laplacian kernel can include multiplying each pixel of the patch and the eight adjacent neighbors of the pixel with a matrix that represents the Laplacian kernel. An example Laplacian kernel is represented below:

| 0 | 1  | 0 |
|---|----|---|
| 1 | −4 | 1 |
| 0 | 1  | 0 |

The kernel applier 1950 can apply, or multiply, the kernel with each of the grayscale color values of the pixels. Each value in the Laplacian kernel can be multiplied with a single corresponding grayscale pixel value of the patch undergoing analysis, resulting in nine products. The nine products can be summed together to generate an output pixel value for the kernel position in the second processed patch. Thus, to generate a second processed patch of a similar size, the kernel applier 1950 can apply the Laplacian kernel to each of the pixels in the grayscale representation of the patch. Using the Laplacian kernel above, it should be noted that if each of nine pixels to which the kernel is applied have the same value, the resulting sum of the nine products will be zero. As the results of a kernel computation of any pixel do not depend on the output of the kernel application operations on any other pixel, the kernel applier 1950 can be configured to apply the kernel to the patch in a parallel process (e.g., a plurality of kernels operating on a plurality of processors having a plurality of work items that each correspond to a pixel and its neighbors in a patch, etc.). Using parallel processing techniques can improve the computational performance of the kernel application process.

With the determination of the output of the kernel by applying the kernel to each pixel in the obtained patch, the kernel applier 1950 can assemble the computed values into a second patch, where each pixel of the patch corresponds to a respective pixel in the grayscale patch to which the kernel was applied. The color (e.g., grayscale, single channel, etc.) intensity value for each pixel in the second processed patch can be equal to the output of the kernel at the respective pixel location on the grayscale patch obtained by the biomedical image data obtainer 1925.

The metrics calculator 1955 can generate a variance metric over the color values (e.g., grayscale intensities, etc.) of the pixels of the second processed patch produced by kernel applier 1950. The variance metric of the Laplacian operations can be used to determine whether a particular pixel in a patch extracted from a biomedical image corresponds to a blurry region that is unsuitable for further analysis. Identifying blurry regions can focus further processing on pixels of the patches that contain relevant information for medical diagnoses and further operations. Blurry pixels represent information that has been obscured, and therefore information gleaned from those pixels may be inaccurate and produce undesirable results.

Thus, the metrics calculator 1955 can iterate over each of the pixels in the second processed patch to determine whether a corresponding pixel in the extracted patch is a blurry pixel. To qualify as a blurry pixel, the metrics calculator 1955 can compare each pixel and four of its neighbors (1 above, 1 below, 1 left, and one right, no diagonals) to a predetermined threshold value. If the pixel being analyzed by the metrics calculator 1955 and its four neighbors all have an intensity value that is less than the predetermined threshold, the pixel under analysis can be considered a blurry pixel. The metrics calculator 1955 can determine the predetermined threshold as an order of magnitude less than the minimum amount of Laplacian variance required in a patch to pass quality control (e.g., the per-pixel blur threshold can be the amount of Laplacian variance required for the patch to pass quality control divided by ten, etc.). Thus, the metrics calculator 1955 can identify a relationship between the Laplacian variance in the patch and the pixels in the patch, to identify and segment blurred pixels therein. After identifying that a pixel in the patch obtained by the biomedical image data obtainer 1925 is a blurry pixel, the data maintainer 1965 can store a flag or variable indicating the blurry pixel type in association with the respective pixel in the patch. In the case where the pixel is determined not to be a blurry pixel, the data maintainer 1965 can store a flag or variable indicating the non-blurry pixel type in association with the respective pixel in the patch.

The metrics calculator 1955 can determine whether the first patch corresponding to the second patch qualifies for selection based on a comparison between the variance metric and a threshold value. The variance metric can be a Laplacian variance for the entire patch, such as a minimum threshold of Laplacian variance. For example, when analyzing the entire patch for selection, the metrics calculator 1955 can determine the variance of the second processed patch output by the kernel applier 1950. The Laplacian variance of the entire second processed patch can be computed by calculating the mean of the pixel intensity values of the image (e.g., summing the intensity values of each pixel in the image and dividing them by the number of pixels in the second processed patch). Then, the variance can be calculated by first subtracting the mean from each pixel intensity value in the second processed patch, and squaring the resulting difference. With the computation for each pixel, the metrics calculator 1955 can sum the resulting squared differences for all of the pixels in the second processed patch, and divide the resulting sum by the total number of pixels in the second processed image. The resulting quotient is the variance of the Laplacian of the patch of the biomedical image retrieved by the biomedical image data obtainer 1925. The variance of the Laplacian can be compared to a predetermined minimum threshold value. If the variance of the Laplacian does not exceed the minimum threshold value, the metrics calculator 1955 can indicate that the patch obtained by the biomedical image data obtainer 1925 does not qualify for selection. Otherwise, the metrics calculator 1955 can determine that the patch does qualify for selection, and proceed with further processing steps on the selected patch.

The data maintainer 1965 can store an association between the patch obtained by the biomedical image data obtainer 1925 and the determination of whether the first patch qualifies for selection. To do so, the data maintainer 1965 can access one or more data structures containing the patch in the data storage 1915, and set a flag or variable that indicates that the patch should be selected for further processing. The flag or variable can indicate that the respective patch is not blurry, and therefore can be used in further processing steps. In some implementations, the data maintainer 1965 can store the Laplacian calculated for the patch in association with the patch.

The image analyzer 1945 can identify the color values of the pixels in each patch obtained by the biomedical image data obtainer 1925. Each color value can have a red color component, a green color component, and a blue color component, each of which can correspond to a respective color channel in RGB space. In some implementations, each pixel in a patch can be stored as an array of three values, where each value in the array corresponds to one of the red, green, and blue color values. The image analyzer 1945 can separate a patch into an image represented solely by a respective color channel. For example, the image analyzer 1945 can assemble a red color channel version of a patch by generating a pixel intensity value of a red patch to be equal to the red color channel value of a respective pixel in the match obtained by the biomedical image data obtainer 1925. The image analyzer 1945 can perform the same steps for each of the green and blue color channels.

For each pixel, the image analyzer 1945 can compare the red color component, the green color component, and the blue color component of the pixels in the patch with one another. For example, the image analyzer 1945 can compare each color value (e.g., the RGB color values) to predetermined thresholds that can be used to identify pixels that are irrelevant for further analysis, or "bad" pixels. For example, in RGB space, a pixel is dark (either black pen or tissue fold) if the red, green, and blue color values for a pixel are below a threshold (e.g., 10), where each channel has a value between 0 and 255. In another example, a pixel can be considered by image analyzer 1945 as blood if the red channel of the pixel is greater than blue color channel of the pixel plus the green channel of the pixel. In yet another example, a pixel can be considered by the image analyzer 1945 as blue pen if the blue color channel of the pixel is greater than the red color channel of the pixel plus the green color channel of the pixel. In yet another example, a pixel can be considered by the image analyzer 1945 as green (e.g., green pen, or an irrelevant region, etc.) if the green color channel of the pixel is greater than red color channel of the pixel plus the blue color channel of the pixel. In yet another example, a pixel can be considered by the image analyzer 1945 as representing a blurry region if the 3×3 Laplacian kernel [0,1,0; 1, −4, 1; 0, 1, 0] has a value less than a specified threshold, as do all adjacent pixels, as described herein above.

The image analyzer 1945 can then classify each pixel as being a type of pixel type, where the pixel types include growable, non-growable, acceptable, and unacceptable. For example, if the image analyzer 1945 determines that a pixel is an unacceptable pixel (sometimes referred to herein as a "bad" pixel) if the grayscale pixel intensity is greater than a predetermined threshold. When a grayscale pixel intensity is greater than a predetermined threshold, it is likely that the pixel does not correspond to a tissue sample and instead corresponds to irrelevant background information or empty space. The image analyzer 1945 can classify a pixel as growable and unacceptable if the red, green, and blue color channels of the pixel are less than a predetermined threshold. The image analyzer 1945 can classify a pixel as unacceptable and non-growable based on the normalized RGB space of the patch containing the pixel. For example, the image analyzer 1945 can compute the normalized RGB space of a pixel by dividing each of the red, green, and blue channel values by the sum of the red, green, and blue channel values. Then, if the image analyzer 1945 determines that the normalized red channel of a pixel is greater than the sum of the normalized green channel of the pixel and the normalized blue channel of the pixel, the image analyzer 1945 can determine that the pixel corresponds to blood, and classify the pixel as unacceptable and non-growable.

Further, the image analyzer 1945 can classify a pixel as both growable and unacceptable if the blue color channel value of the pixel is greater than the sum of the red color channel value plus the green color channel value. In such a case, it is likely that the pixel corresponds to blue pen or other blue ink markings. The image analyzer 1945 can classify a pixel as unacceptable and growable if green color channel value of the pixel is greater than the sum of the red color channel value plus the blue color channel value. The image analyzer 1945 can classify a pixel as acceptable when the pixel corresponds to nuclear region in the patch. When a pixel has been classified as acceptable, unacceptable, growable, non-growable, or any combination thereof, data maintainer 1965 can store an association between the respective pixel in the patch obtained by the biomedical image data obtainer 1925 and the one or more pixel types. The data maintainer 1965 can update one or more regions of memory that correspond to the pixel to associate the pixel with the one or more classifications.

The image analyzer 1945 can apply color deconvolution to each pixel of the patch obtained by the biomedical image data obtainer 1925 to determine intensity values for different stains used on the tissue represented in the biomedical image from which the patch was extracted. Each intensity value can correspond to a respective stain, which can stain, bind to, or otherwise impart color to target regions of the tissue under analysis. Color deconvolution can include separating the patch into at least three discrete color channels (e.g., red, green, blue) to determine or identify one or more discrete stains used on the tissue sample. Different chemical stains can bind to and emphasize different regions of a tissue sample. Often, chemical stains bind to a specific feature of a tissue sample, such as the nucleus of a cell. Because different stains impart different colors to different regions, the emphasized region of each chemical stain can be more clearly realized when the color channel corresponding to that chemical stain is separated from that of another chemical stain. Thus, different stained and emphasized regions of the patch can be extracted and analyzed by the image analyzer 1945 using color deconvolution. One such stain can correspond to eosin, and another stain can correspond to hematoxylin. An intensity value can be derived from the color deconvolution of the biomedical image for each stain. For example, after performing color deconvolution on the biomedical image, the image analyzer 1945 can identify an intensity value for each chemical to which the respective stain corresponds, such as eosin or hematoxylin. The intensity value can correspond to the pixel intensity value of each color space corresponding to a particular stain.

A pixel can be determined by the image analyzer 1945 to represent a nuclear region of a cell if the hematoxylin signal or intensity value minus the eosin signal or intensity value exceeds a threshold and has not been grown over, or rendered otherwise irrelevant, by growable pixels adjacent to the pixel under analysis. Hematoxylin and eosin signals can be derived by the image analyzer 1945 through color deconvolution, and can be subsequently normalized via color histogram specification. To count the number of nuclear regions in an evaluation region (e.g., initial patch, etc.), the image analyzer 1945 can progressively region wither a contiguous region of nuclear pixels from its perimeter one pixel-width at a time to disentangle touching nuclear regions, e.g. an "8"-shaped nuclear region can be withered to a region shaped as a ":" which can count as two nuclear regions rather than one. The cross sectional area of region withered regions must be above a threshold to be counted, (e.g., a region smaller than half of the cross sectional area of a nucleus cannot be a nuclear region, etc.). The image analyzer 1945 can further determine a nuclear intensity value for each pixel of the biomedical image based on the hematoxylin and eosin signals, for example by subtracting the eosin intensity value from the hematoxylin intensity value for each pixel in the patch under analysis. Further, upon classifying one or more pixels as corresponding to a nuclear region, the image analyzer 1945 can compare the total number of nuclear pixels in an image to a threshold number (e.g., a threshold area of the image, etc.). The comparison can indicate, for example, a given patch includes many nuclear regions if the number of nuclear regions exceeds the threshold. In contrast, if the number of nuclear regions does not exceed the threshold, the comparison may indicate that the patch does not include many nuclear regions, and the patch may be less relevant to analysis. The results of the comparison can be stored in association with the patch, along with the number of pixels in the patch that correspond to nuclear regions, one or more coordinates of the pixels of the nuclear regions, and the patch under analysis.

The data maintainer 1965 can store an association between the patch obtained by the biomedical image data obtainer 1925 relating to the identified nuclear images in the patch. For example, the data maintainer 1965 can store the number of pixels that are classified as the nuclear type (e.g., corresponding to a nucleus, etc.). The number of pixels can be stored, for example, in association with the one or more data structures that include the patch obtained by the biomedical image data obtainer 1925. The data maintainer 1965 can store one or more regions in the patch that correspond to nuclear regions in association with the patch. For example, the data maintainer 1965 can generate and store a list of pixel coordinates corresponding to pixels in the patch that are identified as representing nuclear tissue. If a threshold is used to determine whether a particular region in the patch is a nucleus, the data maintainer 1965 can store the comparison between the region and the threshold area in association with the one or more data structures including the patch in the data storage 1915.

The image analyzer 1945 can determine an excessive metric for at least one of the red color component, the green color component, or the blue color component for the pixels in the patch obtained by the biomedical image data obtainer 1925. When a patch includes an excessive number of markings, it may be unsuitable for further analysis by the components of the data processing system 1905. Thus, the image analyzer 1945 can determine whether the patch under analysis qualifies for selection based on the number of pixels that correspond to markings that obscure potentially relevant information in the patch. Using the color analysis techniques described above, the image analyzer 1945 can identify and count the number of pixels in the patch that correspond to markings by a blue pen or marker. The image analyzer 1945 can compare the number of pixels that correspond to blue markings to a blue markings threshold. If the image analyzer 1945 determines that the number of pixels exceeds the threshold, the image analyzer 1945 can determine that the patch under analysis does not qualify for selection. The image analyzer 1945 can perform similar comparisons for green marking thresholds and a threshold for the number of dark pixels in the image. In each of those cases, if the number of pixels corresponding to the threshold exceeds the respective threshold, the image analyzer 1945 can determine that the patch does not qualify for selection. The data maintainer 1965 can store the results of the comparison between the patch and each color threshold in association with the one or more data structures including the patch in the data storage 1915.

Furthering the description of color deconvolution above, the image analyzer 1945 can apply color deconvolution to each pixel of the patch obtained by the biomedical image data obtainer 1925 to an intensity color value of the patch that is correlated with a residual present on the tissue sample, different from a stain used to identify features of the tissue sample. To perform convolution on the patch to identify intensity values for hematoxylin, eosin, and residuals, the image analyzer 1945 can apply a deconvolution matrix to each pixel in the patch. One example deconvolution matrix is represented below:

| | | |
|---|---|---|
| 0.490151734 | 0.04615336 | 0.0 |
| 0.76897085 | 0.8420684 | 0.0 |
| 0.41040173 | 0.5373925 | 0.0 |

The deconvolution process can include multiplying the color channels of each pixel in the patch by the values in the deconvolution matrix to transform the intensity values in the red, green, and blue color space into intensity values representing stains for hematoxylin, eosin, and residuals (HER). The image analyzer 1945 can then calculate an empirical distribution for each of the HER channels. For example, the image analyzer 1945 can increment an atomic counter (e.g., in a trie-map in parallel, etc.) that corresponds to each of the residual values present in the image. In the case of a 256×256 image, the maximum number of counters can be 65,536. However, the total number of counters can be maintained dynamically (e.g., only instantiated when needed), to reduce the number of counters required. For example, a trie-map data structure can be maintained by the image analyzer 1945, and additional atomic counters can be added to the trie-map when a previously encountered residual (or other intensity value type such as hematoxylin or eosin) is encountered for the first time. Each of these counters instantiated by the image analyzer 1945 can correspond to a distribution, such as a Gaussian distribution, for a particular intensity value.

The image analyzer 1945 can map the distribution of intensity values to a target distribution of intensity values of the patch to generate a normalized distribution of intensity values. For example, the counters making up the distribution of intensity values for residuals can be mapped to a Gaussian distribution for each of the hematoxylin, eosin, and residual intensity values. For example, the analytical quantile function for a Gaussian distribution can be:

$$\text{normalized stain value} = \mu + \sigma\sqrt{2}*\text{erfi}(2*p\text{value}-1)$$

where the normalized stain value is a normalized residual value if analyzing the distribution for residual values (and likewise for the other HER intensity distributions), $\mu$ is the mean of the target Gaussian distribution (e.g., in the case of a residual distribution, how much residuals there should be on average in the patch after normalization, etc.), $\sigma$ is the standard deviation of the target Gaussian distribution (e.g., in the case of a residual distribution, how much the residuals vary throughout the patch after the normalization), and erfi is the inverse error function (e.g., $\text{erf}^{-1}$, and the pvalue is an empirical value calculated using the following equation:

$$p\text{value} = 1.0 - \left(\frac{\text{observations greater or equal} + 0.5}{\text{pixel pseudocount}}\right)$$

where the observations greater or equal is the number of pixels of the value of interest (e.g., how many pixels have at least an R value of 1.234, etc.), and the pixel pseudocount is the total number of pixels in the patch plus one.

Thus, using the above computations, the image analyzer 1945 can generate normalized values for each of the hematoxylin, eosin, and residual values of the pixels, and assign the normalized hematoxylin, normalized eosin, and normalized residuals values to each respective pixel in the patch. The image analyzer 1945 can then transform the normalized HER values into a normalized RGB image by inverse color deconvolution. A 3×3 invertible matrix for deconvolution can be used. To generate the 3×3 matrix, lower-upper (LU) decomposition can be used. For ease in viewing, the image analyzer 1945 can round the normalized RGB values such that they exist within a range of integers from 0-255, and thus easily rendered in a user interface.

The image analyzer 1945 can overwrite certain pixels that are adjacent to pixels classified as growable. For example, the image analyzer 1945 can scan through the pixels in a patch and identify any pixels in the patch that are classified as a growable type. For example, the image analyzer 1945 can access one or more flags or variables associated with each pixel that correspond to the classifications of the pixel. A growable pixel can correspond to blue pen, green pen, or a dark pixel. A dark pixel can be, for example, a pixel representing black pen or a tissue fold. If a flag or variable indicates that a pixel is growable, the image analyzer 1945 can identify that pixel as one that may overwrite adjacent pixels. The image analyzer 1945 can then identify the pixels adjacent to the growable pixels, and determine whether those pixels are classified as overwriteable pixels. An overwriteable pixel can be a pixel that represents a nucleus (e.g., a nuclear pixel), or a pixel that represents a blurry region (e.g., pixel is classified as blurry). Any overwriteable pixel identified as adjacent to a growable pixel can be considered a candidate pixel, because it is a candidate for replacement by the growable pixel (e.g., the growable pixel "grows" into the overwriteable pixel, the information of which "overwritten"). For each candidate pixel, the image analyzer 1945 can identify the pixel classifications of its eight neighboring pixels (e.g., top, bottom, left, right, upper right, upper left, lower left, lower right). If the total number of growable pixels adjacent to a candidate pixel exceeds growable threshold (e.g., 4 for a needle biopsy sample, 3 for an ectomy sample, etc.), the image analyzer 1945 can replace the classification of the overwriteable pixel with that of the classification of the growable pixel. Thus, the total number of growable pixels can continue to grow as the image analyzer 1945 analyzes each pixel in the patch.

When analyzing the nuclear pixel type, the image analyzer 1945 can identify the pixels in a patch that are classified as the nuclear type. The image analyzer 1945 can determine the classification of a pixel by accessing a flag or variable that is stored in association with the pixel, and identify the pixels that are classified as nuclear. Upon identifying a nuclear pixel that has not yet been selected or previously grouped into a contiguous region of nuclear pixels, the image analyzer 1945 can determine whether four adjacent pixels (e.g., up, down, left, and right), are also previously ungrouped nuclear pixels. If a neighboring pixel is also a previously ungrouped nuclear pixel, it can be added to the group of nuclear pixels (e.g., including the first selected nuclear pixel). Selecting the adjacent pixels can include accessing regions of memory allocated to the pixels, for example the one or more data structures containing the pixel information of the patch, and identifying the pixels that are adjacent to the image. The image analyzer 1945 can continue iteratively adding neighboring nuclear pixels to the group until there are no additional nuclear pixels are present.

The image analyzer 1945 can then proceed to determine the perimeter of the nuclear region. The perimeter can be a course representation of the boundaries of the nuclear region, such as a bounding box. For each nuclear region, the image analyzer 1945 can take the column represented by the x-coordinate of the leftmost pixel of the nuclear region as the left boundary for the region, the column of the x-coordinate of the rightmost pixel of the nuclear region as the right boundary for the region, the row of the y-coordinate of the uppermost pixel of the nuclear region as the upper boundary for the region, and the row of the y-coordinate of the lowermost pixel of the nuclear region as the lower boundary for the region. Then using the bounding region, the image analyzer 1945 can identify a set of non-nuclear pixels that are along the boundary of the bounding box but are not classified as nuclear pixels. The set of non-nuclear pixels can then be grown (e.g., neighbors identified as candidate pixels, the candidate pixels are grown over if a predetermined number of pixels adjacent to the candidate pixel are non-nuclear pixels, etc.) to expand over any pixel in the bounding box that does not correspond to a nuclear pixel. The pixels within the bounding box that are not grown over by the non-nuclear pixels, but are also not nuclear pixels, can be considered gap pixels. The gap pixels can then be grown (e.g., neighbors identified as candidate pixels, the candidate pixels are grown over if a predetermined number of pixels adjacent to the candidate pixel are gap pixels, etc.) over non-nuclear pixels within the bounding box to form a gap region. A gap region can be a region within the nuclear region that does not contain nuclear pixels, but may be surrounded by nuclear pixels. The pixels of the gap region can be set to a predetermined color region, such that they may be easily identified as gap regions.

The image analyzer 1945 can identify a subset of pixels from the patch that are classified as nuclear type, for example by accessing pixel information of the patch from the data storage 1915. The identified pixels that are classified as nuclear pixels can belong to a nuclear region (e.g., surrounded by other pixels with a nuclear classification). After identifying the nuclear pixels of the nuclear regions, the image analyzer 1945 can perform a single iteration of region withering for all of the nuclear pixels in the patch. Region withering can include identifying the classification of the eight neighboring pixels (e.g., up, left, down, right, upper right, upper left, lower left, and lower right), and counting the number of neighboring pixels that have a nuclear type classification. If the number of neighboring pixels do not equal a nuclear type classification threshold, the pixel can lose its nuclear classification (e.g., discarded from the nuclear region). The new classification can be stored in association with the respective pixel in the patch by the data maintainer 1965. For example, the data maintainer 1965 can store a flag or indicator that strips the nuclear pixel of its nuclear classification.

Figure 21:
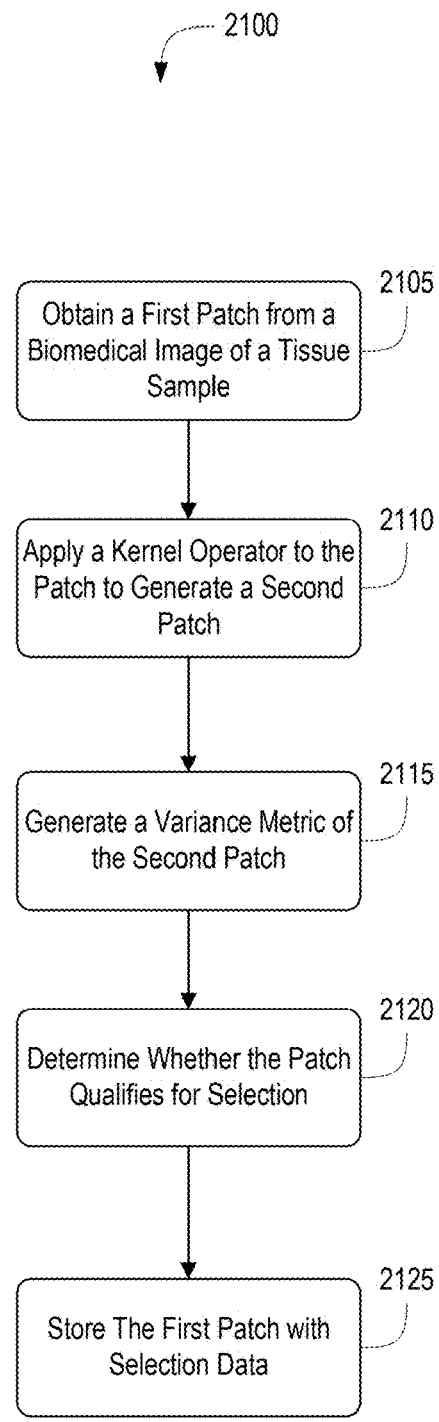
FIG. 21 depicts a flow diagram of an example method of the analysis and quality control of extracted patches in accordance with an illustrative embodiment.

Referring now to FIG. 21 depicted is a flow diagram of an example method 2100 of the analysis and quality control of extracted patches in accordance an illustrative embodiment. The method 2100 can be performed, for example, by any computing device described herein, including the data processing system 1905. In brief overview, in performing the method 2100, the data processing system can obtain a first patch from a biomedical image of a tissue sample (STEP 2105), apply a kernel operator to the patch to generate a second patch (STEP 2110), generate a variance metric of the second patch (STEP 2115), determine whether the patch qualifies for selection (STEP 2120), and store the first patch with the determined selection data (STEP 2125).

In further detail, the data processing system can obtain a first patch from a biomedical image of a tissue sample (STEP 2105). The tissue sample can be at least one of a needle biopsy or an ectomy, and can be placed on a slide for imaging by a biomedical image capturing device, such as a microscope. One or more microscopes can communicate with the data processing system, and can provide biomedical images as they are captured for further analysis. The biomedical images can be stored, for example, in the data storage (e.g. the data storage 1915) of the data processing system, and can be used to generate a subset of patches of the biomedical image that satisfy an extraction policy (e.g., using the aspects described above, etc.). To obtain a patch that is identified from a biomedical image representing a tissue sample, the data processing system can retrieve one or more patches (e.g., copy the data such as the pixel information or other information stored in association with the one or more patches into a region of memory of the data processing system 1905, etc.) from the data storage of the data processing system.

The first patch may have pixels that correspond to a portion of the biomedical image. Each patch accessed or obtained by the data processing system can include one or more pixels (e.g., a square area of pixels, such as 512×512, 256×256, 8000×8000, any other resolution, etc.). The pixels of the patch can include color channel data, for example RGB color channel data. In the case of RGB, each pixel in a patch can include three color values that represent an intensity of a particular color channel in a pixel. In some implementations, the patches can be stored in association with a grayscale version of the patch that includes a single color channel (black and white) instead of multichannel color values.

The data processing system can apply a kernel operator to the patch to generate a second patch (STEP 2110). To identify which pixels in the patch that are too blurry, the data processing system can apply a Laplacian kernel to the grayscale format of the image. Applying a Laplacian kernel can include multiplying each pixel of the patch and the eight adjacent neighbors of the pixel with a matrix that represents the Laplacian kernel. An example Laplacian kernel is represented below:

| 0 | 1  | 0 |
|---|----|---|
| 1 | −4 | 1 |
| 0 | 1  | 0 |

The data processing system can multiply, the kernel with each of the grayscale color values of the pixels. Each value in the Laplacian kernel can be multiplied with a single corresponding grayscale pixel value of the patch undergoing analysis, resulting in nine products. The nine products can be summed together to generate an output pixel value for the kernel position in the second processed patch. Thus, to generate a second processed patch of a similar size, the kernel applier 1950 can apply the Laplacian kernel to each of the pixels in the grayscale representation of the patch. Using the Laplacian kernel above, it should be noted that if each of nine pixels to which the kernel is applied have the same value, the resulting sum of the nine products will be zero. As the results of a kernel computation of any pixel do not depend on the output of the kernel application operations on any other pixel, the data processing system can apply the kernel to the patch in a parallel process (e.g., a plurality of kernels operating on a plurality of processors having a plurality of work items that each correspond to a pixel and its neighbors in a patch, etc.). Using parallel processing techniques can improve the computational performance of the kernel application process.

When the data processing system has computed the output of the kernel by applying the kernel to each pixel in the obtained patch, the data processing system can assemble the computed values into a second patch, where each pixel of the patch corresponds to a respective pixel in the grayscale patch to which the kernel was applied. The color (e.g., grayscale, single channel, etc.) intensity value for each pixel in the second processed patch can be equal to the output of the kernel at the respective pixel location on the first grayscale patch.

The data processing system can generate a variance metric of the second patch (STEP 2115). The variance metric can be generated over the color values (e.g., grayscale or single channel intensities, etc.) of the pixels of the second processed patch produced by applying the kernel to the first patch. The variance metric of the Laplacian operations can be used to determine whether a given pixel in the first patch corresponds to a blurry region that is unsuitable for further analysis. Identifying blurry regions can focus further processing on pixels of patches that contain relevant information for medical diagnoses and further operations. Blurry pixels represent information that has been obscured, and therefore information gleaned from those pixels may be inaccurate and produce undesirable results.

Thus, the data processing system can iterate over each of the pixels in the second processed patch to determine whether a corresponding pixel in the extracted patch is a blurry pixel. To qualify as a blurry pixel, the data processing system can compare each pixel and four of its neighbors (1 above, 1 below, 1 left, and one right, no diagonals) to a predetermined threshold value. If the pixel being analyzed and its four neighbors all have an intensity value that is less than the predetermined threshold, the pixel under analysis can be considered a blurry pixel. The data processing system can determine the predetermined threshold as an order of magnitude less than the minimum amount of Laplacian variance required in a patch to pass quality control (e.g., the per-pixel blur threshold can be the amount of Laplacian variance required for the patch to pass quality control divided by ten, etc.). Thus, the metrics calculator 1955 can identify a relationship between the Laplacian variance in the patch and the pixels in the patch, to identify and segment blurred pixels therein. After identifying that a pixel in the first patch is a blurry pixel, the data processing system can store a flag or variable indicating the blurry pixel type in association with the respective pixel of the first patch. In the case where the pixel is determined not to be a blurry pixel, the data processing system can store a flag or variable indicating the non-blurry pixel type in association with the respective pixel of the first patch.

The data processing system can determine whether the patch qualifies for selection (STEP 2120). The data processing system can make this determination based on a comparison between the variance metric and a threshold value. The variance metric can be a Laplacian variance for the entire patch, such as a minimum threshold of Laplacian variance. For example, when analyzing the entire patch for selection, the data processing system can determine the variance of the entire second patch. The Laplacian variance of the entire second patch can be computed by first calculating the mean of the pixel intensity values of the image (e.g., summing the intensity values of each pixel in the image and dividing them by the number of pixels in the second processed patch). Then, the mean can be subtracted from each pixel intensity value in the second processed patch, and the resulting difference can be squared. When computed for each pixel, the data processing system can sum the resulting squared differences for all of the pixels in the second processed patch, and divide the resulting sum by the total number of pixels in the second processed image. The resulting quotient is the variance of the Laplacian of the first patch obtained by the data processing system. The variance of the Laplacian can then be compared to a predetermined minimum threshold value. If the variance of the Laplacian does not exceed the minimum threshold value, the data processing system can determine that the first patch does not qualify for selection. Otherwise, the data processing system can determine that the patch does qualify for selection.

The data processing system can store the first patch with the determined selection data (STEP 2125). To do so, the data processing system can access one or more data structures containing the patch in the data storage of the data processing system, and set a flag or variable that indicates that the patch should be selected for further processing. The flag or variable can indicate that the respective patch is not blurry, and therefore can be used in further processing steps. In some implementations, the data maintainer 1965 can store the Laplacian calculated for the patch in association with the patch.

4. Comparison of Regions of Interest (ROI) Among Patches

Referring back now to FIG. 19, the data processing system 1905 (or the components thereof) can perform the steps of various biomedical image processing algorithms or methods, such as the method 2200 described herein below in conjunction with FIG. 22. For example, data processing system 1905 (or the components thereof) can compare regions of interest in patches extracted from slides or biomedical images of one or more tissue samples. Implementations of the data processing system 1905 used for the purposes of patch comparison and analysis are described herein below.

The biomedical image data obtainer 1925 can obtain a set of patches corresponding to a biomedical image that represents a tissue sample. The tissue sample can be at least one of a needle biopsy or an ectomy, and can be placed on a slide for imaging by a biomedical image capturing device, such as a microscope. One or more microscopes can communicate with the data processing system 1905 or the components thereof, and can provide biomedical images as they are captured for further analysis. The biomedical images can be stored, for example, in the data storage 1915, and can be used to generate a subset of patches of the biomedical image that satisfy an extraction policy (e.g., using the aspects described above, etc.). To obtain a set of patches that are identified as corresponding to a biomedical image representing a tissue sample, the biomedical image data obtainer 1925 can retrieve the patches (e.g., copy the data such as the pixel information or other information stored in association with the one or more patches into a region of memory of the data processing system 1905, etc.) from the data storage 1915. The patches obtained by the biomedical image data obtainer 1925 can be passed through one or more quality control procedures, such as those identified above. Thus, patches selected by the biomedical image data obtainer 1925 can each represent (or collectively represent) a candidate region of interest. The patches that represent a candidate region of interest can be patches that passed one or more quality control procedures, and can contain one or more regions of pixels that are classified as nuclear pixels.

In some implementations, when obtaining patches from the data storage 1915, the biomedical image data obtainer 1925 can select a subset of patches at a magnification factor from the biomedical image identified as corresponding to a mode region of interest (ROI). Certain patches, such as those described herein above, can be stored by the components of the data processing system 1905 in association with an indicator that a patch corresponds to a type of a region of interest, such as a mode ROI or a random ROI. A patch corresponding to a mode ROI is a patch that includes a greater number of nuclear regions than adjacent patches that make up the corresponding biomedical image. Thus, patches that correspond to a mode ROI can be considered as a hotspot (e.g., having a large number, high in density, etc.) of nuclear pixels. In some implementations, when obtaining patches from the data storage 1915, the biomedical image data obtainer 1925 can select another subset of patches at a magnification factor from the biomedical image identified as corresponding to a random ROI. A patch identified as having a random ROI can include a patch that (1) passed the quality control procedures described herein above, (2) does not represent a mode ROI, and (3) is not one of the eight adjacent (e.g., up, left, down, right, upper left, upper right, lower right, lower left) patches of a patch representing a mode ROI. In some implementations, obtaining a patch can include obtaining a patch and its eight neighboring patches (e.g., up, left, down, right, upper right, upper left, lower left, and lower right) for a feature detection process. The center of the obtained patches (e.g., the patch from which the neighbors were determined) and its neighbors can be considered the candidate ROI.

The interest point identifier 1960 can apply a feature detection process onto the candidate ROI of each patch of the set of patches obtained by the biomedical image data obtainer 1925 to determine one or more interest points in at least one corresponding patch of the set of patches. In some implementations, the feature detection process can include at least one of a speeded up robust features (SURF), a scale-invariant feature transform (SIFT), or a convolutional neural network (CNN). For example, the interest point identifier 1960 can apply an upright variant of SURF (sometimes referred to herein as "upright SURF") to determine the one or more interest points in a patch. Applying upright SURF can include applying one or more square filters (e.g., a box filter) to an image to identify one or more points of interest in the set of patches. The computational efficiency of this process can be improved by utilizing integral images as part of applying the box filter to the patch under analysis.

In some implementations, the points of interest in the candidate ROI can be identified by the interest point identifier 1960 using a SIFT algorithm. Applying the SIFT algorithm to one or more patches of the ROI can include convolving an input patch using one or more Gaussian filters at different scales. The output of the Gaussian filters can then be reduced using a difference of Gaussians technique. Next, the interest point identifier 1960 can attempt to identify local extrema at the differently scaled Gaussian outputs to produce one or more key points, which can be considered candidate points of interest. Using the SIFT algorithm, the interest point identifier 1960 can narrow the candidate points of interest into a set of actual points of interest, which can have corresponding pixel coordinates in patches of the candidate ROI.

In some implementations, the points of interest in the candidate ROI can be identified by the interest point identifier 1960 using a CNN. A CNN can include an input layer, which can be a tensor that is set equal to the pixel values of an image, an output layer, which can correspond to one or more output coordinates of points of interest in the input patch, and one or more hidden layers. The coordinates of the tensor can correspond to the pixel coordinates of the patch that is applied to the input of the CNN, and other dimensions of the tensor can correspond to the color channels of each pixel. The hidden layers of the CNN can include one or more convolutional layers that convolve the output of the previous layer using multiplication or another type of dot product. Each layer in a CNN can feed into the next layer until a final output value is propagated at the output layer. Each convolutional layer can include one or more convolutional kernels (e.g., tensors) that can perform a sliding dot product, or cross-correlation operation, on the output of the previous layer. The final output from the CNN can include one or more coordinates, or one or more indications of coordinates, of points of interest in an input patch. Thus, the interest point identifier 1960 can input one or more patches of the candidate region of interest into the CNN, and identify one or more points of interest in the one or more patches from the CNN.

The interest point identifier 1960 can then identify one or more points of interest in another set of patches of the biomedical image that correspond to a predetermined (e.g., previously known, indicated, or identified, etc.) ROI. Similar to identifying the points of interest in the candidate ROI, the interest point identifier 1960 can identify one or more points of interest from the patches (e.g., nine patches, one center patch and eight adjacent surrounding patches) that correspond to the predetermined ROI. For example, the interest point identifier 1960 can utilize an interest point detection algorithm, such as SURF, SIFT, or a CNN, to identify the points of interest in each patch. The predetermined ROI can be obtained, for example, by the biomedical image data obtainer 1925 using techniques similar to those described herein above. In some implementations, the points of interest in the patches of the predetermined ROI can be pre-computed and stored in association with the patches that correspond to the predetermined ROI. In such implementations, the interest point identifier 1960 can identify the points of the interest in the patches of the predetermined ROI by retrieving the points of interest from the data storage 1915.

The interest point identifier 1960 can then compare the points of interest identified from each patch of the candidate ROI with the points of interest identified from each patch of the predetermined ROI, and determine one or more matching interest points. To determine matching interest points, the interest point identifier 1960 can calculate the distance between the points of interest, for example, in a SURF space. Points with a low distance in SURF space (e.g., a different below a predetermined threshold, a minimum distance, etc.) can be considered matching points. However, the distance in the SURF space must be bidirectional: a best matching point when comparing the candidate ROI to the predetermined ROI must also be the best matching point when comparing the predetermined ROI to the candidate ROI. When a matching point is found between the candidate ROI and the predetermined ROI, the interest point identifier 1960 can increment a counter that corresponds to the total number of matching points of interest between the two ROIs.

After all of the patches of the candidate ROI have been compared to all of the patches of the predetermined ROI, the interest point identifier 1960 can determine whether the total number of matching points of interest is greater than a predetermined threshold. In some implementations, the predetermined threshold can be four (e.g., if a candidate ROI has four or more points of interest that match those of the predetermined ROI, the candidate ROI satisfies the threshold). If the interest point identifier 1960 determines that the number of matching points does not satisfy the threshold, the interest point identifier 1960 can determine that the candidate ROI and predetermined ROI do not correspond to each other (e.g., the two ROIs do not overlap). If the interest point identifier 1960 determines that the number of matching points satisfies the threshold, the interest point identifier 1960 can perform in image registration process on the patches of the candidate ROI and the patches of the predetermined ROI.

The image registration process can produce a correspondence (e.g., amount of overlap, etc.) between one or more patches of the candidate ROI and one or more patches of the predetermined ROI. For example, the image registration process can include a linear transformation, a point set registration, and random sample consensus (RANSAC) algorithm, among others. The RANSAC algorithm (or other image registration processes) can be performed for a fixed number of iterations, for example 50 iterations, 100 iterations, 250 iterations, or 500 iterations. The RANSAC algorithm can utilize a set of initial correspondences to generate a best fit model between two sets of data points. Such sets of data points can include inliers (e.g., points from two different sets that correspond to each other), and outliers (e.g., points from the two sets that do not correspond to each other). The interest point identifier 1960 can use the points of interest identified from the patches of the candidate ROI and the points of interest from the predetermined ROI in the RANSAC algorithm.

The RANSAC algorithm can initialize using a randomly selected (e.g., based on a pseudo-random number generator, etc.) subset of the matching points of interest identified using the SURF distance techniques described above. Using these initial correspondence points, the interest point identifier 1960 can determine a fitting model using model parameters that are computing using only the items of the randomly selected subset. As the next step of the RANSAC algorithm, the interest point identifier 1960 can determine an amount of overlap between the candidate ROI and the predetermined ROI, a median X offset (e.g., the median differences between the x-coordinates of matching points) and a median Y offset (e.g., the median of the differences between the y-coordinates of matching points) are determined for each of the matched point pairs. These median offsets can approximate how much the candidate ROI overlaps with the predetermined ROI. Next, a number of inliers for the RANSAC algorithm can be determined by comparing the X offset and the Y offset for each matching pair to a distance threshold. If the X offset and the Y offset for a matching point pair of the candidate ROI and the predetermined ROI are within a threshold distance of the median X offset and the median Y offset, the points of interest of that point pair are considered an inlier.

The RANSAC algorithm can repeat this process across different randomly selected point pairs of the candidate ROI and the predetermined ROI for a predetermined number of iterations (e.g., 100 iterations, 200 iterations, 500 iterations, etc.). If the interest point identifier 1960 determines that after a predetermined number of RANSAC iterations, the number of inliers satisfies a threshold number, the interest point identifier 1960 can determine that the candidate ROI overlaps at least a portion of the predetermined ROI. If the interest point identifier 1960 determines that after a predetermined number of RANSAC iterations, the number of inliers does not satisfy the threshold number of inliers, the interest point identifier 1960 can determine that the candidate ROI and the predetermined ROI do not overlap or correspond with one another.

The data maintainer 1965 can store the results of the overlap detection using the RANSAC algorithm (or other image registration processes) in one or more data structures corresponding to the candidate ROI or the predetermined ROI. If the candidate ROI and the predetermined ROI are determined to overlap, the data maintainer 1965 can store an identifier of the predetermined ROI in association with the candidate ROI, or the data maintainer 1965 can store an identifier of the candidate ROI in association with the predetermined ROI. In some implementations, the data maintainer 1965 can store one or more indications of the inliers (e.g., the matching point pairs) of the candidate ROI and the predetermined ROI in one or more data structures in the data storage 1915.

The biomedical image data obtainer 1925 can select a patch at a first magnification factor from the biomedical image identified as corresponding to at least one of a mode ROI or a random ROI. For example, the biomedical image data obtainer 1925 can access a biomedical image at a first magnification (e.g., 1.25×, etc.) from the data storage 1915. Using this image data, the patch generator 1935 can split the biomedical image into overlapping patches of a predetermined size (e.g., 800 pixels by 800 pixels, etc.). The overlapping patches can overlap in steps by a predetermined amount depending on the type of sample represented in the biomedical image. For example, the in the case where the biomedical image depicts tissue from a needle biopsy the overlapping step size can be 200 pixels, and in the case where the biomedical image depicts tissue from an ectomy the overlapping step size can be 400 pixels. It should be understood that the steps sized presented by way of non-limiting example, and can in some implementations be any appropriate value to achieve a desired outcome. In some implementations, the patch generator 1935 selects the patch of the biomedical image that corresponds to a mode ROI or a random ROI. The patch that is selected by the patch generator 1935 can be used in one or more quality control techniques, such as the Laplacian blur techniques, the nuclear detection techniques, the marking detection techniques, or other quality control techniques described herein.

If the selected patch does not pass the quality control tests (e.g., does not contain too much irrelevant or disqualifying pixels, and does contain enough nuclear pixels as described herein above), the patch generator 1935 can skip the patch and select a different patch corresponding to a different ROI. If the selected patch passes the quality control tests, the patch generator 1935 can generate an additional neighboring patches that surround the selected patch using the biomedical image. The eight surrounding patches can correspond to the groups of pixels in the image that are adjacent to the pixels of the selected patch. For example, the surrounding patches can be of an equal size and adjacent to the selected patch, and can have a predetermined arrangement, such as an octagonal arrangement. The patch generator 1935 can then perform the quality control techniques described herein above on each of the patches surrounding the selected patch.

If any of the patches surrounding the selected patch do not pass the quality control tests described herein above, the patch generator 1935 can skip the patch and select a different patch corresponding to a different ROI. If all of the patches surrounding the selected patch pass the quality control test described herein, the patch generator 1935 can utilize the area of the biomedical image represented by the selected patch and the surrounding patches as a candidate magnification area. The patch generator 1935 can then select a magnified region (e.g., at a greater magnification level than the patches selected to identify the candidate magnification area) as a magnified patch for further processing. The patch generator 1935 can select a mode ROI patch in the candidate magnification area such that the selection is optimized for nuclear region count. For example, the magnified patch is selected such that the magnified patch contains the most possible nuclear pixels as compared to other potential selection regions within the candidate magnification area. The patch generator 1935 can repeat the magnification analysis process (e.g., quality control over selected patch, selection and quality control of surrounding patches, selection of magnified patch in magnification area, etc.) for each additional level of magnification until a desired magnification level is reached.

Figure 22:
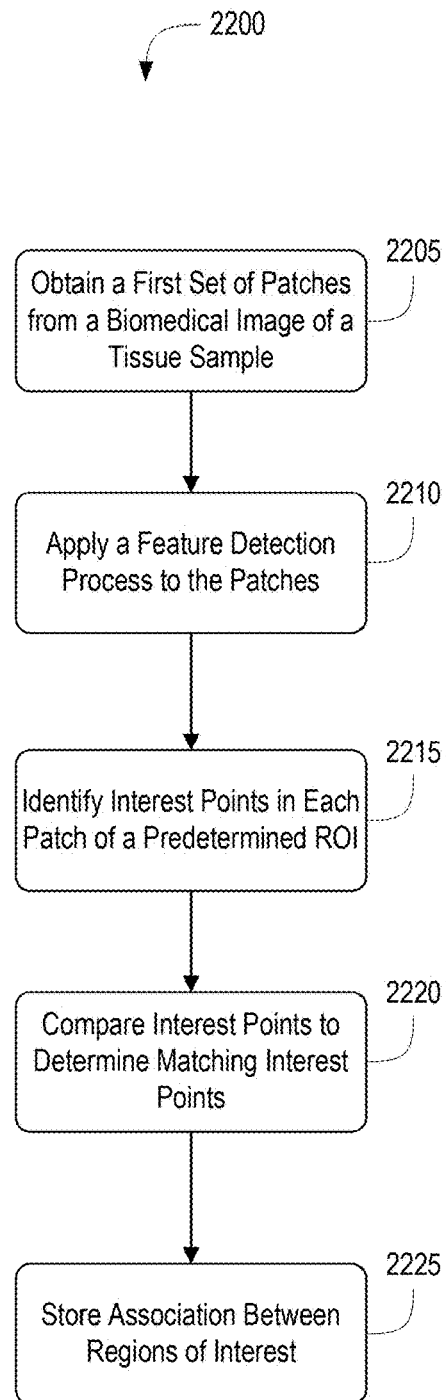
FIG. 22 depicts a flow diagram of an example method of comparing regions of interest among patches in accordance an illustrative embodiment.

Referring now to FIG. 22, depicted is a flow diagram of an example method 2200 of comparing regions of interest among patches in accordance an illustrative embodiment. The method 2200 can be performed, for example, by any computing device described herein, including the data processing system 1905. In brief overview, in performing the method 2100, the data processing system (e.g., the data processing system 1905) can obtain a first set of patches of a biomedical image of a tissue sample (STEP 2205), apply a feature detection process to the patches (STEP 2210), identify interest points in each patch of a predetermined ROI (STEP 2215), compare the interest points to determine matching interest points (STEP 2220), and store an association between the regions of interest (STEP 2225).

In further detail, the data processing system can obtain a first set of patches of a biomedical image of a tissue sample (STEP 2205). The tissue sample can be at least one of a needle biopsy or an ectomy, and can be placed on a slide for imaging by a biomedical image capturing device, such as a microscope. One or more microscopes can communicate with the data processing system or the components thereof, and can provide biomedical images as they are captured for further analysis. The biomedical images can be stored, for example, in the data storage (e.g., the data storage 1915), and can be used to generate a subset of patches of the biomedical image that satisfy an extraction policy (e.g., using the aspects described above, etc.). To obtain a set of patches that are identified as corresponding to a biomedical image representing a tissue sample, the data processing system can retrieve the patches from the data storage. The patches obtained by the data processing system can be passed through one or more quality control procedures, such as those identified above. The patches selected by the data processing system can each represent (or collectively represent) a candidate region of interest. The patches that represent a candidate region of interest can be patches that passed one or more quality control procedures, and can contain one or more regions of pixels that are classified as nuclear pixels.

In some implementations, when obtaining patches from the data storage, the data processing system can select a subset of patches at a magnification factor from the biomedical image identified as corresponding to a mode region of interest (ROI). Certain patches, such as those described herein above, can be stored by the data processing system in association with an indicator that a patch corresponds to a type of a region of interest, such as a mode ROI or a random ROI. A patch corresponding to a mode ROI can a patch that includes a greater number of nuclear regions than adjacent patches that make up the corresponding biomedical image. Thus, patches that correspond to a mode ROI can be considered as a hotspot (e.g., having a large number, high in density, etc.) of nuclear pixels. In some implementations, when obtaining patches from the data storage, the data processing system can select another subset of patches at a magnification factor from the biomedical image identified as corresponding to a random ROI. A patch identified as having a random ROI can include a patch that (1) passed the quality control procedures described herein above, (2) does not represent a mode ROI, and (3) is not one of the eight adjacent (e.g., up, left, down, right, upper left, upper right, lower right, lower left) patches of a patch representing a mode ROI. In some implementations, obtaining a patch can include obtaining a patch and its eight neighboring patches (e.g., up, left, down, right, upper right, upper left, lower left, and lower right) for a feature detection process. The center of the obtained patches (e.g., the patch from which the neighbors were determined) and its neighbors can be considered the candidate ROI.

The data processing system can apply a feature detection process to the patches (STEP 2210). In some implementations, the feature detection process can include at least one of a speeded up robust features (SURF), a scale-invariant feature transform (SIFT), or a convolutional neural network (CNN). For example, the data processing system can apply an upright variant of SURF (sometimes referred to herein as "upright SURF") to determine the one or more interest points in a patch. Applying upright SURF can include applying one or more square filters (e.g., a box filter) to an image to identify one or more points of interest in the set of patches. The computational efficiency of this process can be improved by utilizing integral images as part of applying the box filter to the patch under analysis.

In some implementations, the points of interest in the candidate ROI can be identified by the data processing system using a SIFT algorithm. Applying the SIFT algorithm to one or more patches of the ROI can include convolving an input patch using one or more Gaussian filters at different scales. The output of the Gaussian filters can then be reduced using a Difference of Gaussians technique. Next, the data processing system can attempt to identify local extrema at the differently scaled Gaussian outputs to produce one or more key points, which can be considered candidate points of interest. Using the SIFT algorithm, the data processing system can narrow the candidate points of interest into a set of actual points of interest, which can have corresponding pixel coordinates in patches of the candidate ROI.

In some implementations, the points of interest in the candidate ROI can be identified by the data processing system using a CNN. A CNN can include an input layer, which can be a tensor that is set equal to the pixel values of an image, an output layer, which can correspond to one or more output coordinates of points of interest in the input patch, and one or more hidden layers. The coordinates of the tensor can correspond to the pixel coordinates of the patch that is applied to the input of the CNN, and other dimensions of the tensor can correspond to the color channels of each pixel. The hidden layers of the CNN can include one or more convolutional layers that convolve the output of the previous layer using multiplication or another type of dot product. Each layer in a CNN can feed into the next layer until a final output value is propagated at the output layer. Each convolutional layer can include one or more convolutional kernels (e.g., tensors) that can perform a sliding dot product, or cross-correlation operation, on the output of the previous layer. The final output from the CNN can include one or more coordinates, or one or more indications of coordinates, of points of interest in an input patch. Thus, the data processing system can input one or more patches of the candidate region of interest into the CNN, and identify one or more points of interest in the one or more patches from the CNN.

The data processing system can identify interest points in each patch of a predetermined ROI (STEP 2215). Similar to identifying the points of interest in the candidate ROI, the data processing system can identify one or more points of interest from the patches (e.g., nine patches, one center patch and eight adjacent surrounding patches) that correspond to the predetermined ROI. For example, the data processing system can utilize an interest point detection algorithm, such as SURF, SIFT, or a CNN, to identify the points of interest in each patch. The predetermined ROI can be obtained, for example, by the data processing system using techniques similar to those described herein above. In some implementations, the points of interest in the patches of the predetermined ROI can be pre-computed and stored in association with the patches that correspond to the predetermined ROI. In such implementations, the data processing system can identify the points of the interest in the patches of the predetermined ROI by retrieving the points of interest from the data storage of the data processing system.

The data processing system can compare the interest points to determine matching interest points (STEP 2220). To determine matching interest points, the data processing system can calculate the distance between the points of interest, for example, in a SURF space. Points with a low distance in SURF space (e.g., a different below a predetermined threshold, a minimum distance, etc.) can be considered matching points. However, the distance in the SURF space must be bidirectional: a best matching point when comparing the candidate ROI to the predetermined ROI must also be the best matching point when comparing the predetermined ROI to the candidate ROI. When a matching point is found between the candidate ROI and the predetermined ROI, the data processing system can increment a counter that corresponds to the total number of matching points of interest between the two ROIs.

When all of the patches of the candidate ROI have been compared to all of the patches of the predetermined ROI, the data processing system can determine whether the total number of matching points of interest is greater than a predetermined threshold. In some implementations, the predetermined threshold can be four (e.g., if a candidate ROI has four or more points of interest that match those of the predetermined ROI, the candidate ROI satisfies the threshold). If the data processing system determines that the number of matching points does not satisfy the threshold, the data processing system can determine that the candidate ROI and predetermined ROI do not correspond to each other (e.g., the two ROIs do not overlap). If the data processing system determines that the number of matching points satisfies the threshold, the data processing system can determine that the candidate ROI and the predetermined ROI correspond to each other.

The data processing system can store an association between the regions of interest (STEP 2225). The association can be stored to include the results of the overlap detection in one or more data structures corresponding to the candidate ROI or the predetermined ROI. If the candidate ROI and the predetermined ROI are determined to overlap, the data processing system can store an identifier of the predetermined ROI in association with the candidate ROI, or the data processing system can store an identifier of the candidate ROI in association with the predetermined ROI. In some implementations, the data maintainer 1965 can store one or more indications of the inliers (e.g., the matching point pairs) of the candidate ROI and the predetermined ROI in one or more data structures in the data storage.

C. Computing and Network Environment

Figure 23:
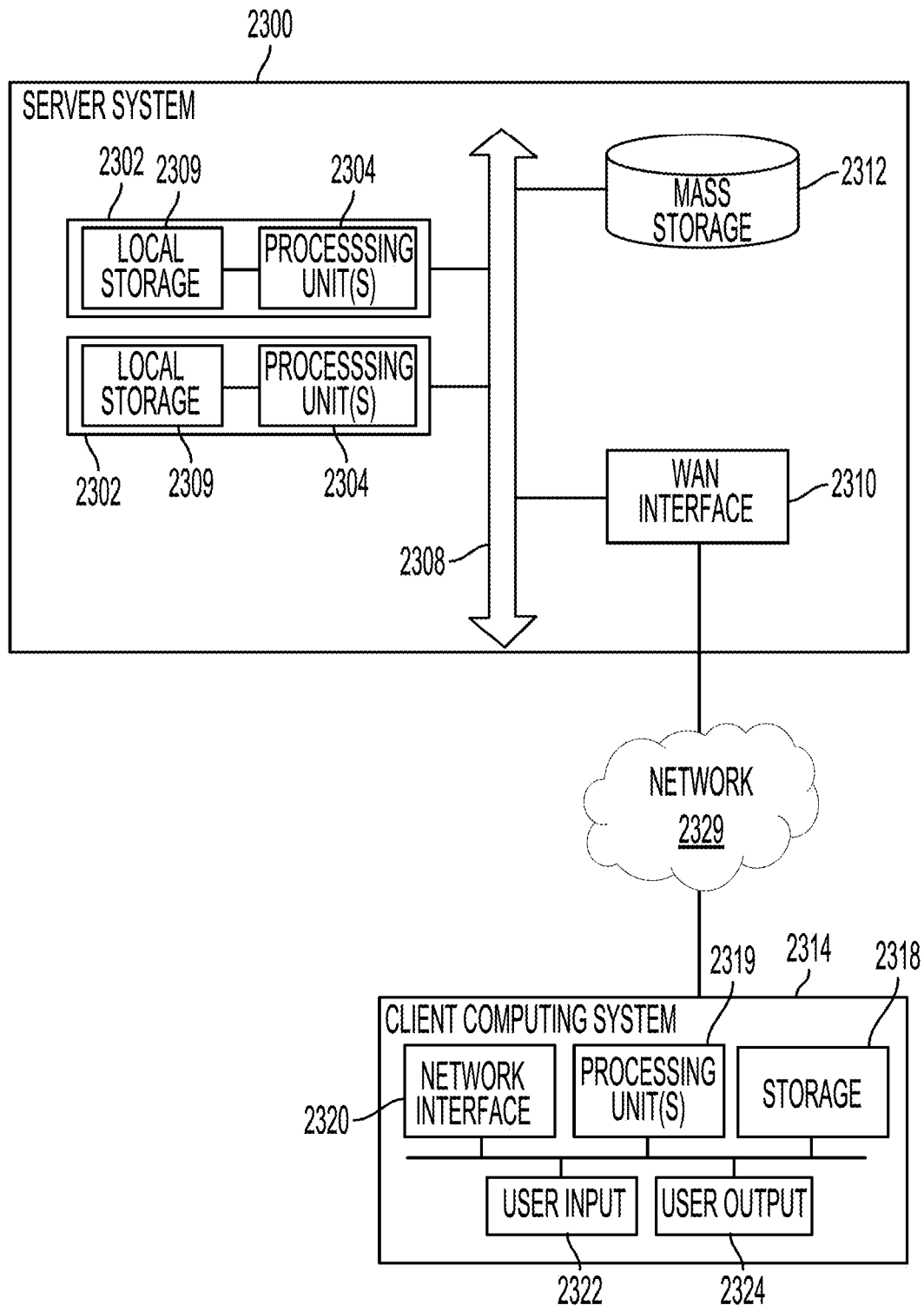
FIG. 23 is a block diagram of a server system and a client computer system in accordance with an illustrative embodiment.

Various operations described herein can be implemented on computer systems. FIG. 23 shows a simplified block diagram of a representative server system 2300, client computer system 2314, and network 2326 usable to implement certain embodiments of the present disclosure. In various embodiments, server system 2300 or similar systems can implement services or servers described herein or portions thereof. Client computer system 2314 or similar systems can implement clients described herein. The system 100 described herein can be similar to the server system 2300. Server system 2300 can have a modular design that incorporates a number of modules 2302 (e.g., blades in a blade server embodiment); while two modules 2302 are shown, any number can be provided. Each module 23s02 can include processing unit(s) 2304 and local storage 2306.

Processing unit(s) 2304 can include a single processor, which can have one or more cores, or multiple processors. In some embodiments, processing unit(s) 2304 can include a general-purpose primary processor as well as one or more special-purpose co-processors such as graphics processors, digital signal processors, or the like. In some embodiments, some or all processing units 2304 can be implemented using customized circuits, such as application specific integrated circuits (ASICs) or field programmable gate arrays (FPGAs). In some embodiments, such integrated circuits execute instructions that are stored on the circuit itself. In other embodiments, processing unit(s) 2304 can execute instructions stored in local storage 2306. Any type of processors in any combination can be included in processing unit(s) 2304.

Local storage 2306 can include volatile storage media (e.g., DRAM, SRAM, SDRAM, or the like) and/or non-volatile storage media (e.g., magnetic or optical disk, flash memory, or the like). Storage media incorporated in local storage 2306 can be fixed, removable or upgradeable as desired. Local storage 2306 can be physically or logically divided into various subunits such as a system memory, a read-only memory (ROM), and a permanent storage device. The system memory can be a read-and-write memory device or a volatile read-and-write memory, such as dynamic random-access memory. The system memory can store some or all of the instructions and data that processing unit(s) 2304 need at runtime. The ROM can store static data and instructions that are needed by processing unit(s) 2304. The permanent storage device can be a non-volatile read-and-write memory device that can store instructions and data even when module 2302 is powered down. The term "storage medium" as used herein includes any medium in which data can be stored indefinitely (subject to overwriting, electrical disturbance, power loss, or the like) and does not include carrier waves and transitory electronic signals propagating wirelessly or over wired connections.

In some embodiments, local storage 2306 can store one or more software programs to be executed by processing unit(s) 2304, such as an operating system and/or programs implementing various server functions such as functions of the system 100 of FIG. 1 or any other system described herein, or any other server(s) associated with system 100 or any other system described herein.

"Software" refers generally to sequences of instructions that, when executed by processing unit(s) 2304 cause server system 2300 (or portions thereof) to perform various operations, thus defining one or more specific machine embodiments that execute and perform the operations of the software programs. The instructions can be stored as firmware residing in read-only memory and/or program code stored in non-volatile storage media that can be read into volatile working memory for execution by processing unit(s) 2304. Software can be implemented as a single program or a collection of separate programs or program modules that interact as desired. From local storage 2306 (or non-local storage described below), processing unit(s) 2304 can retrieve program instructions to execute and data to process in order to execute various operations described above.

In some server systems 2300, multiple modules 2302 can be interconnected via a bus or other interconnect 2308, forming a local area network that supports communication between modules 2302 and other components of server system 2300. Interconnect 2308 can be implemented using various technologies including server racks, hubs, routers, etc.

A wide area network (WAN) interface 2310 can provide data communication capability between the local area network (interconnect 2308) and the network 2326, such as the Internet. Technologies can be used, including wired (e.g., Ethernet, IEEE 802.3 standards) and/or wireless technologies (e.g., Wi-Fi, IEEE 802.11 standards).

In some embodiments, local storage 2306 is intended to provide working memory for processing unit(s) 2304, providing fast access to programs and/or data to be processed while reducing traffic on interconnect 2308. Storage for larger quantities of data can be provided on the local area network by one or more mass storage subsystems 2312 that can be connected to interconnect 2308. Mass storage subsystem 2312 can be based on magnetic, optical, semiconductor, or other data storage media. Direct attached storage, storage area networks, network-attached storage, and the like can be used. Any data stores or other collections of data described herein as being produced, consumed, or maintained by a service or server can be stored in mass storage subsystem 2312. In some embodiments, additional data storage resources may be accessible via WAN interface 2310 (potentially with increased latency).

Server system 2300 can operate in response to requests received via WAN interface 2310. For example, one of modules 2302 can implement a supervisory function and assign discrete tasks to other modules 2302 in response to received requests. Work allocation techniques can be used. As requests are processed, results can be returned to the requester via WAN interface 2310. Such operation can generally be automated. Further, in some embodiments, WAN interface 2310 can connect multiple server systems 2300 to each other, providing scalable systems capable of managing high volumes of activity. Other techniques for managing server systems and server farms (collections of server systems that cooperate) can be used, including dynamic resource allocation and reallocation.

Server system 2300 can interact with various user-owned or user-operated devices via a wide-area network such as the Internet. An example of a user-operated device is shown in FIG. 23 as client computing system 2314. Client computing system 2314 can be implemented, for example, as a consumer device such as a smartphone, other mobile phone, tablet computer, wearable computing device (e.g., smart watch, eyeglasses), desktop computer, laptop computer, and so on.

For example, client computing system 2314 can communicate via WAN interface 2310. Client computing system 2314 can include computer components such as processing unit(s) 2316, storage device 2318, network interface 2320, user input device 2322, and user output device 2324. Client computing system 2314 can be a computing device implemented in a variety of form factors, such as a desktop computer, laptop computer, tablet computer, smartphone, other mobile computing device, wearable computing device, or the like.

Processor 2316 and storage device 2318 can be similar to processing unit(s) 2304 and local storage 2306 described above. Suitable devices can be selected based on the demands to be placed on client computing system 2314; for example, client computing system 2314 can be implemented as a "thin" client with limited processing capability or as a high-powered computing device. Client computing system 2314 can be provisioned with program code executable by processing unit(s) 2316 to enable various interactions with server system 2300.

Network interface 2320 can provide a connection to the network 2326, such as a wide area network (e.g., the Internet) to which WAN interface 2310 of server system 2300 is also connected. In various embodiments, network interface 2320 can include a wired interface (e.g., Ethernet) and/or a wireless interface implementing various RF data communication standards such as Wi-Fi, Bluetooth, or cellular data network standards (e.g., 3G, 4G, LTE, etc.).

User input device 2322 can include any device (or devices) via which a user can provide signals to client computing system 2314; client computing system 2314 can interpret the signals as indicative of particular user requests or information. In various embodiments, user input device 2322 can include any or all of a keyboard, touch pad, touch screen, mouse or other pointing device, scroll wheel, click wheel, dial, button, switch, keypad, microphone, and so on.

User output device 2324 can include any device via which client computing system 2314 can provide information to a user. For example, user output device 2324 can include a display to display images generated by or delivered to client computing system 2314. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). Some embodiments can include a device such as a touchscreen that functions as both input and output device. In some embodiments, other user output devices 2324 can be provided in addition to or instead of a display. Examples include indicator lights, speakers, tactile "display" devices, printers, and so on.

Some embodiments include electronic components, such as microprocessors, storage and memory that store computer program instructions in a computer readable storage medium. Many of the features described in this specification can be implemented as processes that are specified as a set of program instructions encoded on a computer readable storage medium. When these program instructions are executed by one or more processing units, they cause the processing unit(s) to perform various operations indicated in the program instructions. Examples of program instructions or computer code include machine code, such as is produced by a compiler, and files including higher-level code that are executed by a computer, an electronic component, or a microprocessor using an interpreter. Through suitable programming, processing unit(s) 2304 and 2316 can provide various functionality for server system 2300 and client computing system 2314, including any of the functionality described herein as being performed by a server or client, or other functionality.

It will be appreciated that server system 2300 and client computing system 2314 are illustrative and that variations and modifications are possible. Computer systems used in connection with embodiments of the present disclosure can have other capabilities not specifically described here. Further, while server system 2300 and client computing system 2314 are described with reference to particular blocks, it is to be understood that these blocks are defined for convenience of description and are not intended to imply a particular physical arrangement of component parts. For instance, different blocks can be but need not be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present disclosure can be realized in a variety of apparatus including electronic devices implemented using any combination of circuitry and software.

While the disclosure has been described with respect to specific embodiments, one skilled in the art will recognize that numerous modifications are possible. Embodiments of the disclosure can be realized using a variety of computer systems and communication technologies including but not limited to specific examples described herein. Embodiments of the present disclosure can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present disclosure may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

Thus, although the disclosure has been described with respect to specific embodiments, it will be appreciated that the disclosure is intended to cover all modifications and equivalents within the scope of the following claims.

Aspects can be combined and it will be readily appreciated that features described in the context of one aspect can be combined with other aspects. Aspects can be implemented in any convenient form. For example, by appropriate computer programs, which may be carried on appropriate carrier media (computer readable media), which may be tangible carrier media (e.g. disks) or intangible carrier media (e.g. communications signals). Aspects may also be implemented using a suitable apparatus, which can take the form of one or more programmable computers running computer programs arranged to implement the aspect. As used in the specification and in the claims, the singular form of 'a', 'an', and 'the' include plural referents unless the context clearly dictates otherwise.

What is claimed is:

1. A method, comprising:
   obtaining, by a data processing system, a first patch identified from a biomedical image derived from a tissue sample, the first patch having a first plurality of pixels corresponding to a portion of the biomedical image, each of the first plurality of pixels defined by a first color value;
   applying, by the data processing system, a kernel operator to the first plurality of pixels of the first patch to generate a second patch, the second patch having a second plurality of pixels, each of the second plurality of pixels having a second color value corresponding to one or more first color values of a corresponding subset of the first plurality of pixels;
   generating, by the data processing system, a variance metric over a corresponding plurality of second color values of the second plurality of pixels of the second patch;
   determining, by the data processing system, whether the first patch corresponding to the second patch qualifies for selection based on a comparison between the variance metric and a threshold value; and
   storing, by the data processing system, in one or more data structures, an association between the first patch and the determination of whether the first patch qualifies for selection.

2. The method of claim 1, further comprising:
identifying, by the data processing system, the first color value of a pixel of the first plurality of pixels of the first patch, the first color value having a red color component, a green color component, and a blue color component;
comparing, by the data processing system, the red color component, the green color component, and the blue color component of the first color value of the pixel with one another;
classifying, by the data processing system, based on the comparison, the pixel as at least one pixel type of a plurality of pixel types including growable, non-growable, acceptable, and unacceptable; and
storing, by the data processing system, in the one or more data structures, a second association between the pixel of the first patch and the at least one pixel type.

3. The method of claim 1, further comprising:
applying, by the data processing system, color deconvolution to each pixel of the first plurality of pixels of the first patch to determine a first intensity value and a second intensity value for the pixel, the first intensity value correlated with a first stain on the tissue sample, the second intensity value correlated with a second stain on the tissue sample;
classifying, by the data processing system, each pixel of the first plurality of pixels as a mark type of a plurality of mark types including a nuclear type and a non-nuclear type;
comparing, by the data processing system, a region in the first patch corresponding to a number of pixels of the first plurality of pixels classified as the nuclear type to a threshold area; and
storing, by the data processing system, in the one or more data structures, a second association between the first patch with at least one of the number of pixels of the first plurality of pixels classified as the nuclear type, the region in the first patch, and the comparison between the region and the threshold area.

4. The method of claim 1, further comprising:
determining, by the data processing system, a pixel variance metric over a corresponding plurality second color values of a subset of pixels of the second plurality of pixels in the second patch, the subset of pixels including a pixel and one or more adjacent pixels in the second plurality of pixels;
comparing, by the data processing system, the pixel variance metric over the corresponding plurality of second color values of the subset of pixels to a pixel threshold value;
classifying, by the data processing system, the pixel in the subset of pixels as a pixel type of a plurality of pixel types, the pixel type including a blurred pixel type and a non-blurred pixel type; and
storing, by the data processing system, in the one or more data structures, a second association between a corresponding pixel in the first patch and the pixel type.

5. The method of claim 1, further comprising:
identifying, by the data processing system, the first color value of each pixel of the first plurality of pixels of the first patch, the first color value having a red color component, a green color component, and a blue color component;
determining, by the data processing system, an excessive metric for at least one of the red color component, the green color component, or the blue color component over one or more of the first plurality of pixels of the first patch;
comparing, by the data processing system, the excessive metric with a threshold metric; and
storing, by the data processing system, in the one or more data structures, a second association between the first patch and the comparison of the excessive metric with the threshold metric.

6. The method of claim 1, further comprising:
applying, by the data processing system, color deconvolution to each pixel of the first plurality of pixels of the first patch to determine a first plurality of intensity values for the first color value of the pixel, the first plurality of intensity values including a first intensity value correlated with a first stain on the tissue sample, a second intensity value correlated with a second stain on the tissue sample, and a third intensity value correlated with a residual on the tissue sample;
generating, by the data processing system, a distribution of intensity values based on the first plurality of intensity values corresponding to the first plurality of pixels of the first patch;
mapping, by the data processing system, the distribution of intensity values to a target distribution of intensity values defined for the first patch to generate a normalized distribution of intensity values;
generating, by the data processing system, a second plurality of intensity values for the first plurality of pixels of the patch using the normalized distribution of intensity values; and
applying, by the data processing system, inverse color deconvolution to the second plurality of intensity values to generate a third plurality of pixels for a third patch, each of the third plurality of pixels defined by a color value, the color value having a red color component, a green color component, and a blue color component.

7. The method of claim 1, further comprising:
identifying, by the data processing system, a first pixel from the first plurality of pixels of the patch classified as a growable type;
identifying, by the data processing system, one or more pixels adjacent to the first pixel in the first plurality of pixels classified as overwritable type; and
setting, by the data processing system, the one or more pixels to the first color value of the first pixel classified as the growable type.

8. The method of claim 1, further comprising:
identifying, by the data processing system, a first subset of pixels from the first plurality of pixels of the patch classified as a nuclear type;
determining, by the data processing system, a perimeter of the first subset of pixels classified as the nuclear type within the patch;
identifying, by the data processing system, a second subset of pixels within the perimeter of the patch classified as non-nuclear type; and
setting, by the data processing system, each pixel of the second subset of pixels to the first color value of a corresponding adjacent pixel of the first subset of pixels.

9. The method of claim 8, further comprising
identifying, by the data processing system, a subset of pixels from the first plurality of pixels of the patch classified as the nuclear type, each of the subset of pixels having one or more adjacent pixels in the first plurality of pixels also classified as the nuclear type;

determining, by the data processing system, that a number of the subset of pixels satisfies a threshold pixel count; and storing, by the data processing system, in the one or more data structures, a second association between the patch and a region corresponding to the subset of pixels, responsive to determining that the number of the subset of pixels satisfies the threshold pixel count.

10. The method of claim 1, wherein obtaining the first patch further comprises identifying the first patch at a magnification factor from a plurality of patches of the biomedical image as having a candidate region of interest.

11. A system, comprising:

a data processing system having one or more processors coupled with memory, configured to:

obtain a first patch identified from a biomedical image derived from a tissue sample, the first patch having a first plurality of pixels corresponding to a portion of the biomedical image, each of the first plurality of pixels defined by a first color value;

apply a kernel operator to the first plurality of pixels of the first patch to generate a second patch, the second patch having a second plurality of pixels, each of the second plurality of pixels having a second color value corresponding to one or more first color values of a corresponding subset of the first plurality of pixels;

generate a variance metric over a corresponding plurality of second color values of the second plurality of pixels of the second patch;

determine whether the first patch corresponding to the second patch qualifies for selection based on a comparison between the variance metric and a threshold value; and store in one or more data structures, an association between the first patch and the determination of whether the first patch qualifies for selection.

12. The system of claim 11, wherein the data processing system is further configured to:

identify the first color value of a pixel of the first plurality of pixels of the first patch, the first color value having a red color component, a green color component, and a blue color component;

compare the red color component, the green color component, and the blue color component of the first color value of the pixel with one another;

classify, based on the comparison, the pixel as at least one pixel type of a plurality of pixel types including growable, non-growable, acceptable, and unacceptable; and store, in the one or more data structures, a second association between the pixel of the first patch and the at least one pixel type.

13. The system of claim 11, wherein the data processing system is further configured to:

apply color deconvolution to each pixel of the first plurality of pixels of the first patch to determine a first intensity value and a second intensity value for the pixel, the first intensity value correlated with a first stain on the tissue sample, the second intensity value correlated with a second stain on the tissue sample;

classify each pixel of the first plurality of pixels as a mark type of a plurality of mark types including a nuclear type and a non-nuclear type;

compare a region in the first patch corresponding to a number of pixels of the first plurality of pixels classified as the nuclear type to a threshold area; and store, in the one or more data structures, a second association between the first patch with at least one of the number of pixels of the first plurality of pixels classified as the nuclear type, the region in the first patch, and the comparison between the region and the threshold area.

14. The system of claim 11, wherein the data processing system is further configured to:

determine a pixel variance metric over a corresponding plurality second color values of a subset of pixels of the second plurality of pixels in the second patch, the subset of pixels including a pixel and one or more adjacent pixels in the second plurality of pixels;

compare the pixel variance metric over the corresponding plurality of second color values of the subset of pixels to a pixel threshold value;

classify the pixel in the subset of pixels as a pixel type of a plurality of pixel types, the pixel type including a blurred pixel type and a non-blurred pixel type; and store, in the one or more data structures, a second association between a corresponding pixel in the first patch and the pixel type.

15. The system of claim 11, wherein the data processing system is further configured to:

identify the first color value of each pixel of the first plurality of pixels of the first patch, the first color value having a red color component, a green color component, and a blue color component;

determine an excessive metric for at least one of the red color component, the green color component, or the blue color component over one or more of the first plurality of pixels of the first patch;

compare the excessive metric with a threshold metric; and store in the one or more data structures, a second association between the first patch and the comparison of the excessive metric with the threshold metric.

16. The system of claim 11, wherein the data processing system is further configured to:

apply color deconvolution to each pixel of the first plurality of pixels of the first patch to determine a first plurality of intensity values for the first color value of the pixel, the first plurality of intensity values including a first intensity value correlated with a first stain on the tissue sample, a second intensity value correlated with a second stain on the tissue sample, and a third intensity value correlated with a residual on the tissue sample;

generate a distribution of intensity values based on the first plurality of intensity values corresponding to the first plurality of pixels of the first patch;

map the distribution of intensity values to a target distribution of intensity values defined for the first patch to generate a normalized distribution of intensity values;

generate a second plurality of intensity values for the first plurality of pixels of the patch using the normalized distribution of intensity values; and apply inverse color deconvolution to the second plurality of intensity values to generate a third plurality of pixels for a third patch, each of the third plurality of pixels defined by a color value, the color value having a red color component, a green color component, and a blue color component.

17. The system of claim 11, wherein the data processing system is further configured to:
- identify a first pixel from the first plurality of pixels of the patch classified as a growable type;
- identify one or more pixels adjacent to the first pixel in the first plurality of pixels classified as overwritable type; and
- set the one or more pixels to the first color value of the first pixel classified as the growable type.

18. The system of claim 11, wherein the data processing system is further configured to:
- identify a first subset of pixels from the first plurality of pixels of the patch classified as a nuclear type;
- determine a perimeter of the first subset of pixels classified as the nuclear type within the patch;
- identify a second subset of pixels within the perimeter of the patch classified as non-nuclear type; and
- set each pixel of the second subset of pixels to the first color value of a corresponding adjacent pixel of the first subset of pixels.

19. The system of claim 18, wherein the data processing system is further configured to:
- identify a subset of pixels from the first plurality of pixels of the patch classified as the nuclear type, each of the subset of pixels having one or more adjacent pixels in the first plurality of pixels also classified as the nuclear type;
- determine that a number of the subset of pixels satisfies a threshold pixel count; and
- store, in the one or more data structures, a second association between the patch and a region corresponding to the subset of pixels, responsive to determining that the number of the subset of pixels satisfies the threshold pixel count.

20. The system of claim 11, wherein the data processing system is further configured to identify the first patch at a magnification factor from a plurality of patches of the biomedical image as having a candidate region of interest.

* * * * *